United States Patent [19]
Nichols et al.

[11] Patent Number: 5,164,081
[45] Date of Patent: Nov. 17, 1992

[54] APPARATUS FOR SEPARATION AND FOR TREATMENT OF FLUID FEEDSTREAMS, WAFERS FOR USE THEREIN AND RELATED METHODS

[75] Inventors: Randall W. Nichols, West Lake; James C. Davis, Hudson, both of Ohio; Robert D. Littler, Cashmere, Australia

[73] Assignee: The Standard Oil Company, Cleveland, Ohio

[21] Appl. No.: 588,007

[22] Filed: Sep. 25, 1990

Related U.S. Application Data

[63] Continuation-in-part of Ser. No. 328,335, Mar. 24, 1989, Pat. No. 4,959,154.

[51] Int. Cl.$^5$ .............................................. B01D 63/04
[52] U.S. Cl. ............................... 210/232; 210/321.74; 210/321.87; 210/500.23
[58] Field of Search ................... 210/651, 232, 321.74, 210/321.88, 321.87, 500.23, 644, 652, 336, 321.84, 486; 55/16, 158; 264/257, 258

[56] References Cited

U.S. PATENT DOCUMENTS

| | | |
|---|---|---|
| 184,024 | 11/1876 | Stewart . |
| 546,527 | 9/1895 | Gudeman . |
| 661,189 | 11/1900 | Olsen et al. . |
| 3,198,335 | 8/1962 | Lewis et al. .......................... 210/321 |
| 3,207,311 | 9/1965 | Kasten ................................. 210/137 |
| 3,216,572 | 11/1961 | Kasten ................................. 210/97 |
| 3,223,240 | 12/1965 | Muller ................................. 210/96 |
| 3,342,729 | 12/1964 | Strand ................................. 210/23 |
| 3,455,460 | 8/1988 | Mahon et al. ........................ 210/321 |
| 3,492,698 | 2/1970 | Geary, Jr. et al. ..................... 18/26 |
| 3,494,465 | 2/1970 | Nyrop ................................. 210/194 |
| 3,684,097 | 8/1972 | Mathewson, Jr. et al. .......... 210/321 |
| 3,746,175 | 7/1973 | Markley .............................. 210/321 |
| 3,881,897 | 5/1975 | Faure et al. .......................... 55/158 |
| 3,993,816 | 11/1976 | Baudet et al. ........................ 428/45 |
| 4,051,041 | 9/1977 | Riede .................................. 210/321 |
| 4,080,293 | 3/1978 | Takeshi .............................. 210/230 |
| 4,115,274 | 9/1978 | Boddeker et al. ................... 210/321 |
| 4,190,441 | 2/1980 | Tengzelius et al. .................. 75/251 |
| 4,207,192 | 6/1980 | Coplan et al. ........................ 210/321 |
| 4,210,536 | 7/1980 | Coplan et al. ........................ 210/321 |
| 4,225,439 | 9/1980 | Spranger ............................. 210/321 |
| 4,227,295 | 10/1980 | Bodnar et al. ........................ 29/527 |
| 4,231,879 | 11/1980 | Spranger ............................. 210/321 |
| 4,292,178 | 9/1981 | Mori et al. ........................... 210/352 |
| 4,315,819 | 2/1982 | King et al. ........................... 210/321 |
| 4,329,229 | 5/1982 | Bodnar et al. ........................ 210/321 |
| 4,371,438 | 2/1983 | Benattar et al. ..................... 210/232 |
| 4,430,232 | 2/1984 | Doucet ................................ 210/798 |
| 4,440,641 | 4/1984 | Ostertag ............................. 210/321.3 |
| 4,565,637 | 1/1986 | Pearce ................................. 210/770 |
| 4,592,839 | 6/1986 | Rosenberg ........................... 210/352 |
| 4,639,353 | 1/1987 | Takemura et al. ................... 422/46 |
| 4,659,549 | 4/1987 | Hamada et al. ..................... 422/48 |
| 4,735,718 | 4/1988 | Peters ................................. 210/321 |
| 4,752,305 | 6/1988 | Johnson .............................. 55/16 |
| 4,910,139 | 3/1990 | Chang et al. ........................ 435/144 |
| 4,959,152 | 9/1990 | Nichols ............................... 210/651 |
| 5,000,855 | 3/1991 | Nichols ............................... 210/651 |
| 5,104,535 | 4/1992 | Cote et al. ........................... 210/321.8 |

FOREIGN PATENT DOCUMENTS

| | | |
|---|---|---|
| 0350853 | 7/1989 | European Pat. Off. . |
| 2811826 | 9/1978 | Fed. Rep. of Germany . |
| 2650341 | 4/1979 | Fed. Rep. of Germany . |
| 2222134 | 3/1973 | France . |
| 52-146767 | 12/1977 | Japan . |
| 54-78671 | 6/1979 | Japan . |

OTHER PUBLICATIONS

AIChE Journal, Sidhoum et al., May 1989, vol. 35, No. 5, entitled An Internally Staged Hollow-Fiber Permeator for Gas Separation.
Advertisement-Hoechst Celanese, 1988 entitled Liqui-Cel Contained Liquid Membrane Module.
Chen and Kao summary, entitled The Two-Bundle Hollow-Fiber Membrane Reactors.
Dall-Bauman et al, summary, entitled Analysis of Hollow Fiber Bioreactor Wastewater Treatment.

Primary Examiner—Frank Spear
Attorney, Agent, or Firm—Larry W. Evans; John E. Miller; Teresan W. Gilbert

[57] ABSTRACT

A multi port apparatus (220,440) provides for the treatment of material. Such apparatus comprises at least one wafer (240,320,410), each wafer comprising a central area (246,325,416) providing a plurality of members (18,303,309,360) arranged in a plurality of layers (262,306,308,432) first peripheral support means (241,321,411) encompassing the central area and having upper and lower surfaces (244,245,324,414,415); second peripheral support means (248,326,418), having upper and lower surfaces (251,252,330,421,422) and carried radially outwardly from the first peripheral support means; and a plurality of separate bore fluid chambers (253-256, 335-338, 423-426) defined between the first and second peripheral support means and communicable with the central area; vessel means (228,448) providing a first port (221,441) a second port (222,442) and a plurality of separate bore fluid port means (223-226, 443-446) communicating with the four separate bore fluid chambers; and means for compressing (234,454) at least one wafer within the apparatus. The present invention also provides three and four port apparatus (60,180). Multi-chambered wafers (240,320,410) are provided as well as wafers (200,280,300,350 and 460) for use in the multi port apparatus. Finally, methods for the manufacture of wafers are provided.

56 Claims, 29 Drawing Sheets

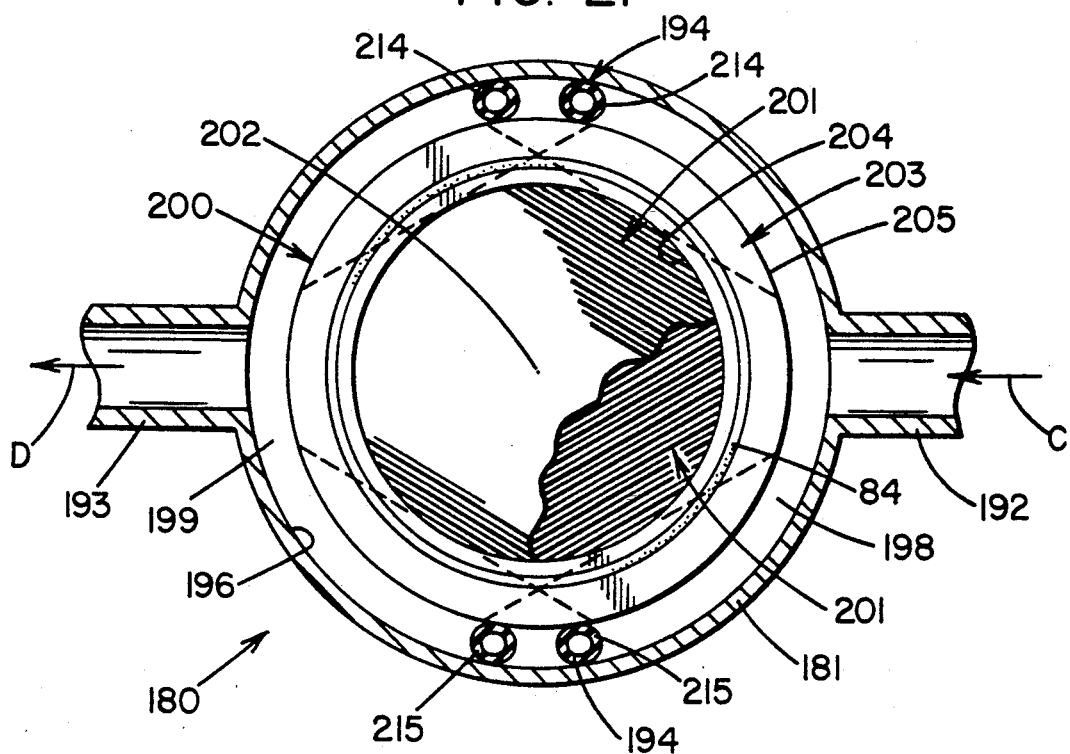
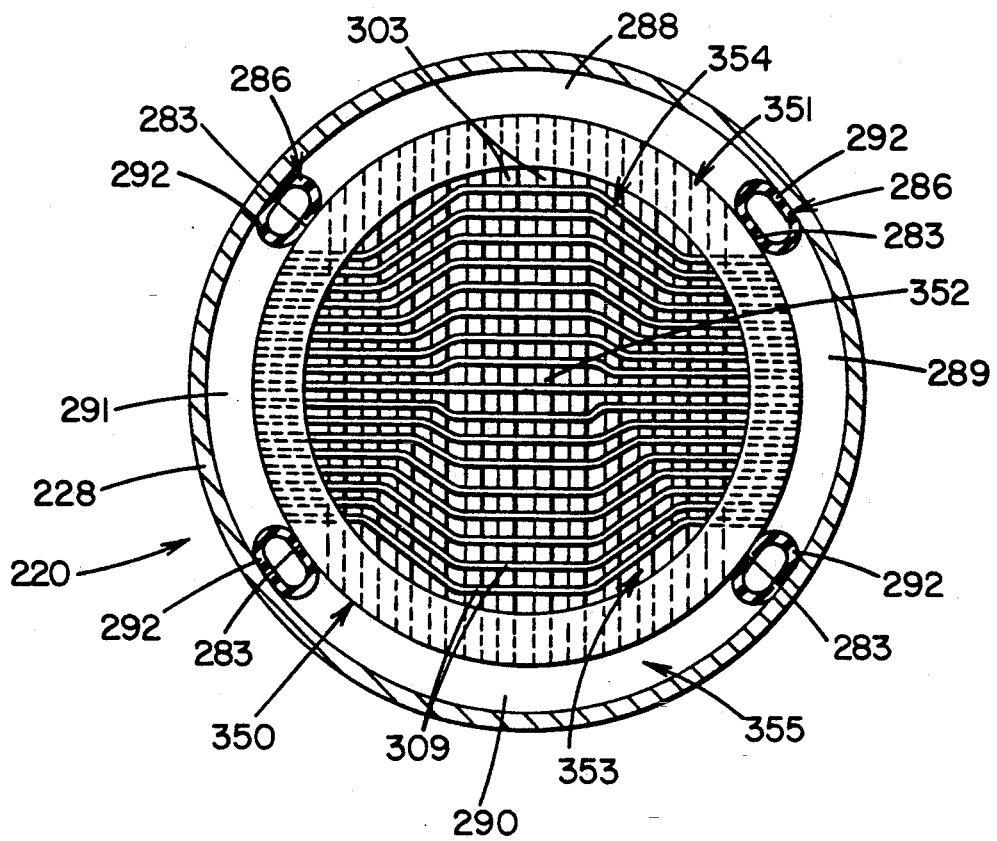

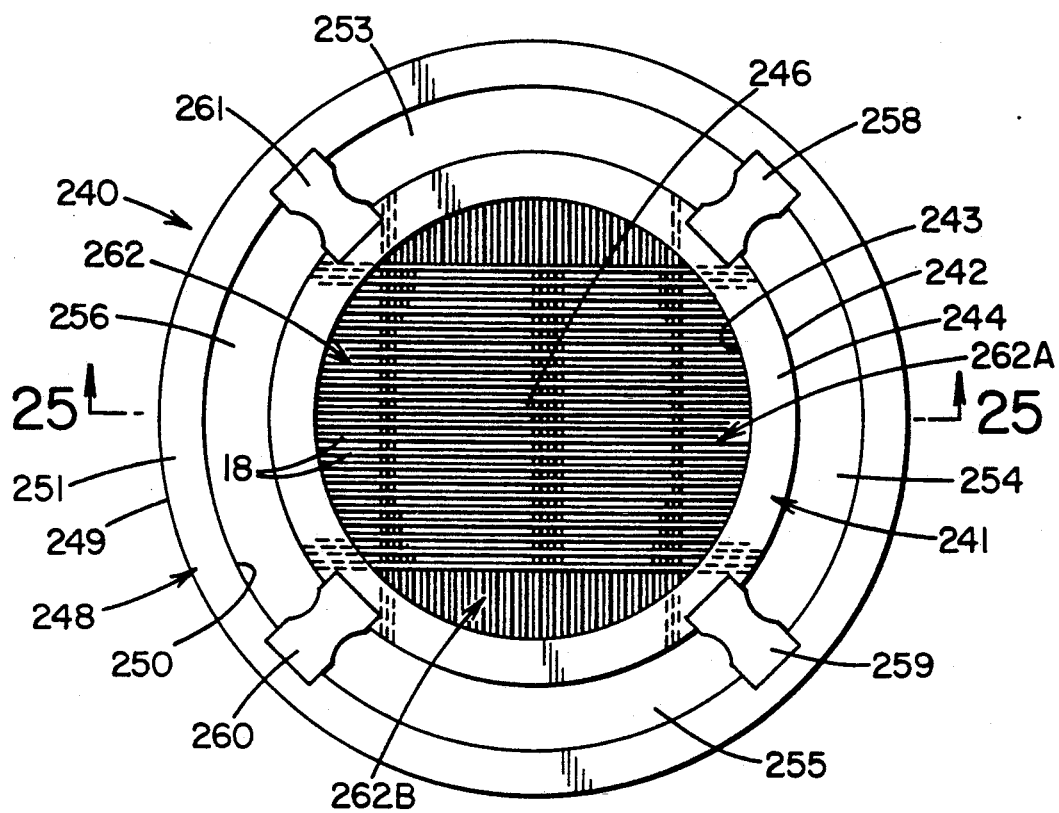
FIG. 24
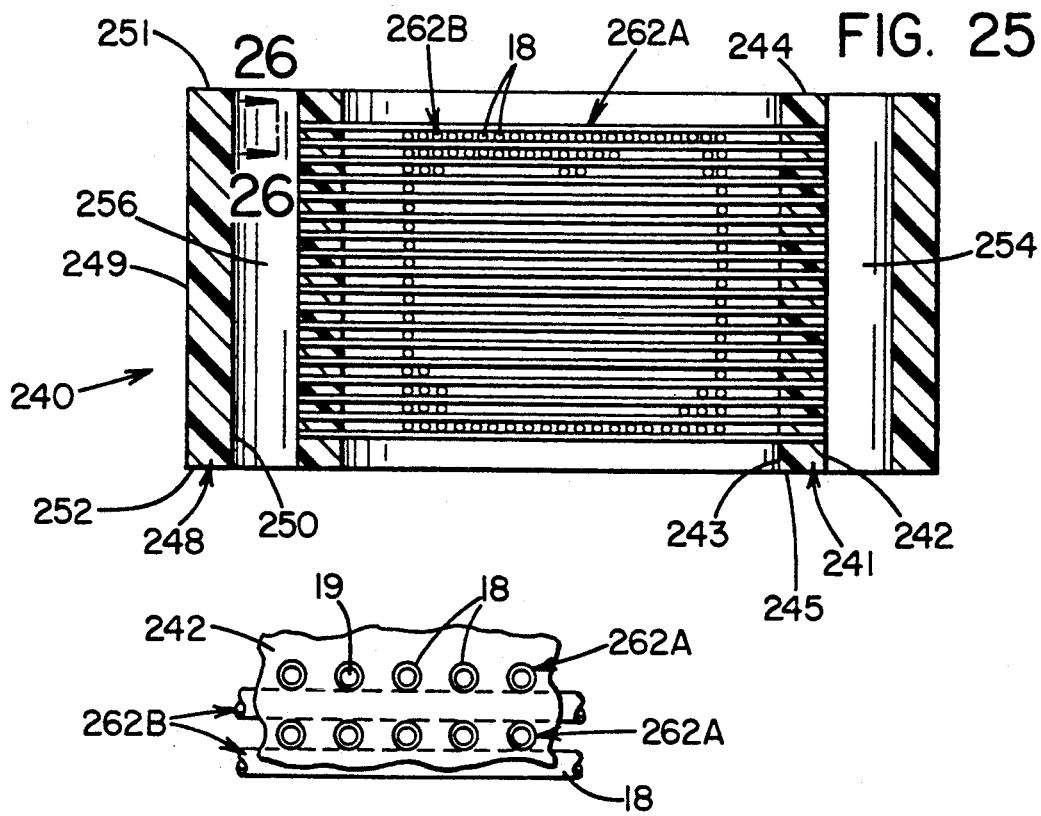
FIG. 25
FIG. 26

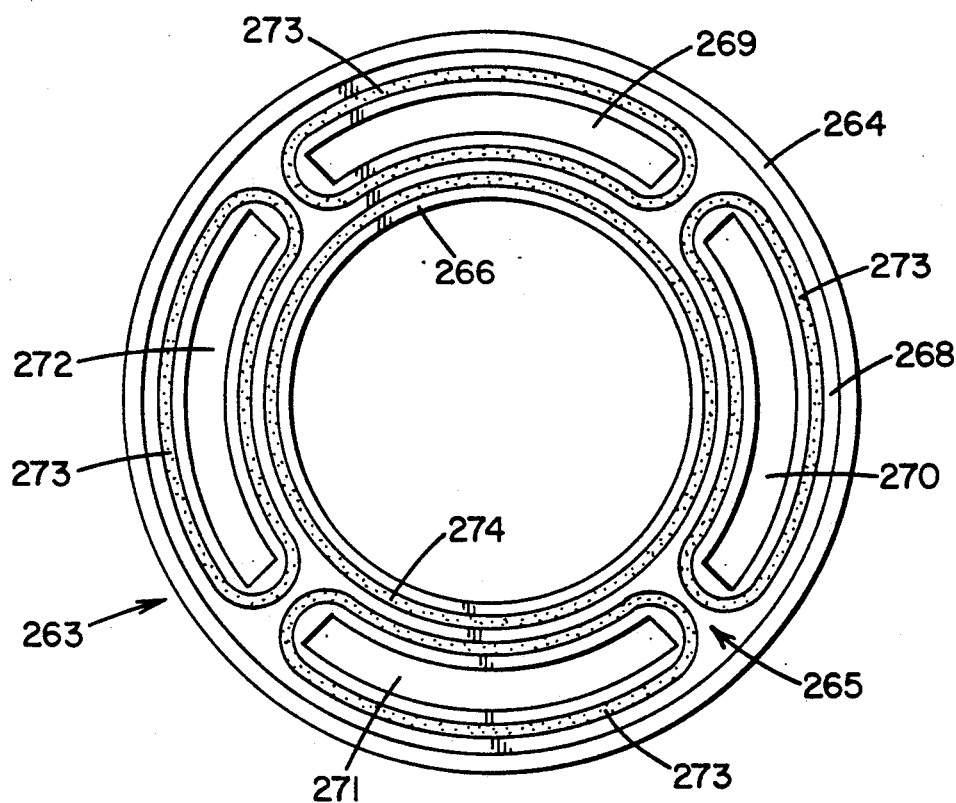
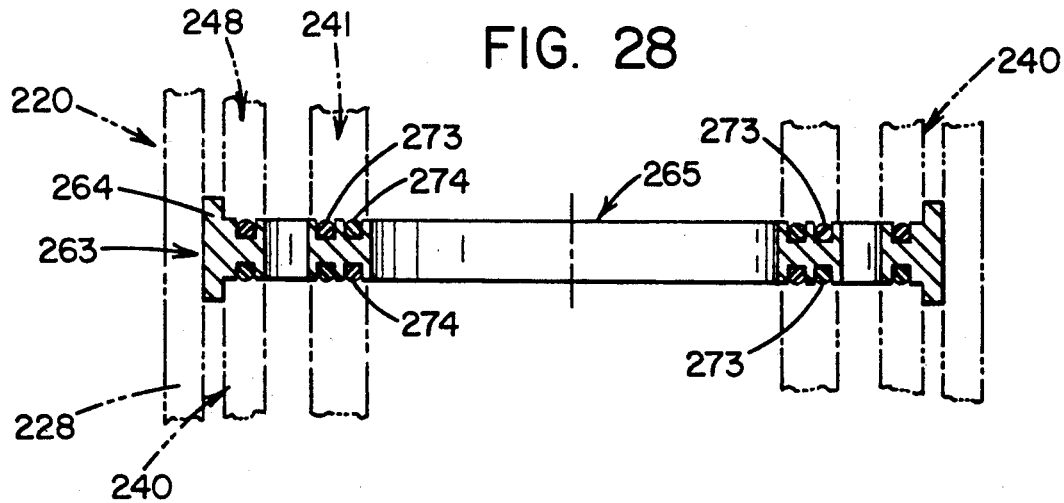

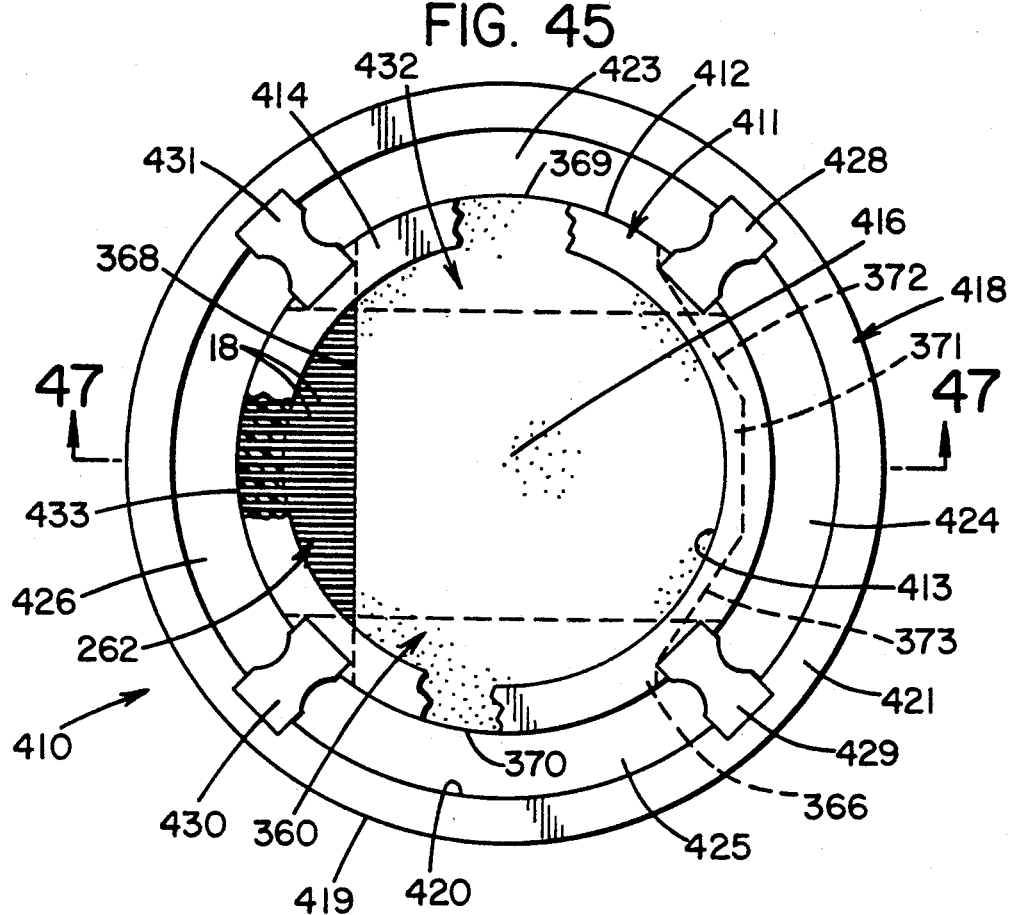
FIG. 45
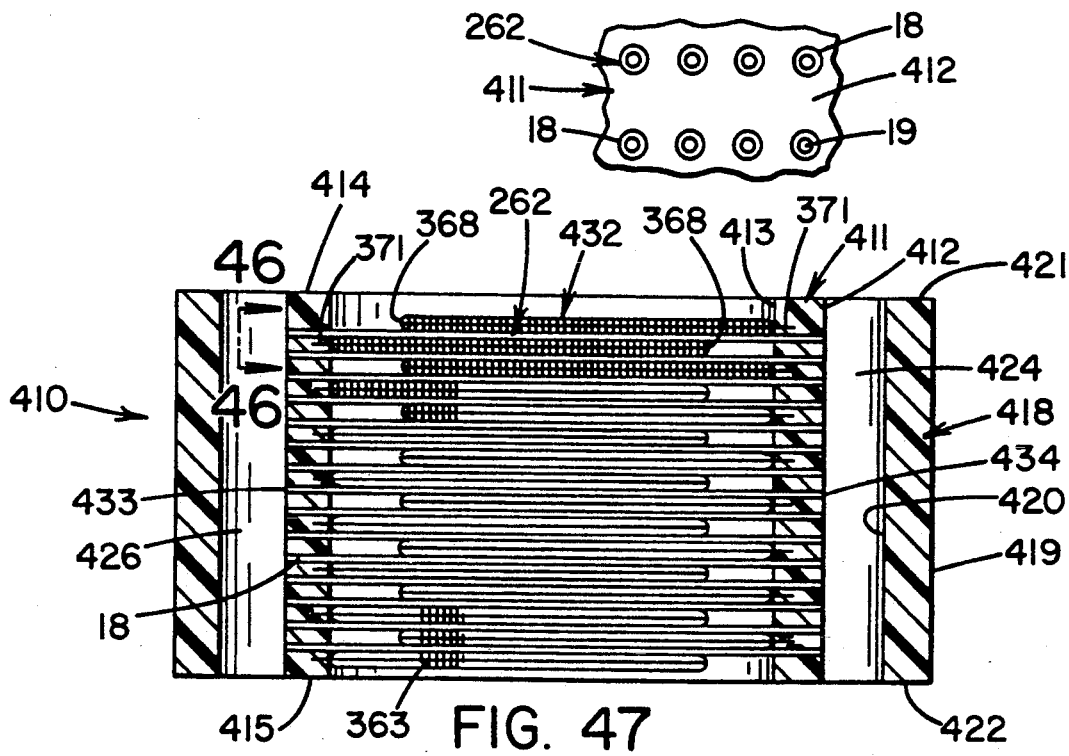
FIG. 46
FIG. 47

APPARATUS FOR SEPARATION AND FOR TREATMENT OF FLUID FEEDSTREAMS, WAFERS FOR USE THEREIN AND RELATED METHODS

CROSS REFERENCE TO RELATED APPLICATIONS

The present application is a continuation-in-part of U.S. Ser. No. 328,335, filed Mar. 24, 1989, now U.S. Pat. No. 4,959,154.

TECHNICAL FIELD

This invention relates generally to an apparatus or module, employing a plurality of wafers in axial alignment for the separation and/or treatment of fluid feedstreams and other materials. More specifically, the invention relates to the use of a plurality of wafers coaxially disposed and compressed within a module having at least three ports for admitting and discharging a fluid and ports for the separation and/or treatment of the fluid or a component thereof. A second and third fluid may be admitted and discharged through additional ports than those associated with the first fluid.

Various wafers are also provided carrying layers of hollow fibers or porous tubes coated with semipermeable materials and optionally, non-porous tubes for the passage of heat exchange medium. Other wafers can contain a plurality of short sleeves of membrane sheets wrapped around a porous support and a plurality of hollow fiber membrane layers, the hollow fibers of each layer being arranged in parallel alignment which run chord-wise across the wafer. The ends of each porous support layer or hollow fiber layer terminate at the exterior surface of the wafer or at the exterior surface of an inner peripheral wall, through which the permeate or the first fluid flows or through which the second or third fluids flow. As will become more apparent hereinbelow, the wafers employ relatively short members in the layers which are no greater in length than the diameter of the wafer which is, in turn, significantly less than the overall length of the separation module.

The apparatus is useful in microfiltration applications and can be employed for the separation of gases, liquids and mixtures thereof, hereinafter referred to as fluid feedstreams. Additionally, methods can be practiced for the treatment of feedstreams which permit removal of components, reaction of components and, addition of components to the feedstream. Finally, methods are provided which can be adapted for the manufacture of the various wafers.

BACKGROUND OF THE INVENTION

The use of membranes in various forms, such as sheets and hollow fibers, for the separation of fluids to obtain a desired portion of the fluid is well known. Generally, one or several components of the feed fluid permeate through the membrane and are collected as the permeate portion. The portion of the fluid that cannot pass through the membrane, the retentate, is retained and discharged as fresh portions of the fluid to be separated are supplied to the membrane.

Membrane separation modules have been of two different types, hollow fiber and sheet membrane. The modules of the present invention may be either of the former type or a combination of the two types. To date, the two most common configurations for sheet membrane modules have been of the plate and frame type or of the spiral wrap type.

In the plate and frame configuration, a sheet of membrane material is compressed between two rigid frames which hold it flat, provide support against the differential fluid pressure, and provide fluid flow ports to direct the fluid streams across the membrane surface. The plate and frame design requires a large number of components, with commensurate costs, per unit of membrane area. Sealing the frames against the membranes to achieve a tight seal without damaging the membrane is a problem.

U.S. Pat. No. 3,684,097, for instance, provides a plate and frame device for oxygenating or dialyzing blood which includes a pair of frames having rectangular openings and a gas permeable membrane on each face. A plurality of frames are stacked upon each other in substantial contact to define a thin blood film flow space therebetween.

U.S. Pat. No. 4,115,274 is directed toward a reverse osmosis desalinating apparatus which employs a series of porous discs, each covered on both sides by a membrane. The discs are compressed at their edges between pairs of module plates which are arranged in stacks. Alternate module plates in the stack are rotated through 180° to provide a zig-zag flow path. Desalinated water enters the porous discs by reverse osmosis and flows radially outward for collection.

U.S. Pat. No. 4,735,718 is directed toward a multilayer membrane separator for the filtration of liquids. The separator provides at least two membrane units, each unit having first and second membrane sheet layers adhered to a filtrate spacer layer. First and second retentate spacers are in direct contact with first and second membranes, respectively and provide a plurality of channels for passage of filtrate and retentate.

In the spiral wrap configuration, a sheet of porous support material is enclosed is a long sleeve of sheet membrane. The sleeve is typically formed by folding a web of membrane over a web of porous support material then sealing the two edges of the membrane. The long section of sleeve is then rolled into a spiral so that a fluid to be treated can flow from one edge of the spiral to the other in the axial direction. The permeating fluid flows within the spiral sleeve and is collected by a permeate manifold at the center of the spiral. The spiral wrap design requires the permeate to flow around inside the spiral sleeve and through the porous support material for considerable distances. This results in performance penalties caused by a significant permeate pressure drop. The seal between the end of the membrane sleeve and the permeate discharge manifold is difficult to make reliably. The end of the membrane sleeve must be sealed and both the sleeve and the side seals are unprotected in the feed fluid stream. These sheet-to-sheet seals must remain tight for the life of the module. Membrane damage during the wrapping process and during subsequent shifting of the wrap are potential problems.

Membranes formed as hollow fibers or tubes are also used readily as they are inherently strong to resist filtration pressure, they provide high surface area to volume ratios and, they can be particularly arranged in various mechanical mountings. Conventional separation modules are configured as long cylinders with the hollow fibers arranged in an axial direction and terminated by plugs of potting material. One or both plugs are sliced to expose the open fiber ends and permit the flow of the permeate from the lumen of the tubular fiber.

In the existing devices, the fluid to be separated may be supplied to the outside of a fiber and the permeate may be collected from the lumen of the fiber. Alternatively, the fluid to be separated may be supplied to the lumen of the fiber and the permeate drained from outside of the fiber.

Hollow fiber membranes may be conveniently mounted in annular or similar frames or retainers having a continuous perimeter and an open central portion. The fibers are strung across the open central portion of the frame and the ends are embedded in the retainer thereby forming a wafer. The ends of the fibers are exposed at the outside surface of the retainer, giving access to the interior of the fibers, while the outside surfaces of the fibers are accessible in the open central portion of the retainer.

In order to obtain relatively high volume separation rates, membrane wafers are generally stacked coaxially so that the retainers bear on each other in sealing contact. Tight sealing of adjacent wafers is essential to avoid contamination of retentate and permeate. To achieve desirably high volume separation rates, the pressure of the fluid being subjected to the separation process is as large as possible. However, the fluid pressure is limited by the mechanical strength of the fibers, so that they are neither crushed nor ruptured, depending upon the direction of the pressure differential. The operating pressure is also limited by the fluid forces that tend to force the wafers apart, threatening the sealing engagement of adjacent wafer retainers.

Such membranes and corresponding separators incorporating the membranes are disclosed in various patents and application. U.S. Pat. No. 3,993,816, for instance, describes an apparatus in which the interiors of the hollow fibers are connected to the exterior of the container so that either fluid permeate flows out of the apparatus or, in the event of fluid exchange, a second fluid flows in through the interiors of the fibers.

U.S. Pat. No. 4,752,305 provides a hollow fiber device for separating fluids and a related method. The device employs a bundle of fibers, oriented axially of the housing. The fluid feedstream is fed through the center of the bundle by a distributor tube, one end of which is plugged. The permeate fluids flow out of each end, via outlets, while the retentate is drawn from another outlet.

French Pat. No. 2,222,134 discloses a module separator wherein the wafers comprise a fabric placed in a tube perpendicular to the direction of flow so that the openings of the hollow fibers are located around the periphery.

Japanese Pat. No. 56-28031 discloses a hollow fiber membrane separator consisting of a hollow fiber tube plate formed by use of a synthetic resin which fixes and integrates the ends of the hollow tubes, and a channel for fluid flow outside of the hollow tubes. The tube plate is disposed such that the flow direction of the fluid outside of the tubes is perpendicular to the longitudinal axis of the hollow fiber tubes.

Finally, in German Pat. No. 2,650,341 a hollow fiber wafer is disclosed for use in a separator in which the hollow fibers are arranged in planes with an essentially non-parallel arrangement, essentially perpendicualr to the flow direction of the substance to be separated.

While the aforementioned art discloses some of the ways in which sheets of semipermeable membranes or hollow fibers may be employed in a separator apparatus, it is nonetheless desirable to provide a novel wafer element providing a plurality of sheet membrane sleeves and/or hollow tube layers, as well as a separation module, employing a plurality of such wafers in which the seals between adjacent wafers in the stack are maintained. Furthermore, it is desirable that the apparatus respond to changes in the fluid inlet pressure by altering the compression forces applied to the wafer stack to aid the sealing engagement of adjacent wafer retainers.

Additionally, it is desirable to provide multi port modules having three, four, six or more ports employing a variety of different types of sheet membrane sleeves and/or hollow members including hollow fiber materials of different permeabilities, porous tube members supporting semipermeable membrane materials and non-porous tubes useful for carrying heat exchange medium. Such modules have utility in a variety of methods which can be employed for separations, additions to the feedstream and reactions of feedstream components as will be explained in greater detail hereinbelow.

DISCLOSURE OF THE INVENTION

It is, therefore, an object of the present invention to provide a multi port apparatus for the treatment of fluid feedstreams containing a plurality of radial hollow fiber wafers wherein the lumens of the hollow fibers communicate with a chamber and opposed side ports.

It is another object of the present invention to provide a multi port apparatus for the treatment of fluid feedstreams containing at least one wafer providing hollow tubes selected from the group consisting of hollow fibers, porous tubes coated with semipermeable materials, uncoated porous tubes, and non-porous tubes.

It is still another object of the present invention to provide a multi port apparatus for the treatment of fluid feedstreams containing at least one wafer having transverse sheet semipermeable membrane sleeves and layers of hollow fibers, each of said sheets and said layers communicating with opposed pairs of chambers.

It is yet another object of the present invention to provide wafers for use in a multi port apparatus for the treatment of fluid feedstreams which wafers each separately comprise a complete, integral unit which does not require additional steps of assembly subsequent to manufacture.

It is another object of the present invention to provide a multi-chambered wafer for use in a multi port apparatus for the treatment of fluid feedstreams which can be assembled in a variety of sizes from smaller wafers. Each wafer can be individually tested during assembly and can be readily removed should it fail during use.

It is still another object of the present invention to provide a wafer for use in a multi port apparatus, having a plurality of bore fluid chambers, for the treatment of fluid feedstreams.

It is another object of the present invention to provide wafers employing layers of transverse sheet semipermeable membrane sleeves and of hollow fibers.

It is another object of the present invention to provide methods for the manufacture of the wafers of the present invention.

It is yet another object of the present invention to provide methods for the treatment of fluid feedstreams employing apparatus containing at least one wafer providing layers of hollow fibers.

It is still another object of the present invention to provide methods for the treatment of fluid feedstreams as above which allow materials to be transferred between the wafers and the feedstream. Such transfers include the removal of feedstream components, treatment of feedstream components and addition of materials to feedstreams.

It is still another object of the present invention to provide methods for the treatment of fluids in multi port apparatus employing at least one wafer comprising transverse sheet membrane sleeves and layers of hollow fibers, which allow materials to be transferred between the wafers and the feedstream.

In general, the present invention provides an apparatus for the separation of a fluid feedstream into permeate and retentate portions comprising a plurality of hollow fiber separation wafers, each wafer comprising a mat of hollow fibers arranged chord-wise of the wafer, peripheral support means encompassing the ends of the hollow fibers and having outside, upper and lower surfaces and annular groove means in the outside surface contiguous with the upper and lower surfaces; band means received in the groove means whereby the lower surface of one wafer is fastened to the upper surface of an adjacent wafer; vessel means providing a first port for receiving the feestream fluid, a second port for withdrawing the retentate and a third port for withdrawing said permeate; means for compressing the plurality of wafers in axial alignment; and permeate chamber means within the vessel, separated from the feedstream and the retentate by the means for compressing and the support means.

Another apparatus for the separation of a fluid into permeate and retentate portions comprises at least one hollow fiber separation wafer, each wafer comprising a mat of hollow fibers in a plurality of layers, each layer having a plurality of hollow fibers in adjacent, parallel alignment and two parallel edges formed of fiber reinforcement and, peripheral support means encompassing the ends of the hollow fibers and the parallel edges formed of fiber reinforcement; vessel means providing a first port for receiving the fluid feedstream, a second port for withdrawing the retentate and a third port for withdrawing the permeate; means for compressing at least one wafer within the apparatus; and permeate chamber means within the vessel, separated from the feedstream and the retentate by the means for compressing and the support means.

A multi port apparatus for the treatment of fluid feedstreams comprises at least one wafer, each wafer comprising a central area providing a plurality of members arranged in a plurality of layers and peripheral support means encompassing the central area; chamber means generally encompassing the peripheral support means and communicable with the central area; vessel means carrying the chamber means and providing first and second ports into and out of the vessel means; and a plurality of separate bore fluid port means communicating with the chambers means; means for dividing the chamber means into a like plurality of separate chambers, each chamber means being communicable with a bore fluid port means; and means for compressing at least one wafer within the vessel.

Another multi port apparatus for the treatment of fluid feedstreams is also provided. It comprises at least one wafer, each wafer comprising a central area providing a plurality of members arranged in a plurality of layers; first peripheral support means encompassing the central area and having upper and lower surfaces; second peripheral support means, having upper and lower surfaces and carried radially outwardly from the first peripheral support means; and a plurality of separate bore fluid chambers defined between the first and second peripheral support means and communicable with the central area; vessel means providing first and second ports into and out of the vessel means, and a like plurality of separate bore fluid port means communicating with the plurality of separate bore fluid chambers; and means for compressing at least one wafer within the apparatus.

The present invention also provides wafers. A multi-chambered wafer comprises a central area providing a plurality of members arranged in a plurality of layers; first peripheral support means encompassing the central area; second peripheral support means carried radially outwardly from the first peripheral support means; and a plurality of separate bore fluid chambers defined between the first and second peripheral support means and communicable with the central area.

A wafer for use in an apparatus providing a plurality of separate chambers in communication with the wafers comprises peripheral support means having an outside surface communicable with the separate chambers; and a central area providing a plurality of members arranged in a plurality of layers and opening into opposed pairs of the separate chambers.

The present invention also provides a method for the manufacture of multi-chambered wafers having outer and inner peripheral walls and a central area providing a plurality of members arranged in a plurality of layers comprising the steps of providing a rotatable mold, partially closed at the top by a slinger plate; placing a plurality of partition blocks into the mold; rotating the mold at high speed while pouring a first quantity of a first solidifiable liquid onto the slinger plate to form a first annular ring within the mold; subsequently pouring a first quantity of a second solidifiable liquid onto the slinger plate to form the outer peripheral wall and encompass one end of the partition blocks; stopping the rotation of the mold and placing the plurality of layers within the mold in alternating layers; rotating the mold again while pouring a second quantity of the first solidifiable liquid onto the slinger plate to form a third annular ring within the mold, encompassing the ends of the layers; subsequently pouring a second quantity of the second solidifiable liquid onto the slinger plate to form the inner peripheral wall, encompassing the other end of the partition blocks and a portion of the layers; stopping the rotation of the mold and removing the product therefrom; and removing the first and third annular rings to yield the wafer having for a plurality of separate bore fluid chambers between the outer and inner peripheral walls.

Another method for the manufacture of separation wafers having an outer peripheral wall and a plurality of members arranged in a plurality of layers comprises the steps of providing a rotatable mold, partially closed at the top by a slinger plate; placing the plurality of layers within the rotatable mold in alternating layers; rotating the mold at high speed while pouring a first solidifiable liquid onto the slinger plate to form a first annular ring within the mold encompassing a portion of the layers; pouring a second solidifiable liquid onto the slinger plate to form the outer peripheral wall, encompassing a greater portion of the layers; stopping the rotation of the mold and removing the assembly of components therefrom; and removing the first ring and the layers encompassed therein from the outer peripheral wall whereby a portion of the layers passes through the peripheral wall and opens to the exterior of the wafer.

At least one or more of the foregoing objects together with the advantages thereof over other known apparatus, components and related methods which shall become apparent to those skilled in the art are described in greater detail with reference to the drawings and specification which follows:

BRIEF DESCRIPTION OF THE DRAWINGS

FIG. 21 is a section, similar to FIG. 20, depicting a different fiber orientation;

FIG. 24 is a section, taken substantially along the lines 24—24 of FIG. 22, depicting the chambers of a four-chambered wafer according to the present invention;

FIG. 25 is a side elevation, taken substantially along the lines 25—25 of FIG. 24;

FIG. 26 is an enlarged end view, taken along the lines 26—26 of FIG. 25, depicting the arrangement of hollow fibers in adjacent layers;

FIG. 27 is a section, taken substantially along the lines 27—27 of FIG. 22; depicting a removable seal ring for use between adjacent four-chambered wafers;

FIG. 28 is a cross-section of the removable seal ring depicted in FIG. 27;

FIG. 37 appears on the same sheet with FIG. 21 and is a section through a six port module, similar to FIG. 31, but depicting yet another embodiment of a wafer;

FIG. 45 is a section of a wafer containing transverse sheet membrane sleeves and hollow fibers depicting the chambers of a four-chambered separation wafer according to the present invention;

FIG. 46 is an enlarged end view, taken along the lines 46—46 of FIG. 47, depicting the arrangement of hollow fibers in adjacent layers;

FIG. 47 is a side elevation, taken substantially along the lines 47—47 of FIG. 45;

PREFERRED EMBODIMENTS FOR CARRYING OUT THE INVENTION

Figure 1:
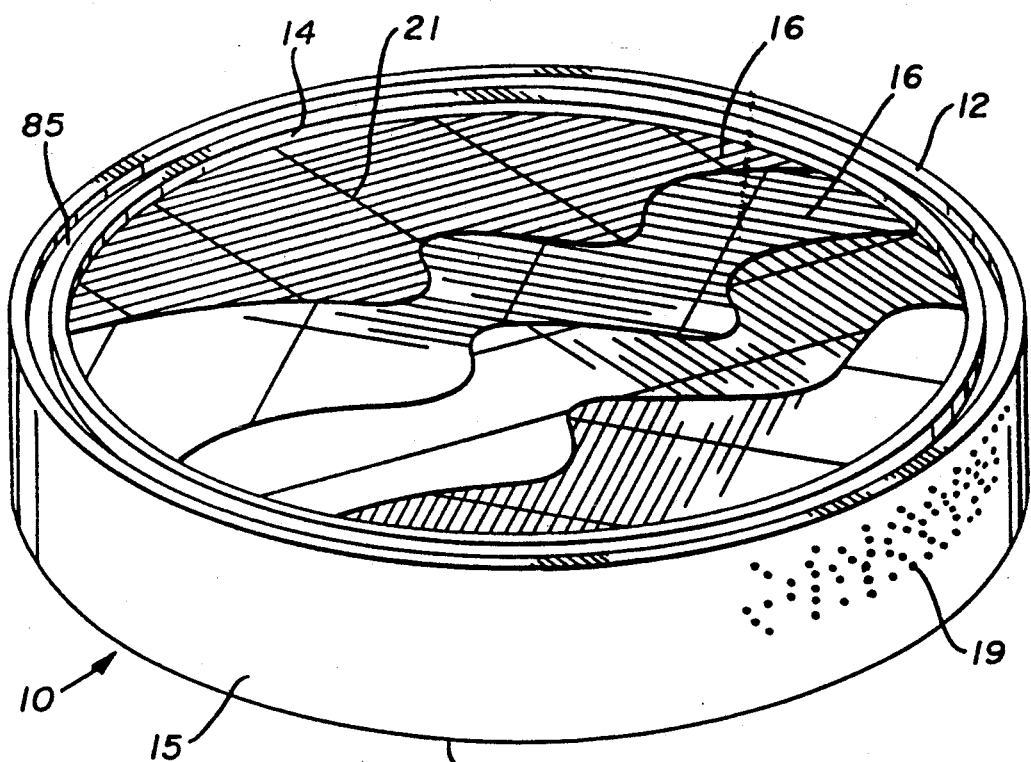
FIG. 1 is a perspective view of a wafer member of the present invention, partially broken away to show the individual hollow fiber layers.

The basic component of the various separation and treatment apparatuses of the present invention is a cylinder hereinafter referred to as a wafer. One such wafer, 10, depicted in FIG. 1, comprises an outer annular potting ring 11 having upper and lower surfaces 12 and 13, respectively, an inner and outer cylindrical surfaces, 14 and 15, respectively. A plurality of layers 16 of hollow fibers 18 are stacked within each ring 11, the ends 19 of which are mounted within the ring 11 and terminate at the outer surface 15.

Figure 3B:
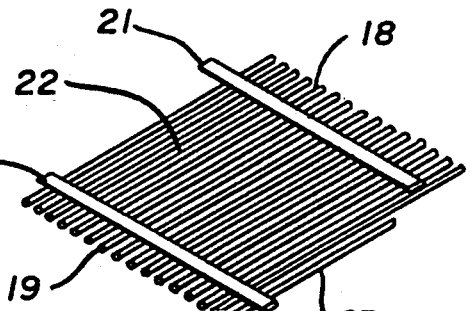
FIGS. 3A-3C are perspective views of several hollow fibers taken from a layer of fibers and depicting alternative means by which they can be joined together to form a layer.
Figure 3C:
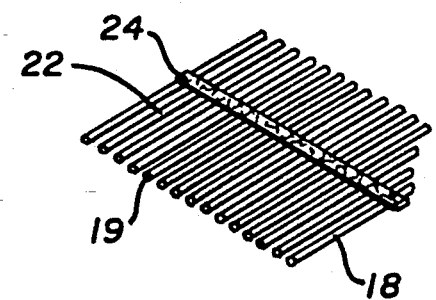
Figure 3A:
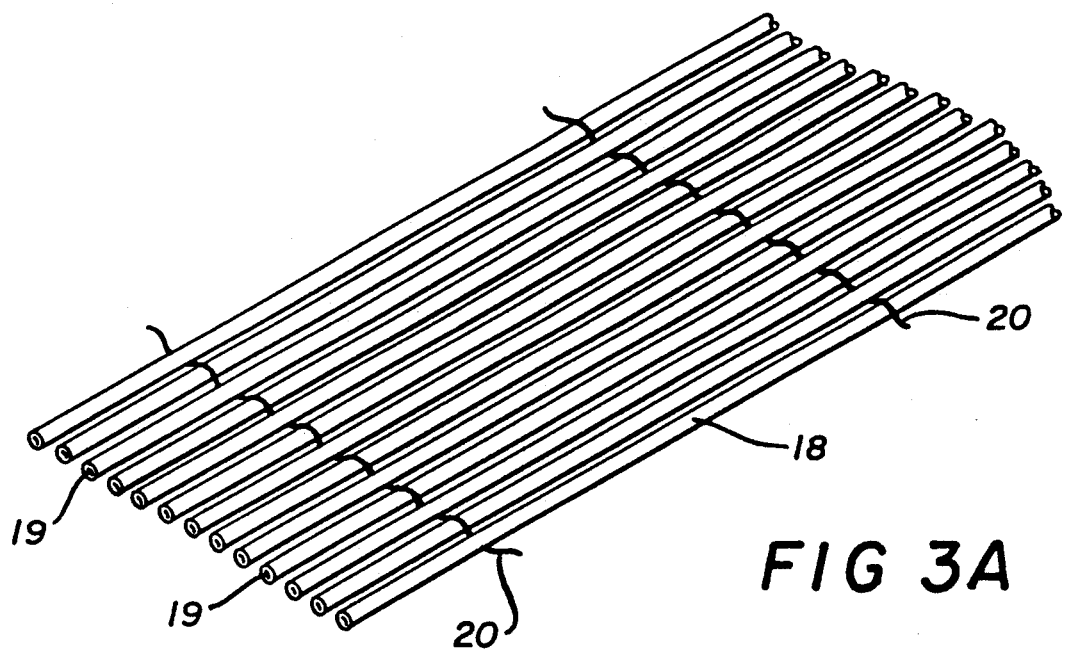

The construction of each layer 16 is preferably a woven mat of fibers with the hollow fibers 18 running parallel to one another in the woof direction and held together by filaments 20 in the warp direction, as depicted in FIG. 3A. The hollow fibers 18 are preferably woven by the warp filaments 20 which are a thinner, non-hollow fiber thread such as nylon, polyester or the like. The objects are for each layer 16 to form a flat sheet and that the hollow fibers 18 be parallel and as straight as possible, not woven or twisted relative to the warp filaments 20.

The hollow fibers of each layer 16 can also be affixed together with a suitable adhesive coated filament 21 on the upper or under sides 22 and 23, respectively, or both, of each layer 16, as depicted in FIG. 3B. Alternatively, a thin bead of adhesive 24 can be employed to tie the fibers 18 together, as depicted in FIG. 3C.

As should be apparent from the drawings, the hollow fibers 18 are arranged chord-wise, or perpendicular to the wafer, and the layers 16 are arranged either in parallel alignment or at cross-wise angles as depicted in FIG. 1 to provide a dense mat 25, through which a fluid, gas or liquid may flow axially. In operation, a feed stream is passed axially through the mat 25, i.e., through the wafer 10. As the fluid contacts the hollow fibers 18, some components pass through the hollow fiber 18 into the lumen and then flow out to the perimeter of the wafer where they (the permeate) are discharged from the open ends 19 of the fibers. Meanwhile, the retentate flow passes axially through the mat and wafer for collection or passage into another wafer therebelow.

With respect to the composition of the hollow fibers, substantially any hollow fibers currently available, or which may subsequently become available, can be employed. Inasmuch as the composition and preparation of hollow fibers for the separation of a variety of gas mixtures and liquid mixtures, is well known to those skilled in the art, a detailed description thereof is not provided herein, it being understood that the present invention is not limited to any specific hollow fiber composition or method of preparation or fabrication.

Figure 4:
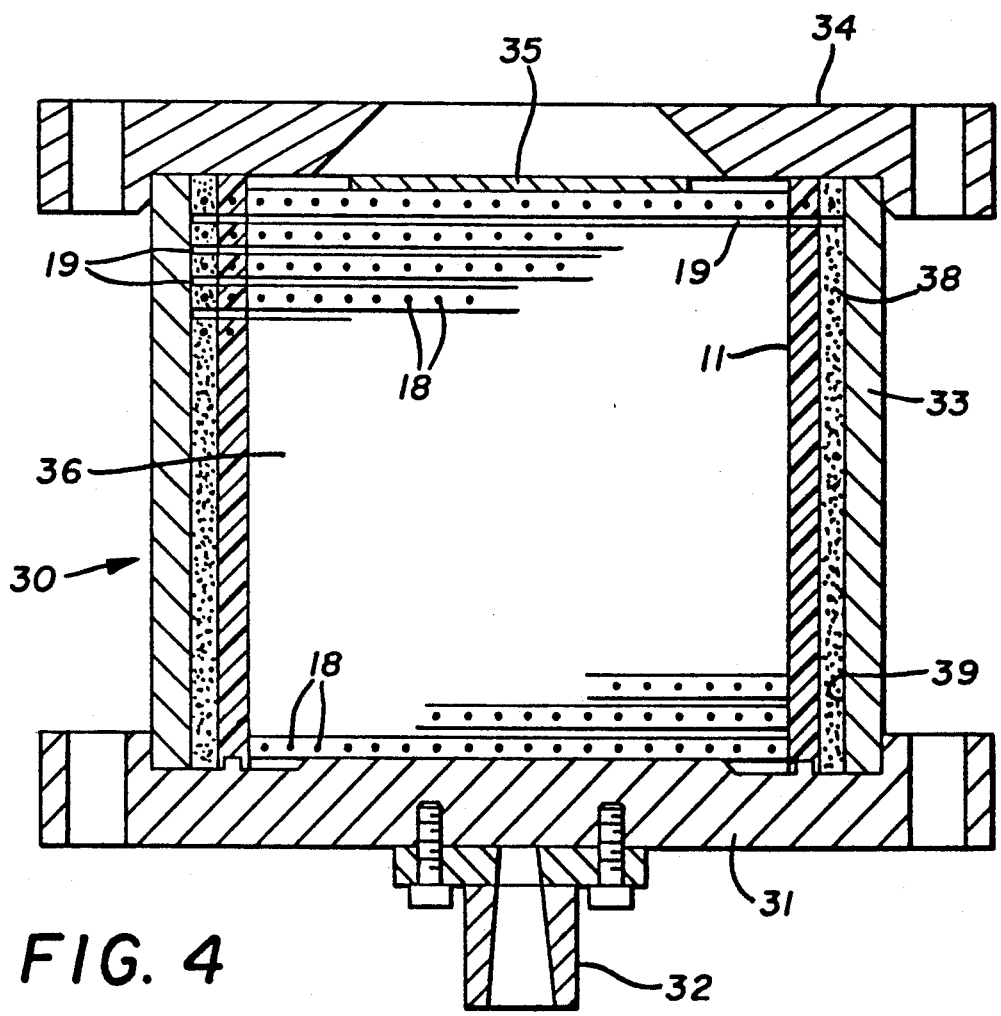
FIG. 4 is a side elevation, in cross-section, of a mold for fabricating the wafer member of the present invention and depicting the formation of a wafer therein.

The wafers 10 are manufactured by a potting technique utilizing a centrifuge. With reference to FIG. 4, a mold 30 is provided which comprises a bottom section 31, fastened to the spindle 32 of a centrifuge (not shown), a side mold section 33, a top mold section 34 and a slinger plate 35.

To fabricate a wafer, a plurality of hollow fiber layers 16 are cut to the dimension of the mold interior 36 and placed therein. The mold is then closed and rotated while a layer of a first solidifiable liquid such as melted wax, a quick setting epoxy or the like, is poured onto the slinger plate 35. During rotation, the liquid is cast centrifugally and, as is apparent from FIG. 4, the resin flows down through the layers of hollow fibers to become deposited in an annular ring 38 against the inner mold wall 39 which encompasses the ends of the fiber layers 16. Next, a potting resin is poured onto the slinger plate. It too is cast centrifugally and flows down through the layers of hollow fibers to form the annular ring 11 of the wafer, the outer diameter of which is defined by annular ring 38, while the inner diameter is formed by the amount of resin provided.

After the potting resin has set and the ring 11 has formed, the wafer 10 is removed from the mold 30. At this stage, the first annular ring 38 is removed by cutting, grinding or melting away flush with the outer circumferential edge 15 of ring 11. This leaves a plurality of hollow fiber ends entirely around the edge, some of which are perpendicular to the edge while others are angled or even parallel thereto. In this manner, all fiber ends 19 are open at the exterior of wafer 10.

Although not shown, it may be desirable to truncate the layer 16 along the opposite sides that are tangential to the ring 11 because they are otherwise not exposed to any feedstream material and hence wasted. Of course, the hollow fibers that are exposed within the ring 11 will extend through the ring 11 and open to the exterior face 15.

Figure 5:
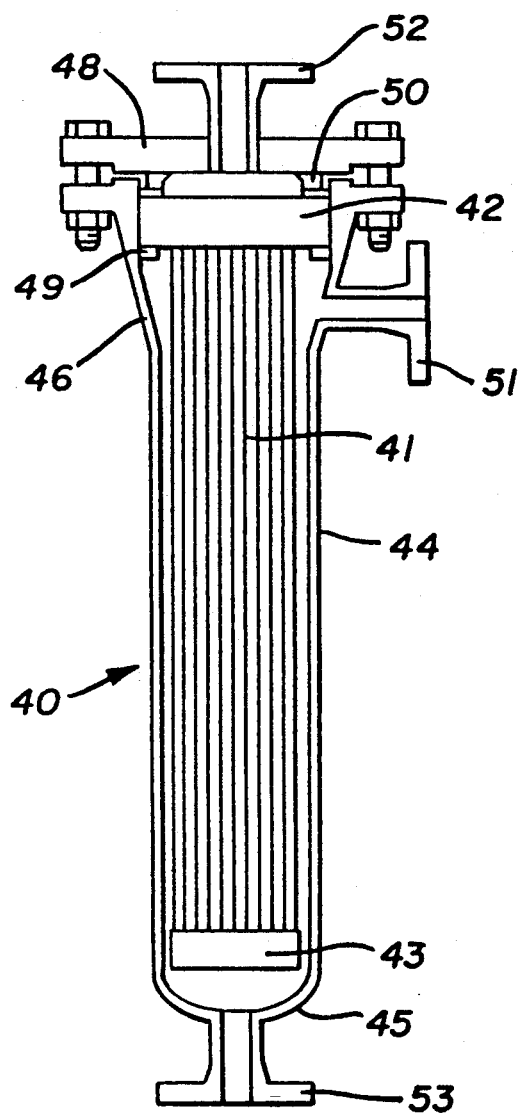
FIG. 5 is a side elevation, partially in section, of a hollow fiber separation module of the prior art.

An advantage attributable to the use of wafers 10 is their relatively short, chord-wise disposed fibers. Existing hollow fiber apparatus for separating fluid mixtures, employ long, axially disposed fibers within the apparatus or module, as is generally depicted in FIG. 5. Such modules, indicated by the numeral 40, employ a long, continuous bundle 41 of axially disposed fibers. The fibers terminate in flat, disc shaped upper and lower epoxy plugs or tubesheets 42 and 43, respectively, through which the fibers pass and terminate at one or both ends. The bundle is placed within a cylindrical housing 44, having a base 45, upper housing 46 and removable top 48. Typically, the upper housing 46 provides an inner flange 49, upon which the upper epoxy plug 42 is supported. The top 48 may also provide a flange 50 or similar structure engageable with the upper tubesheet 42 to hold the bundle 41 within the module 40.

A port 51, provided in the side of the upper housing is provided as an inlet for the feed stream. Permeate moves axially through the fibers and passes through a port 52 in the top while the retentate flows between the fibers and the port 53 at the base.

While this design is functional, the hollow fibers all terminate axially in the tubesheet 42. The tubesheets present flat surfaces perpendicular to the direction of the pressure differential between the feedstream fluid and the permeate fluid which are very weak to the resistance of pressure forces. Consequently, the diameter of the tubesheet is limited; the tubesheet must be made very thick, or the pressure differential must be limited. The equivalent of the tubesheet for the wafer design of the present invention is the potting ring or tubesheet 11 which is inherently stronger and resistant to the differential pressure forces within the module.

Although the hollow fibers 18 tend to weaken the potting ring 11 by passing therethrough, this effect can be minimized by orienting adjacent layers 16 at crosswise angles and also by truncating the layers, in which instance not as many fibers are passed through the ring 11.

Figure 6:
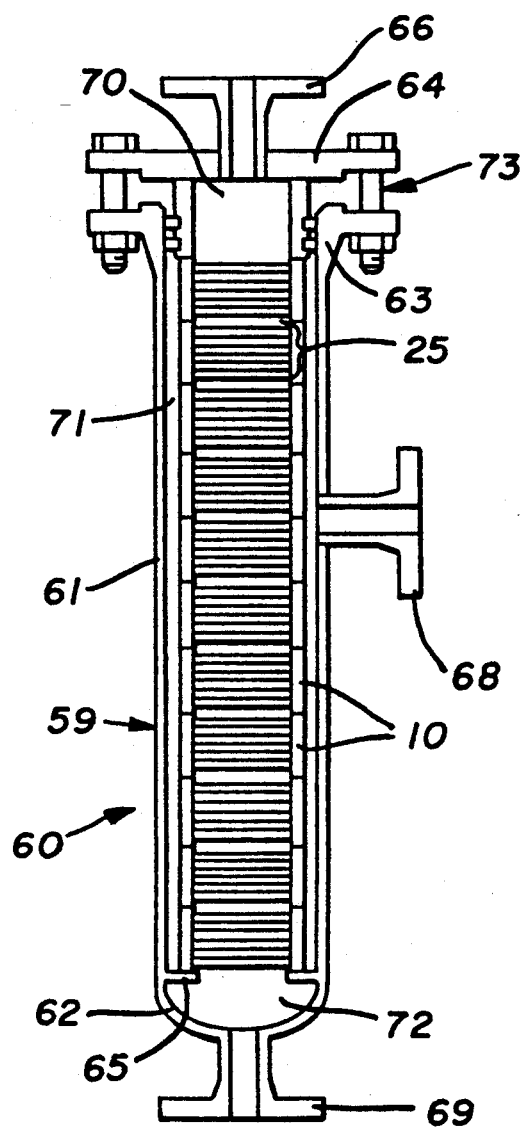
FIG. 6 is a side elevation, partially in section, of a hollow fiber separation module according to the present invention.

The module of the present invention is depicted for comparison in FIG. 6 and is indicated generally by the numeral 60. It employs a vessel 59 which comprises a cylindrical housing 61, base 62, upper housing 63 and removable top 64. Near the bottom of housing 61 a support shelf 65 is provided upon which the wafers 10 are stacked. Module 60 also provides feed, permeate and retentate ports 66, 68 and 69, respectively, as well as feedstream chamber 70, permeate chamber 71 and retentate chamber 72, which will be discussed hereinbelow. Finally, means for compressing the stack of wafers, referred to generally by the numeral 73, are provided. Several variations of the means 73 are depicted in FIGS. 7-11.

Figure 7:
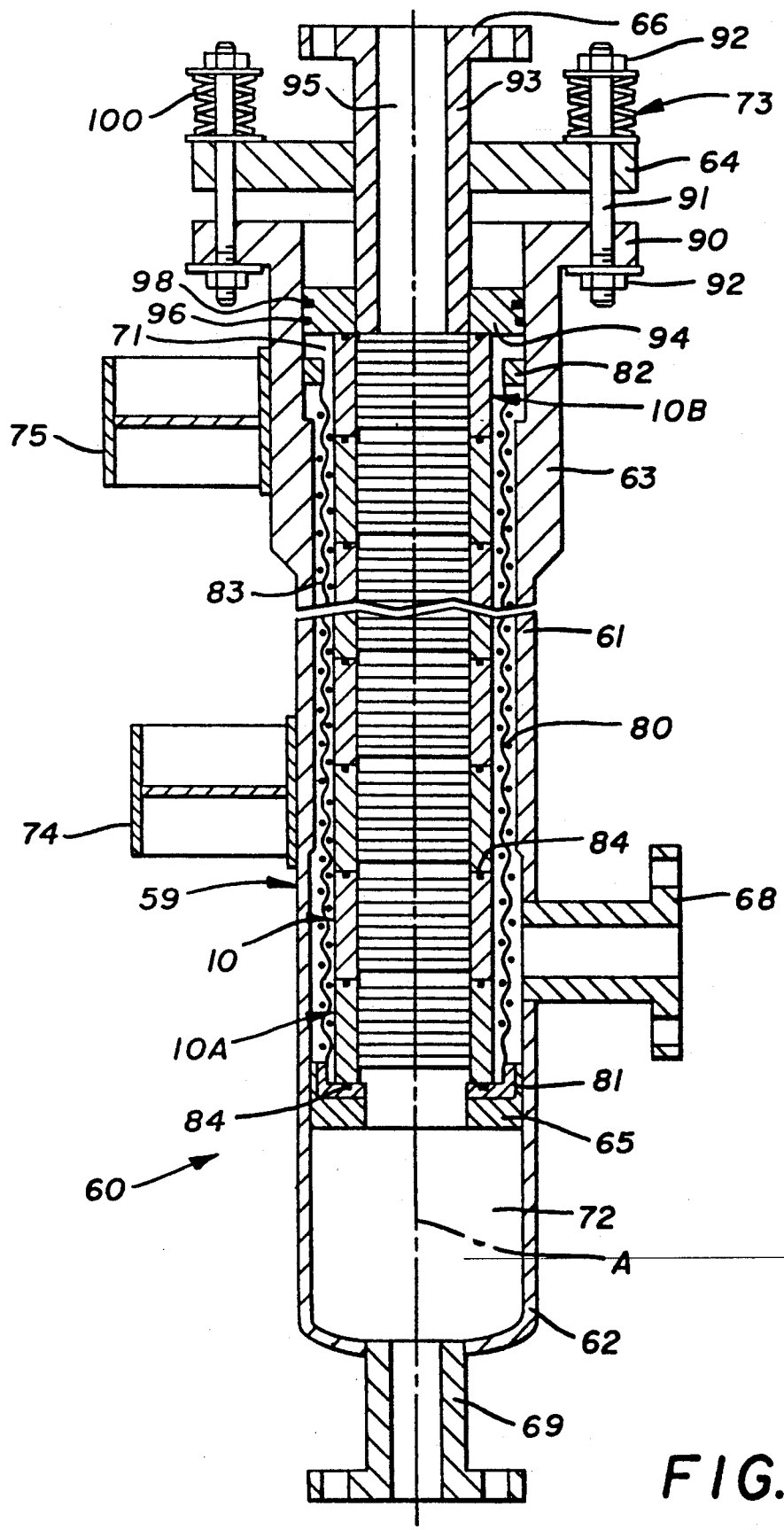
FIG. 7 is a cross-sectional side elevation depicting in greater detail a hollow fiber separation module according to the present invention.

With reference to FIG. 7, the module 60 is depicted in greater detail. The cylindrical housing 61 and base 62 and upper housing 63 are preferably constructed of steel or other metal such as stainless steel. Although they may be manufactured as separate components, they are joined together by welding or other suitable means to form a continuous one-piece module 60, to which the top 64 is affixed. The use of metal of proper thickness is desirable as a safeguard against catastrophic failure of one or more wafers. Saddles 74 and 75 can be affixed to the housings 63 and 61 to mount the module 60 horizontally.

The wafers 10 may be held within cage means 80 which comprises a first ring 81, which actually rests on support shelf 65 at the base, an upper centering ring 82, which fits within the permeate chamber 71 and housing means 63, and an open mesh body 83 that is generally cylindrical for receipt of the wafers 10 and connects the rings 81 and 82 together. The cage 80 not only facilitates insertion and removal of the wafers 10 but also aids in maintaining their axial alignment during assembly of the module 60.

Figure 2:
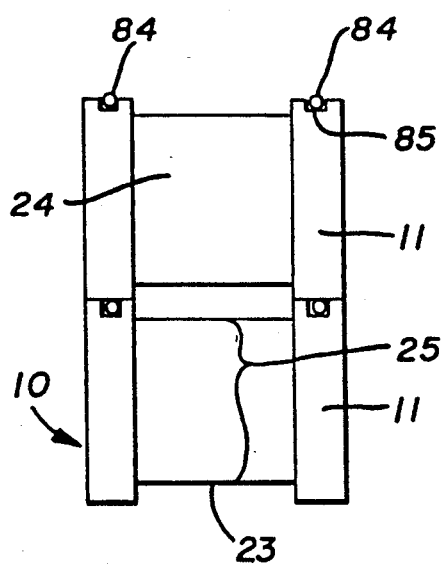
FIG. 2 is a side elevation, partially in section, depicting the stacking of adjacent wafers.

During assembly and subsequent use of the module 60 it is important that the wafers 10 be sealed together to prevent the feedstream from passing between contiguous rings 11 and contaminating the permeate. As best depicted in FIG. 2, this is accomplished by fitting O-rings 84 into recesses 85 in the upper face 12 of each ring 10 as well as on cage ring 81 upon which the lowermost wafer 10A rests.

The wafers 10 are also sealed together by compression means 73 as shall be explained next. An outer flange 90 is part of upper housing member 63 to which the top 64 is affixed by studs 91, which pass through axially aligned bores in flange 90 and top 64, engageable with nuts 92. Feed port 66 is welded or otherwise affixed within top 64 and provides a throat 93 which is affixed at its opposite end to a pusher plate 94. The feedstream (not shown) is fed into the port 66, through an inlet passageway 95, defined by the throat 93, and into contact with the uppermost wafer 10B. In this embodiment, no feedstream chamber is provided. The pusher plate carries at least one O-ring 96 and a metal piston ring 98 to seal the permeate chamber 71 and it rests against the uppermost wafer 10B. Use of a piston ring provides a safeguard where the module 60 is employed with flammable feedstreams. It should be evident that as the top 64 and flange 90 are joined together, the pusher plate 94 urges the stack of wafers firmly against support 65.

In order to accommodate differences in thermal expansion between the epoxy rings 11 of the wafers and the metal housing, a stack of Belleville washers 100 are located above the top 64 and under the uppermost nuts. The washers 100 bias the wafers together when they are partially compressed.

Figure 8:
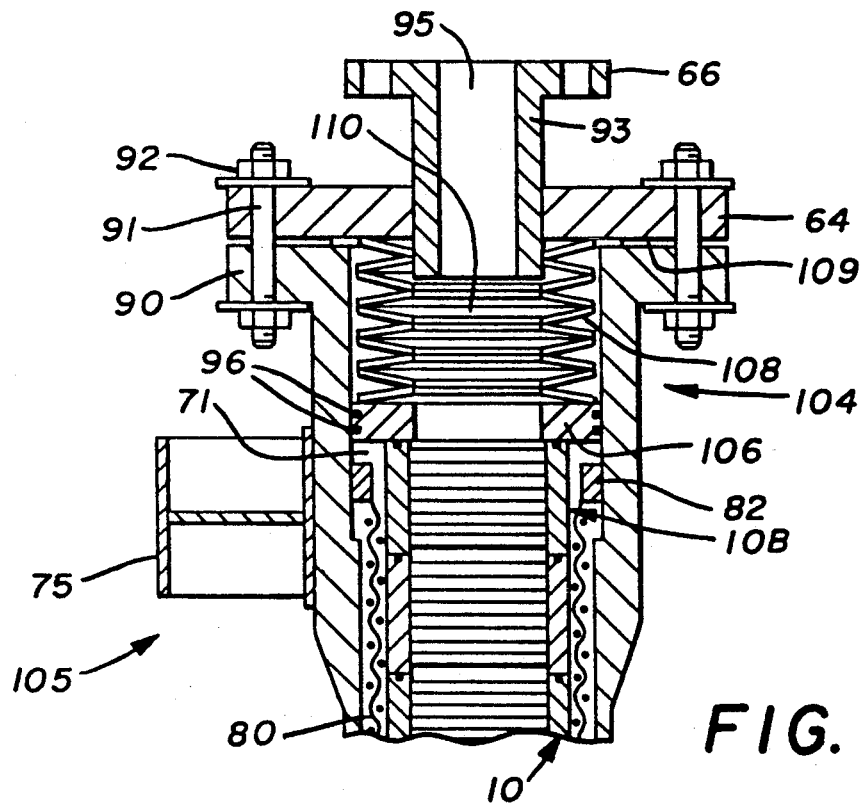
FIG. 8 is a cross-sectional side elevation of the upper portion of an alternative hollow fiber separation module, utilizing a standard piping seal, according to the present invention.

With reference to FIG. 8, an alternative embodiment is depicted by the module 105. Module 105 is essentially identical to module 60 with the exception of the compression means 104 and related upper module components. First, while the throat 93 of port 66 is rigidly affixed to the top 64, it is separately movable with respect to pusher plate 106. Next, a stack of larger Belleville washers 108 is employed between the pusher plate 106 and top 64. In this embodiment a metallic gasket or the like 109 is employed between the top 64 and flange 90 to provide the main seal therebetween. Hence, the pusher plate 106 is provided with O-rings 96. In module 105 a separate feedstream chamber 110 is provided between the inlet passageway 95 and wafers 10. In addition to the force exerted by the Belleville washers, the pressure of the feedstream also exerts an axial force on the wafers 10.

Figure 9:
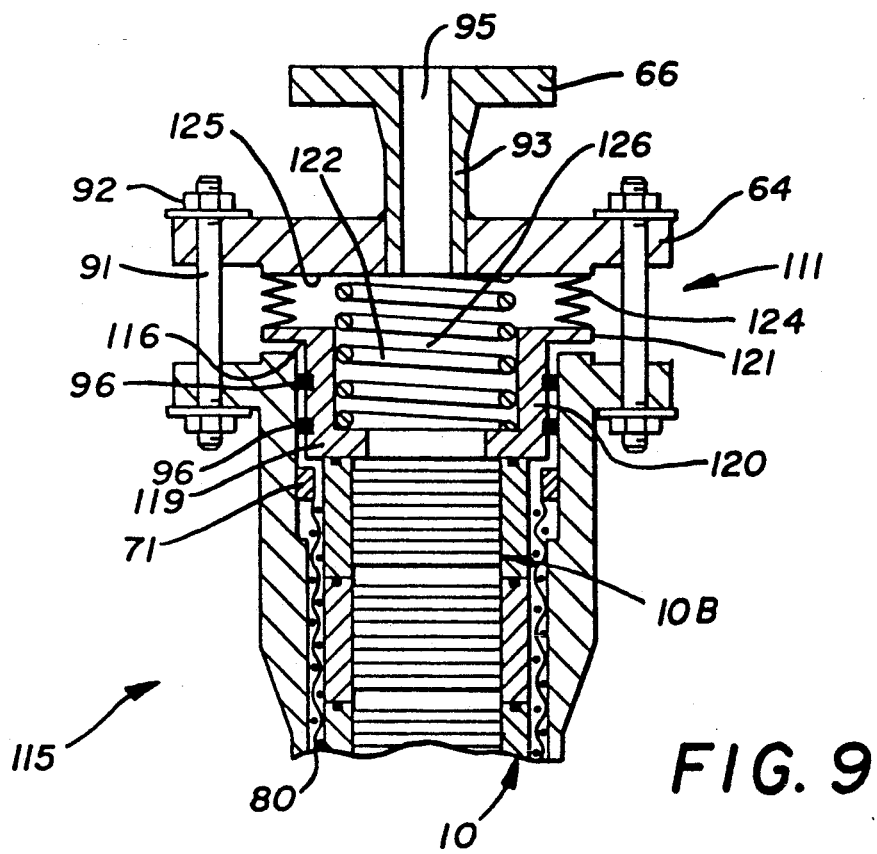
FIG. 9 is a cross-sectional side elevation of the upper portion of an alternative hollow fiber separation module, utilizing a bellows seal, according to the present invention.

An alternative means for sealing the module 115 and the wafers therein is depicted in FIG. 9. Module 115 is again similar to module 60 with the exception of the compression means 111 and related upper module components. This module employs a compression ring 116, rather than a pressure plate, which contains O-rings 96 to seal within permeate chamber 71. Compression ring 116 comprises a base 119 and cylindrical sidewall forming a neck 120 and a radially outwardly extending flange 121 therefrom. The feed port 66 is again joined to the top 64 but does communicate directly with the compression ring 116. A compression spring 122 is received within the compression ring 116 and urges the base 119 against the uppermost wafer 10B as the top 64 is bolted down.

A bellows seal 124 is affixed to the underside 125 of top 64 and the flange 121 of compression ring 116 to enclose a separate feedstream chamber 126 between the passageway 95 and wafers 10. Feedstream fluid exerts pressure on the flange 121 which acts as a larger diameter piston urging downward pressure on the wafers.

Although the modules 60, 105 and 115, described herein have been designed for high pressure uses, encountered during the separation of gaseous feedstreams, a modified vessel can be employed for the separation of liquids as well as gases, wherein lower pressures are usually the norm. Two such designs are provided in FIGS. 10 and 11 to which reference should now be made.

Figure 10:
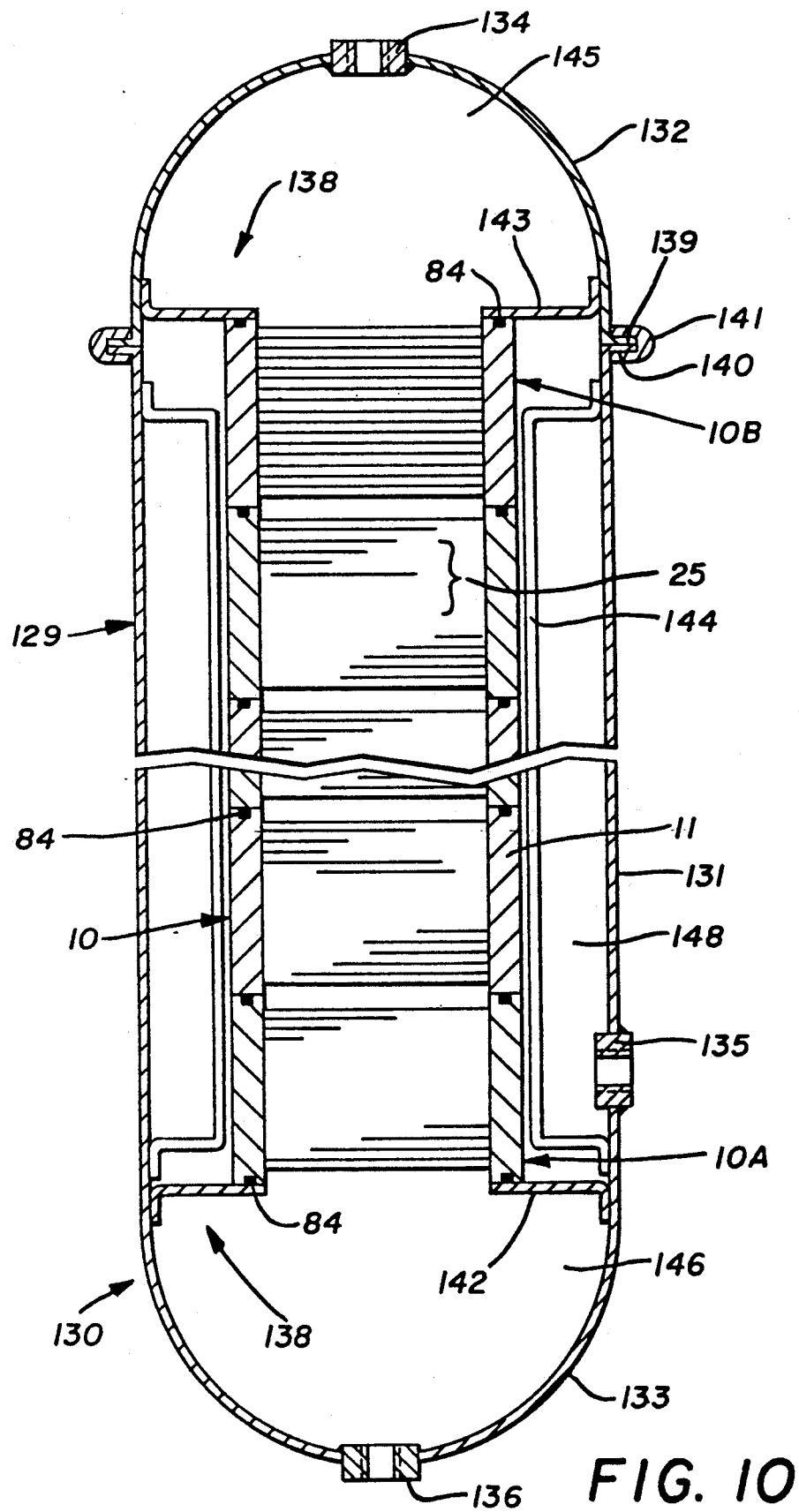
FIG. 10 is a cross-sectional side elevation of an alternative hollow fiber separation module, intended for light weight service, according to the present invention.

The module in FIG. 10, referred to generally by the numeral 130, employs a vessel 129 which comprises a cylindrical housing 131, and hemi-spherical end caps 132 and 133. The components 131-133 are generally thin-walled and can be made out of metal or fiber reinforced plastics. Threaded bosses 134, 135 and 136 are provided as feed, permeate and retentate ports, respectively. Compression means, indicated generally by the numeral 138, are provided within module 130, as described hereinbelow.

The lower end cap 133 can be fabricated as part of the housing 131 or it can be separately fabricated and affixed thereto as is the upper end cap 132. Upper end cap 132, in turn, is provided with an external flange 139, which mates with an external flange 140 provided at the end of housing 131. These two flanges are joined with a suitable mechanical clamping device 141.

Compression means 138 includes a first, bevelled pressure ring 142 which is affixed in a suitable manner such as welding, riveting or the like. The ring 142 forms a base upon which a stack of individual wafers 10 is placed. A second, bevelled pressure ring 143 is a component of compression means 138 and is located in similar fashion within the upper end cap 132. Both rings 142 and 143 are inclined toward each other during rest. However, when the wafers 10 are present and the module 130 is assembled, the rings 142 and 143 are urged apart and, therefore, provide a compressive force against the wafers, keeping them together. A plurality of guide rods 144 are optionally affixed within housing member 131 and serve to center the wafers 10 within the module 130 during assembly. O-rings 84 are provided between the wafers 10, as described hereinabove.

The design of module 130 provides a lightweight module that can be employed where weight is of consideration such as on board an aircraft. As one example of use, air could be fed through the feed port 134 and separated by the wafers into oxygen and nitrogen. Oxygen, the permeate, could be supplied for breathing, while nitrogen, the retentate could be utilized as a blanket over the fuel. The module 130 has in common with the foregoing modules 60 the use of a plurality of wafers 10. The advantage of this construction is that any given wafer that might fail prematurely can be readily replaced by a new wafer.

As should be apparent from the drawing, the feedstream chamber 145 is defined by the upper end cap 132, the pressure ring 143 and the uppermost wafer 10B. Similarly, the retentate chamber 146 is defined by the lower end cap 133, the pressure ring 142 and the lowermost wafer 10A. The permeate chamber 148 resides between chambers 145 and 146, and is defined by the housing walls and the annular rings 11 of wafers 10.

Figure 11:
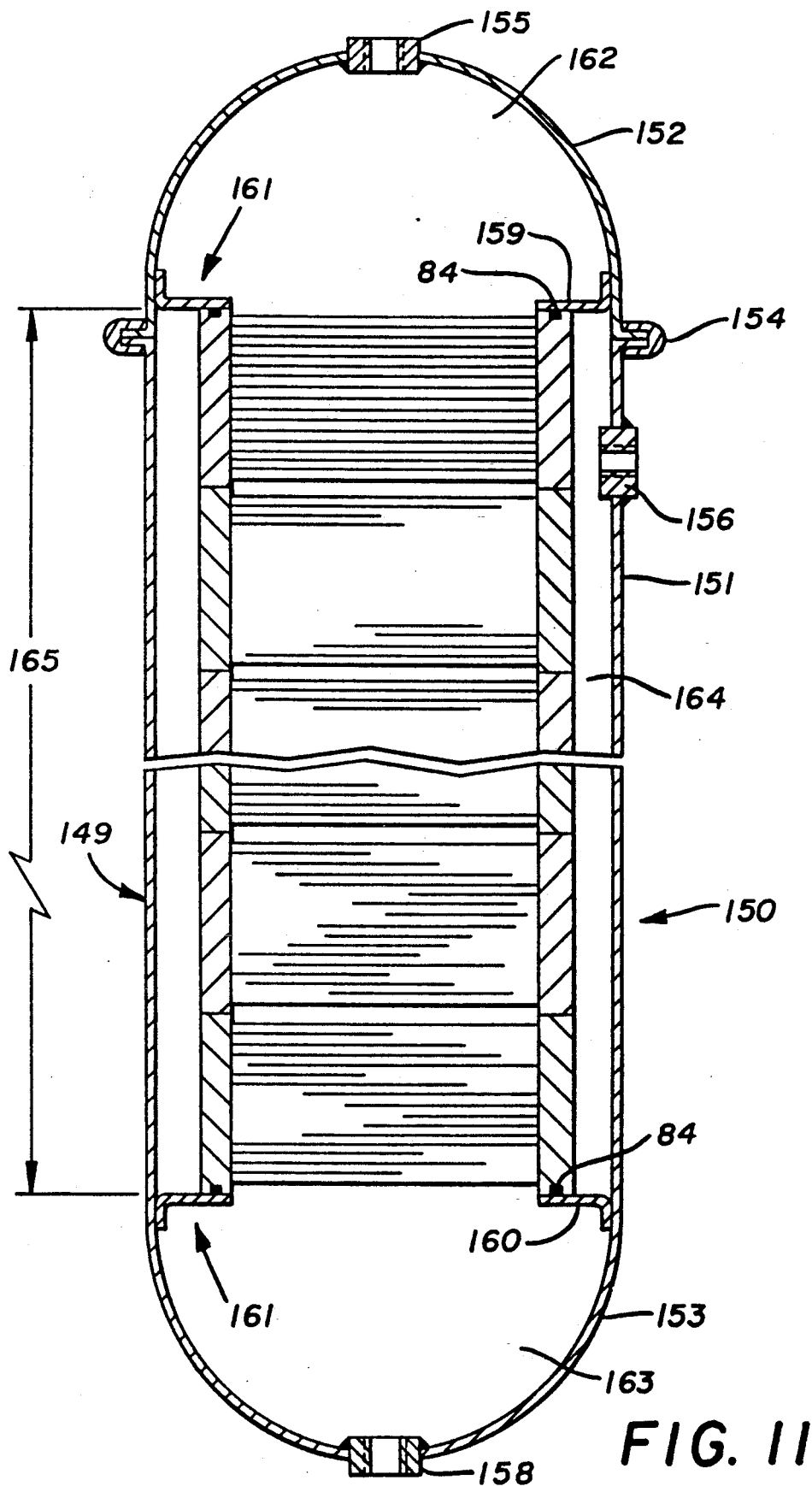
FIG. 11 is a cross-sectional side elevation of another alternative hollow fiber separation module, intended for disposable element service, according to the present invention.

While this design reflects considerable savings over the existing modules employing axial hollow fibers, it may be desirable to provide a disposable module. The module 150 depicted in FIG. 11 provides such a design. It employs a vessel 149 which includes a cylindrical housing 151; upper and lower end caps 152 and 153, respectively, clamp ring 154, feed, permeate and retentate ports, 155, 156 and 158, respectively and upper and lower pressure rings 159 and 160, respectively, which comprise the compression means 161. The module 150 also includes feedstream, retentate and permeate chambers 162, 163 and 164, respectively, comparable to those described in conjunction with module 130.

The fiber stack, referred to by the numeral 165, comprises a plurality of individual wafers 10 which have been secured together by a suitable adhesive (not shown) applied between adjacent faces.

During construction of the module 150, each wafer 10 is individually tested and then added to the stack 165. O-rings can be deleted from between the wafers, as they will be adhered together. Once inside the module 150, the module can be operated until permeate flow becomes contaminated or is too low, then the entire module can be discarded or, in the alternative, the stack 165 can be removed and replaced by a new one.

As should now be apparent, the modules of the present invention employ a stack of individual wafers which contain hollow fibers oriented radially, or chordwise. Because fluid flow pressure losses of the permeate in the fiber lumen are detrimental to the performance of hollow fiber modules, the longer the fiber, the more performance is adversely affected. Thus, a specific improvement in the performance of the module design of the present invention over existing modules employing axial fibers is obtained by the use of the shorter, chordwise fibers.

The present invention also provides a method for the separation of fluid feedstreams into permeate and retentate portions. As noted hereinabove, the fluid that can be separated can include gaseous mixtures or liquid mixtures. For purposes of discussion, the module 60 in FIG. 7 can be considered although it is to be understood that the method can be practiced with any of the other modules, 105, 115, 130 and 150, depicted in FIGS. 8-11.

The fluid feedstream, gas or liquid, is fed to the module 60 via port 66 into the inlet passageway 95. The module provides a plurality of wafers 10 which separate the feedstream passageway 95 at one end, from the retentate chamber 72, at the opposite end. The wafers 10 are arranged axially as individual units, compressed together in the module 60 and the like or affixed to one another with a suitable adhesive as in the module 150.

The fluid is directed from the inlet passageway through the wafers and over each sheet of hollow fibers. As should be apparent from the foregoing disclosure, each sheet of fibers is oriented perpendicularly to the longitudinal axis A of the module. Within each wafer, the permeable portion of the fluid enters the hollow fibers and flows through the lumens thereof and through the peripheral support of the wafer to enter the permeate chamber 71. The latter is formed between the walls of the module and the coaxially aligned supports 11 of the wafers. In this step the fluid becomes separated into permeate and retentate portions which are ultimately removed from the module.

In order to demonstrate such use, a test module was fabricated and employed for the separation of propylene from propane and established operability of the wafers and the module.

Variations to the foregoing wafers and modules as well as additional embodiments are described next, with reference to FIGS. 12-52.

Figure 12:
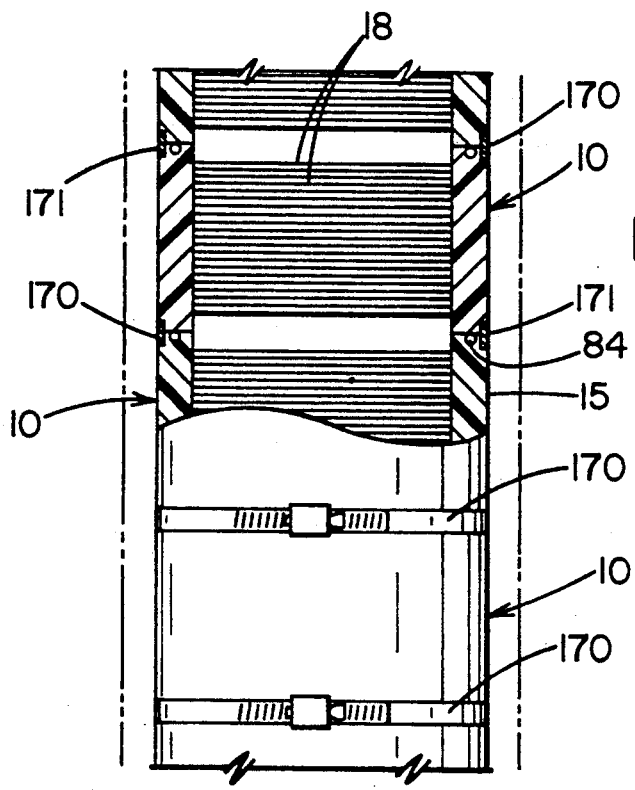
FIG. 12 is a side elevation, partially in section, depicting an alternative means for joining adjacent wafers in a stack.
Figure 13:
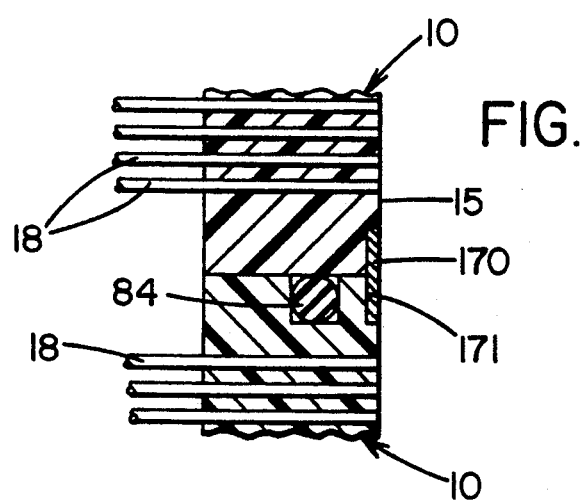
FIG. 13 is an enlarged section of a portion of two wafers, depicting the means for joining and an alternative arrangement of the hollow fibers.

In FIG. 12, a stack of several wafers 10 is depicted banded together as an alternative to deploying the cage means 80 described hereinabove. Between adjacent wafers, metal band means 170 are employed, fitting into shallow grooves 171 formed in the outer peripheral wall 15 of each wafer. The bands 170 can be screw type hose clamps, as shown, or any of a variety of low profile banding systems. The bands are generally less expensive than the cage 80 and they displace less area which can allow for the use of larger diameter wafers within a module. Additionally, the bands reinforce the top and bottom sides of the wafers against bursting stresses from feed fluid pressure and, the hoop strength reinforcing action of the wafer bands will allow less epoxy to be utilized for a given pressure rating, again permitting a larger volume of hollow fibers.

Alternatively, the metal band could have been previously formed to the correct size and installed by press fitting in the groove 171 of a lower wafer prior to positioning of an upper wafer. Seamless metal bands can also be employed as well as bands made of other materials such as fiberglass reinforced plastics (FRP). Seamless bands would provide the advantage of having no protruding buckles or screws.

Figure 14:
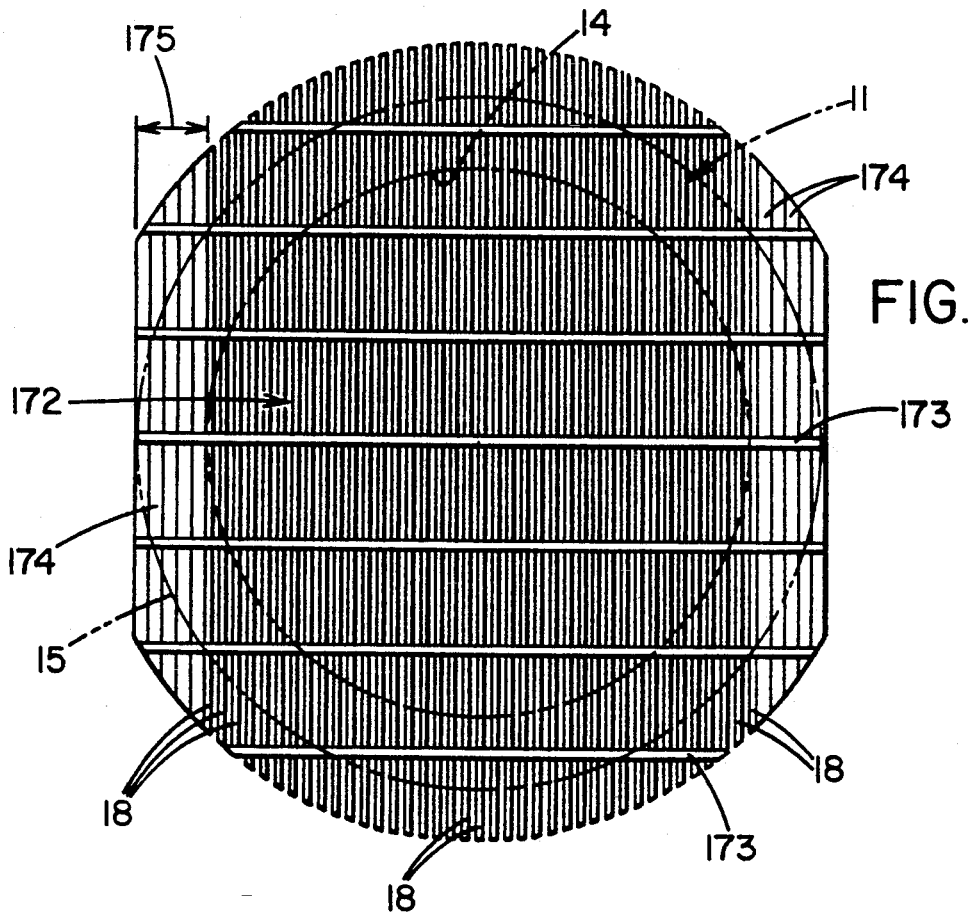
FIG. 14 is a top plan view of an alternative layer of hollow fibers for a wafer.
Figure 15:
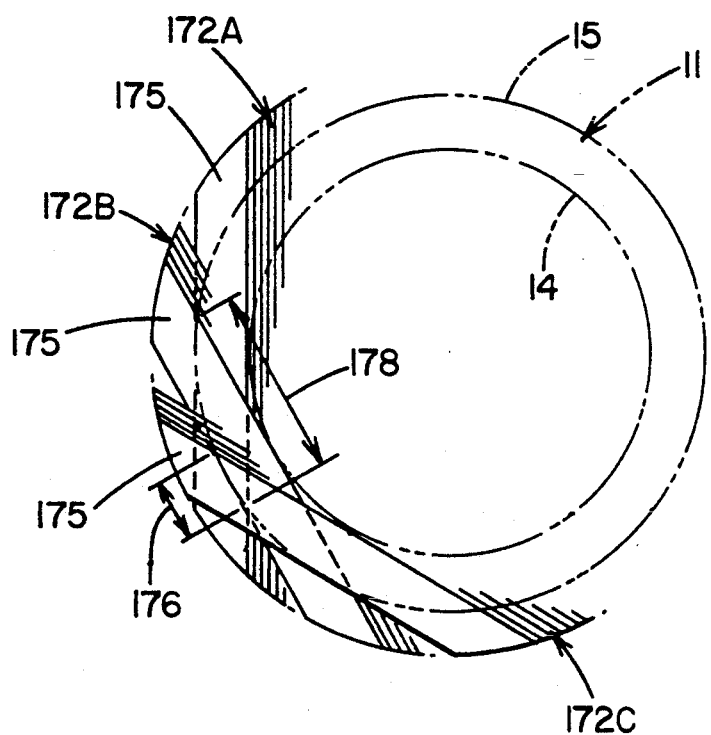
FIG. 15 is a top plan view depicting the arrangement of three consecutive layers, as in FIG. 14, for the construction of a wafer.

Another variation for the basic hollow fiber wafer 10 is depicted in FIGS. 14 and 15. FIG. 14, presents a layer 172 of hollow fibers 18 woven together with fill fibers 173 or otherwise joined as disclosed hereinabove. In FIG. 14, the layer 172 has been superimposed over the annular potting ring 11 and it can be observed that the hollow fibers 18 extend laterally, or left and right, to the radius of the inner surface 14 of ring 11. At this region the hollow fibers are replaced by strands of fiberglass roving 174, which provide a strip 175 sufficiently wide to extend the radius of layer 172 to the outer wall 15 of ring 11. At this point, the sides of the otherwise cylindrical layer are truncated, as additional fiberglass would merely be trimmed away as waste. To simplify construction, larger sheets (not shown) of hollow fibers and alternating layers of fiberglass strips, twice the width depicted at either side of layer 172, can be prepared from which layers 172 can be die cut.

In the manufacture of the wafer 10, each layer 172 is placed in the mold 30, described hereinabove with successive layers being rotated several degrees. A rotation of 30° is depicted in FIG. 15 for three layers, 172A, 172B and 172C, which provides an overlap of three fiberglass strips 175 in the region 176, and of two strips in the region 178. Thus, the fiberglass roving strips extend in a chord-wise direction and are generally located in the direction of the hoop stresses caused by high pressure inside the epoxy ring 11 to reinforce the ring.

Thus far, the present invention has been directed toward three port separation modules: inlet; retentate and permeate. The permeate, which is the bore side of the module, has only one exit port because all of the fibers terminate at the periphery of the epoxy ring which provides an annular chamber. These modules are therefore, limited to fluid separation applications in which a feed stream is separated into two outlet streams, the retentate and the permeate.

The present invention also provides a multi port module, i.e. four port, by dividing the annular chamber into two separate chambers and employing wafers having all of the hollow fibers in parallel alignment, radially and axially, or only a limited angle radially, as will be discussed hereinbelow. This alignment is required so that every hollow fiber will present an open end in both of the separate chambers.

Figure 16:
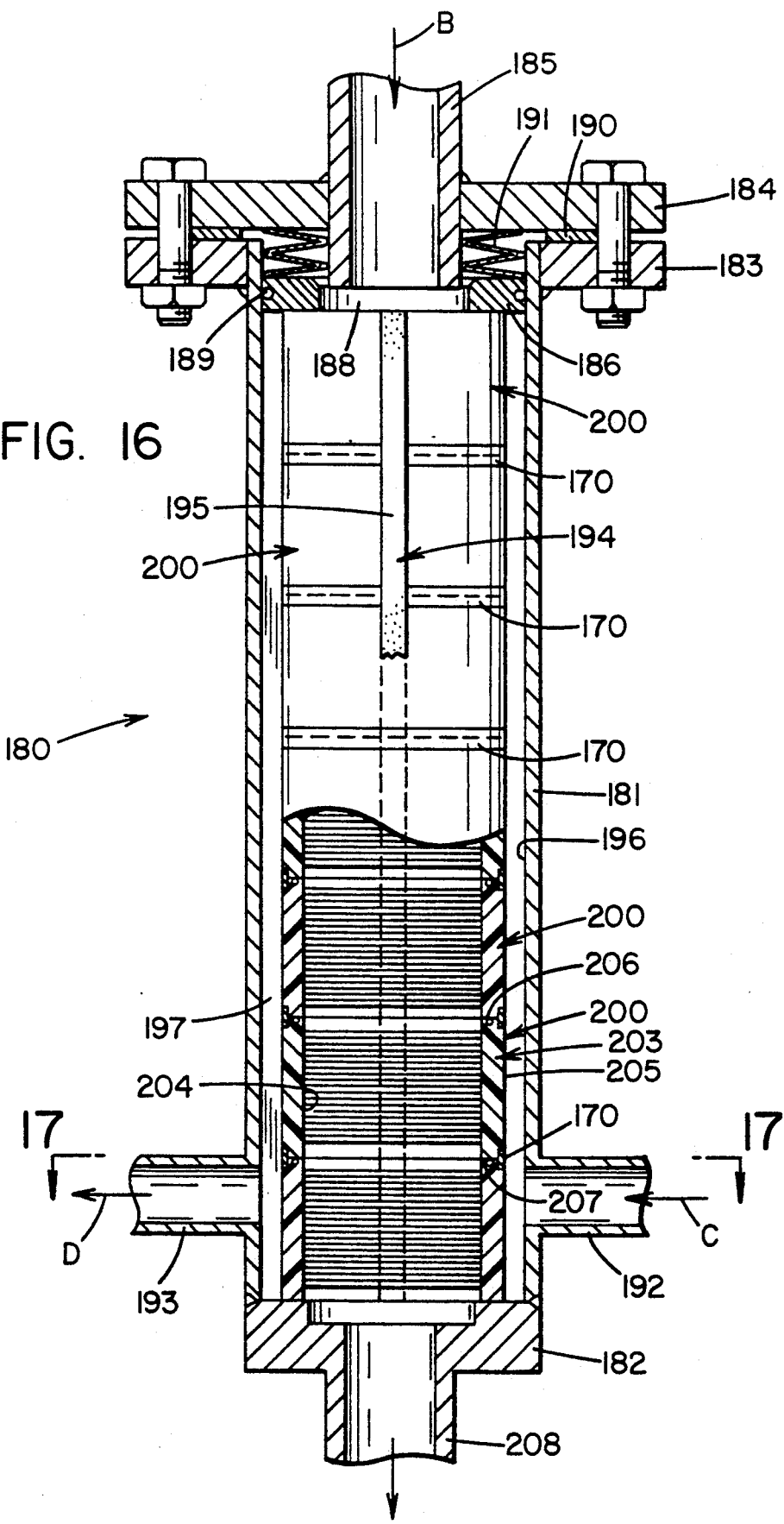
FIG. 16 is a cross-sectional side elevation of an alternative hollow fiber separation module having four ports.

With reference to FIGS. 16-21 the four port module, indicated generally by the numeral 180, and several embodiments shall be described next. The module 180 is similar to the modules described hereinabove and can be sealed at the top by any of the means previously described. In FIG. 16 the module 180 includes a cylindrical body 181, a base 182, upper or top flange 183 and removable top 184. These components are also constructed of steel or other metals, such as stainless steel, and the components can be welded and bolted together as drawn, or they can be manufactured and assembled by alternative means. The top 184 has a central bore, through which a feed port 185 passes, engageable with an annular pusher plate 186 which contacts the first of the wafers 200, described hereinbelow.

A first feedstream can be fed via port 185 along the direction of arrow B and through center opening 188 of plate 186 to engage the hollow fibers. A suitable sealing ring or gasket 189 is carried about the perimeter of plate 186 and another gasket 190 is located between the top flange 183 and top 184. A plurality of Belleville washers 191, or a compression spring, is biased between the top 184 and plate 186 to urge the wafers securely together against the inner wall of base 182. If desired, bands 170 can be employed to adjoin the wafers.

A principal difference between this module and the three port modules is the provision of a bore side inlet port 192 and a bore side outlet port 193, positioned near the bottom of module 180. Inlet of a bore side fluid, in the direction of the arrow C, fills the annular space between the wafers and the module and would exit quickly via outlet 193 (arrow D) if the space were not divided into two chambers. The module 180 employs means for dividing the annular space into two channels.

Figure 17:
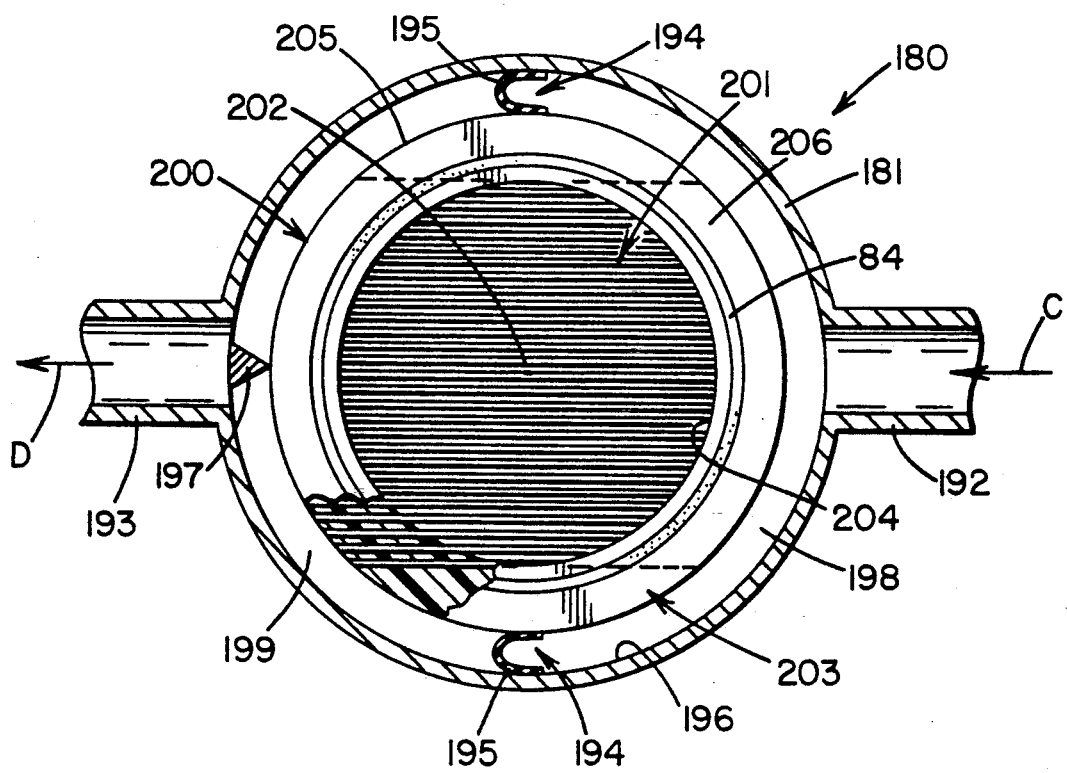
FIG. 17 is a section, taken substantially along the lines 17—17 of FIG. 16 depicting the division of the bore side of the module into two separate chambers.

With reference to FIG. 17, the means for dividing 194 consists of a pair of wiper seals 195, 195 which are made from a suitable elastomer, resistant to the thermal and chemical environment of the module. The wiper seals 195, 195 are fastened to the inner wall 196 of the module by mechanical means (not shown) or other suitable manner. During wafer insertion, the wipers are bent back, and the wafers are slid into place therebetween. A side thrust support 197 is provided on the bore outlet side to maintain wafer alignment against the differential pressure between the two bore chambers 198 and 199 created by means for dividing 194. It runs axially along the inner wall 196 (FIG. 16) and is affixed thereto mechanically or by adhesive or other suitable means.

Unlike the wafers employed in the three port modules, the wafer indicated generally by the numeral 200, for use in the four port module, employs a different alignment of hollow fiber layers. In particular, the fibers of each layer 201 forming the central area 202 are arranged parallel to the neighboring layers or at only a small angle, in alternating fashion as will be described in conjunction with FIG. 21. Thus, one end of all of the hollow fibers is presented, or open, in bore inlet chamber 198 and the other end of all the fibers is open to bore outlet chamber 199. Wafer 200 provides a peripheral wall 203, having inside surface 204, outside surface 205, upper surface 206 and lower surface 207.

In this arrangement, a bore side fluid can be pumped into bore inlet chamber 198 where it will be forced through the fiber lumens and then discarded into the bore outlet chamber 199. At the same time, the first fluid feedstream can flow axially through inlet 185, from the top to the bottom of the wafer stack and out the bottom or retentate port 208. The permeate material that diffuses into the hollow fibers can be swept or carried away by a sweep fluid passed through the bore side of the wafers. The carrier fluid could also be reactive with permeate within the hollow fibers, depending upon the type of separation being conducted.

A small amount of leakage could be anticipated between the two chambers, but may be acceptable in some processes, such as sour gas sweetening by amine absorption where a small amount of amine passage between the two chambers would not be measurably detrimental.

Figure 18:
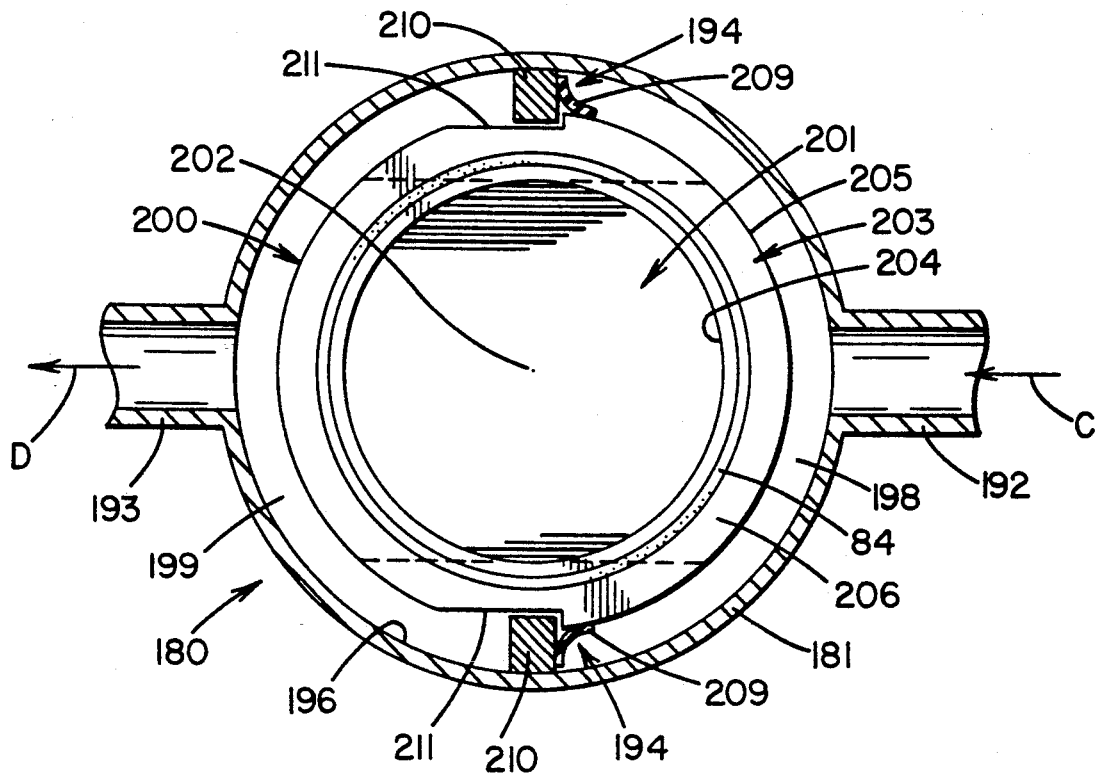
FIG. 18 is a section, similar to FIG. 17, depicting another means for dividing the bore side of the module into two separate chambers.

In FIG. 18 an alternative embodiment for a four port module is depicted wherein the means for dividing 194 comprises a pair or wiper seals 209, 209 which are combined with a pair of side thrust supports 210, 210 respectively, affixed to the supports and to the inner wall 196 in a suitable fashion. A notch 211 is machined into the outside face 205 of each wafer at opposite sides to provide a platform for engagement of the side thrust supports. This design permits more positive wafer alignment and, the wiper can be considerably thinner and more flexible because the sealing force is enhanced by differential bore fluid pressure.

Figure 19:
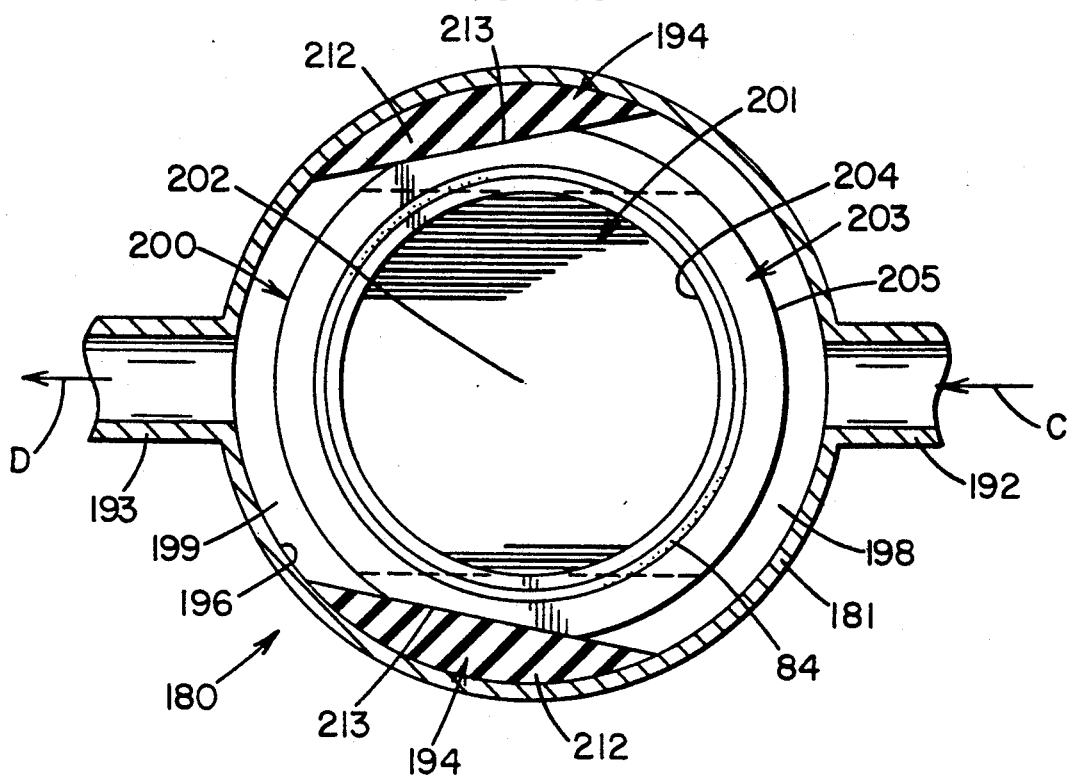
FIG. 19 is a section, similar to FIG. 17, depicting another means for dividing the bore side of the module into two separate chambers.

In FIG. 19, another embodiment is presented wherein the means for dividing 194 comprises opposite side seals 212, 212 which are provided by casting puddles of elastomeric material at opposite sides of inner wall 196. This is accomplished by laying the vessel on its side and injecting a measured quantity of low viscosity liquid which hardens into an elastomeric mass. A second pour with the vessel flipped over produces a similar edge on the other side. The flat elastomer faces are at an acute angle to each other forming a wedge-shaped space between. Flats 213 are machined on the sides of the wafers at matching angles. The wafers are inserted into the vessel toward the bore fluid feed side and then pushed toward the bore fluid discharge side thereby wedging them in place. This design is extremely simple in concept and has the advantage of inherently compensating for vessel inside diameter irregularities. It requires no mechanical assemblies to be built inside the vessel. An elastomer is chosen to allow differential thermal expansion between the wedge and the metal vessel while maintaining good adhesion between them during normal thermal cycling, and silicon rubber would be preferred.

Figure 20:
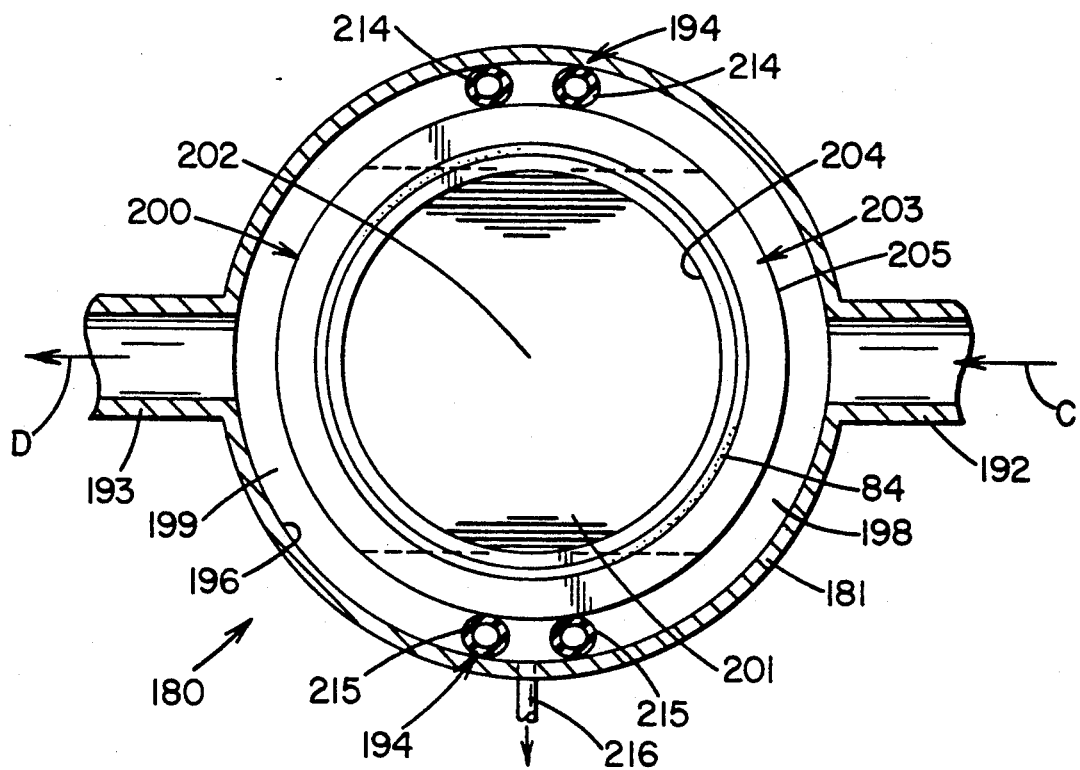
FIG. 20 is a section, similar to FIG. 17, depicting another means for dividing the bore side of the module into two separate chambers.

In FIGS. 20 and 21, another embodiment of means for dividing 194 is shown utilizing pairs of inflatable elastomer hoses 214, 214 and 215, 215 to form the side seals. The hoses are fastened to the vessel wall or otherwise held in place by a means not shown. During wafer insertion, the hoses are deflated and out of the way. When the wafers are in position, the interiors of the elastomer hoses are pressurized to expand and wedge them between the wafers and the vessel wall. Inflatable hoses can be used in pairs to help center the wafers and the space between pairs of hoses can be drained for a positive seal between bore fluid chambers. This design is simple, robust, and does not require precise dimensions to be maintained in component production. Pressurization can be accomplished via means available in the art including the use of simple tire inflation valves mounted in the module wall, or a manifold arrangement can be provided for simultaneously filling the hoses at one inlet. A drain 216 is provided between the hoses 215, 215, for removal of material that may leak into the space therebetween. A similar drain (not shown) can be provided between hoses 214, 214.

In FIG. 21 a wafer 200 is depicted, where the orientation of hollow fiber in successive layers alternates at a small acute angle again, so that the ends open entirely into chambers 198 and 199. This arrangement can be employed in any of the wafers 200 for the four port module 180 and shows the extent to which crosswise orientation of adjacent hollow fiber sheet layers can be implemented. Crosswise fiber sheet orientation is desirable for three reasons. First, it minimized the weakening effect that aligned hollow fibers have on the epoxy ring. Second, it assists epoxy flow during centrifugal potting thereby assisting formation of a voidfree tubesheet. Third, crosswise fibers within the fiber mat promote uniform tubesheet fluid distribution.

While the wafers 200 contain a specific arrangement of hollow fiber layers, it is to be appreciated that the manufacturing via centrifugal potting discussed hereinabove is substantially the same as the method discussed hereinabove.

Figures 22, 23:
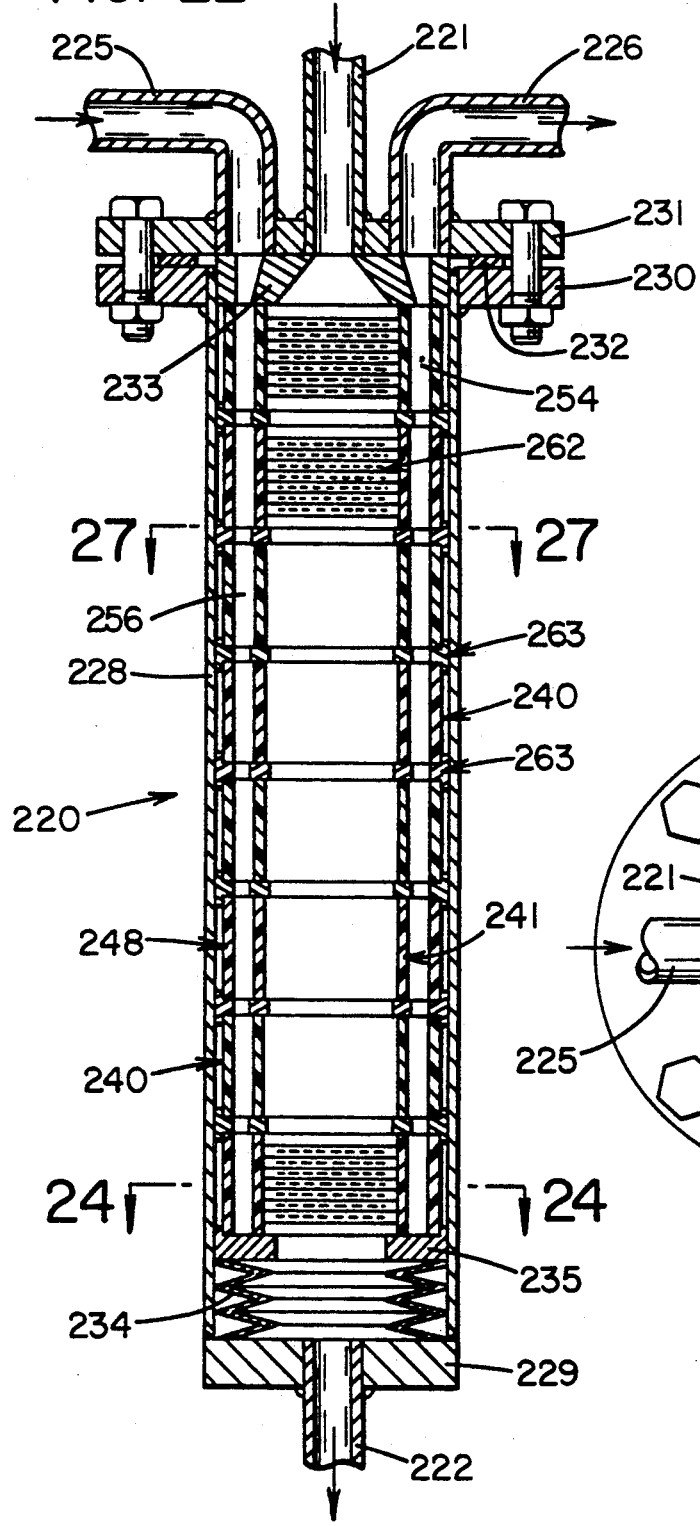
FIG. 22 is a cross-sectional side elevation of an alternative module having six ports.
FIG. 23 is a top plan view of the module of FIG. 22.

With reference to the remaining drawings through FIG. 39, a third type of multi port module, having six ports shall be described next. The module, indicated generally by the numeral 220, is shown in FIGS. 22 and 23 and provides a first port 221 into the module and a second port 222 out of the module as well as a plurality of bore fluid ports: rear inlet port 223 and front outlet port 224; side inlet port 225 and side outlet port 226.

The module 220 otherwise comprises a cylindrical body 228; a base 229; through which second port 222 passes; an upper or top flange 230 and removable top 231. These components are also constructed of metal and assembled in a suitable manner. The top 231 carries the five ports 221, 223-226 and is bolted to the top flange 230 in the manner described hereinabove, with a sealing gasket 232 therebetween. A transition member 233 is interposed between the top flange 230 and the uppermost wafer and connects the first port 221 with the central area of the wafer and each of the four bore fluid ports 223-226 with separate chambers detailed hereinbelow.

At the bottom of the module, a stack of Belleville washers 234 support a stack compression ring 235, upon which the stack of wafers rest. As before, the Belleville washers provide compression to maintain sealing force within the wafer stack. They also provide for variances in the stack height and for differential thermal expansion between the wafer stack and the module 220.

The wafers employed in the multi port module have a related, but different, structure as compared with the wafers 10 and 200. A typical wafer containing layers of hollow fibers is shown in FIGS. 24 and 25 and referred to generally by the numeral 240. The wafer 240 has a first cylindrical or peripheral wall 241 having outer and inner faces, 242, 243 respectively and upper and lower surfaces, 244 245 respectively. Carried within first peripheral wall is the central area 246 of the wafer. A second peripheral wall 248, radially outward of the first wall 241, in turn, has outer and inner faces, 249, 250 respectively, and upper and lower surfaces, 251, 252 respectively.

Between first and second peripheral walls is an annular space divided into a plurality of separate bore chambers 253-256, by four partition blocks, 258-261. The central area 246 provides a plurality of members arranged in a plurality of layers, for example, first and second layers. In the wafer 240, sheets or layers 262 of hollow fibers 18 are located within the central area 246 and are alternated so that the ends of one layer 262A terminate entirely in bore chambers 254 and 256, while the end of the second layer 262B terminate entirely in bore chambers 253 and 255. Each chamber occupies one quadrants or approximately 90 degrees so that fluid entering chamber 253 can pass through hollow fibers 18 in layer 262B and exit into chamber 255 while fluid entering chamber 256 can pass through hollow fibers 18 in layer 262A and exit into chamber 254. As depicted in FIGS. 25 and 26, the hollow fibers 18 are preferably spaced apart from each other, to facilitate axial flow through the wafers between inlet and outlet ports 221 and 222.

In order to form a seal between adjacent wafers and align the stack, a seal ring 263 is employed. As depicted in FIGS. 27 and 28, seal ring 263 is preferably made of machined metal and fits within the cylindrical body 228 of module 220. The ring provides a peripheral wafer alignment lip 264, engageable with the second peripheral wall of wafer 240, and a central body portion 265 which provides an inner cylindrical wall 266 and an outer cylindrical wall 268 that abut both first and second peripheral walls respectively of wafer 240. The body portion provides four open quadrant 269-272 to align with the bore chambers 253-256 of wafer 240. Four O-rings 273 are provided in recesses in the upper and lower surfaces of cylindrical walls 266 and 268 as depicted in FIG. 27 to seal each of the bore chambers, while an inner, central O-ring 274 is provided to seal the central areas 246 of adjacent wafers.

Figure 29A:
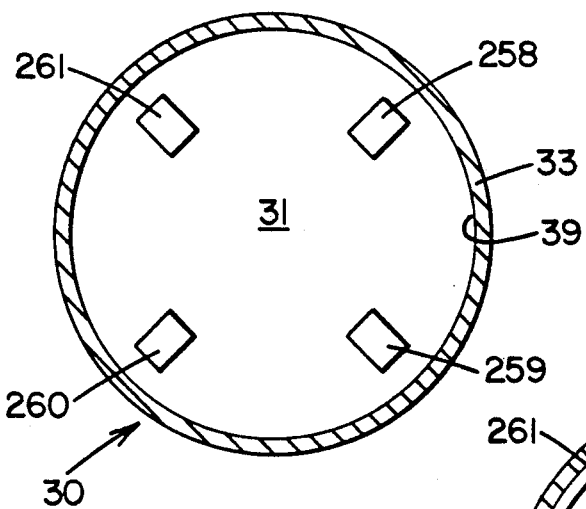
FIGS. 29A-29H are contained on two sheets and depict schematically, the sequential steps for manufacturing a four-chambered wafer, according to the present invention.

The wafers 240 are manufactured by a potting technique utilizing a centrifuge and mold 30, as discussed hereinabove. With reference to FIG. 4, in general, and FIGS. 29A-29H specifically, the assembly and manufacturing steps shall be explained. Construction of the wafer 240 begins with the casting of the outer or second peripheral wall 248. Casting, in turn, begins with the placement of four preformed rectangular epoxy partition blocks 258-261 into the mold (FIG. 29A). The partition blocks are made of the same epoxy formulation employed to manufacture the walls of the wafer for physical property compatibility. As will be seen, the number of partition blocks determines the number of wafer chambers and thus, multi-chambered wafers having more than four chambers, e.g. six, are also possible.

Figure 29B:
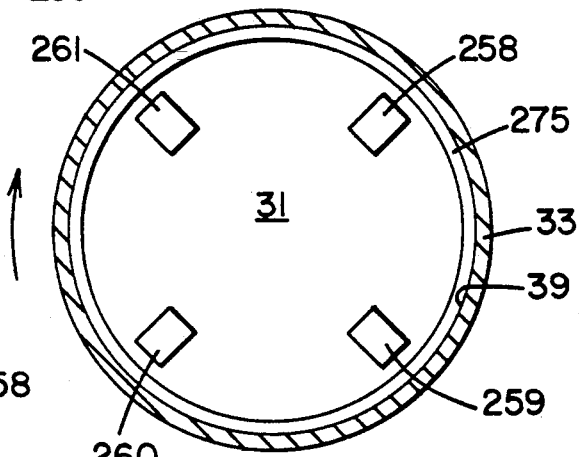

The partitions are held in place between the top and bottom, 34 and 31 respectively, of the mold 30. The mold is then placed in the centrifuge (not shown) and spun at sufficient speeds to produce ten to 500 times the force of gravity at the periphery. A small quantity of a solidifiable first liquid, such as molten wax or hardenable resin, is then poured onto the slinger plate 35 (FIG. 4) of the spinning mold which forms a ring 275 against the inner wall 39 of the mold (FIG. 29B).

Figure 29C:
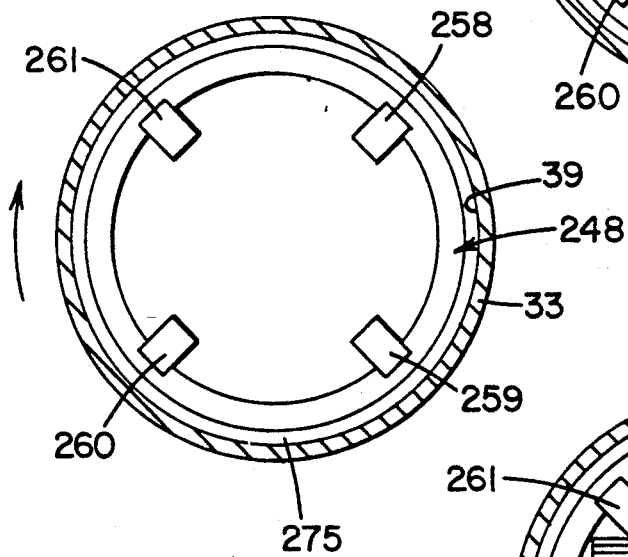

Next, a measured quantity of a hardenable liquid, an epoxy, is mixed and poured onto the plate to form a second ring, outer peripheral wall 248, against the ring 275 (FIG. 29C). As before, the purpose of the first ring 275 is to facilitate removal of the wafer from the mold. The mold is spun continuously until the epoxy ring 248 hardens. The mold is then removed from the centrifuge and opened to reveal the casting depicted in FIG. 29C.

Figure 29D:
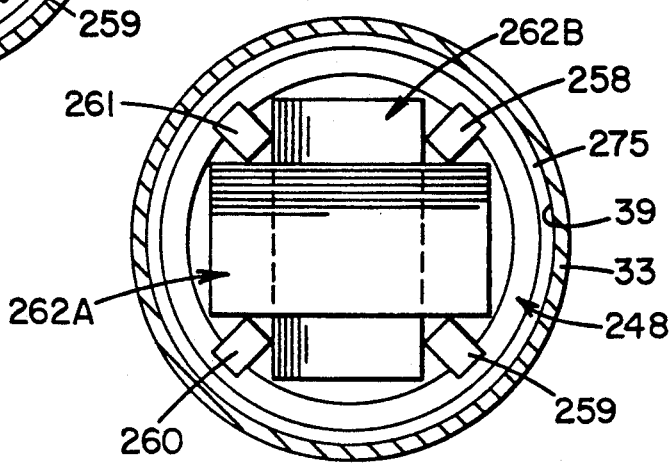

Next, rectangular sheets or layers of hollow fibers 262A and 262B are placed in the mold between the partitions in an alternating fashion, as depicted in FIG. 29D. The hollow fiber layers 262A and 262B can be of the same composition or different. As shown, the hollow fiber ends extend almost to the epoxy ring 248. The hollow fiber layers can be formed by weaving, knitting, or with adhesives, as described hereinabove and are placed crosswise to each other to define two different sets of hollow fibers. The layers can also be stacked in groups comprising several consecutive layers 262A, alternated with several consecutive layers 262B.

Figure 29E:
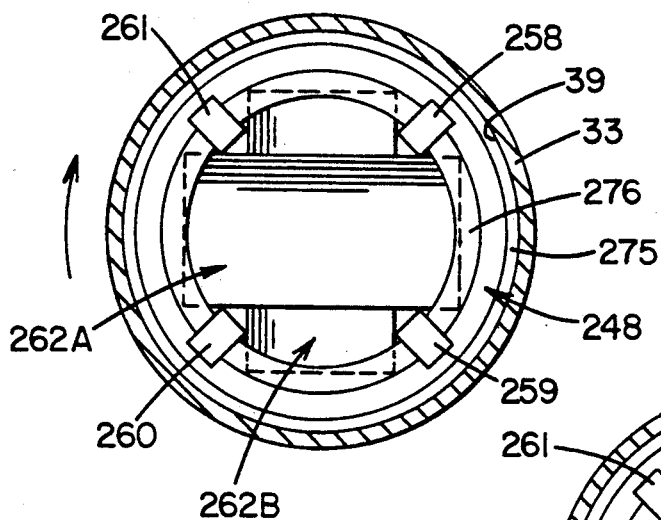

The hollow fibers layers are stacked in the mold until it is full, then the mold is closed and again spun in the centrifuge. A measured quantity of wax or the like is again poured onto the slinger plate 35 to form a third ring 276 on the inside of the epoxy ring 248 (FIG. 29E).

Figure 29F:
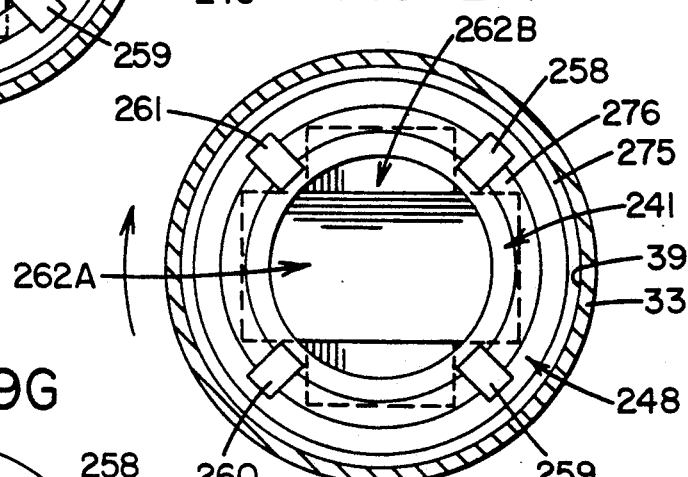
Figure 29G:
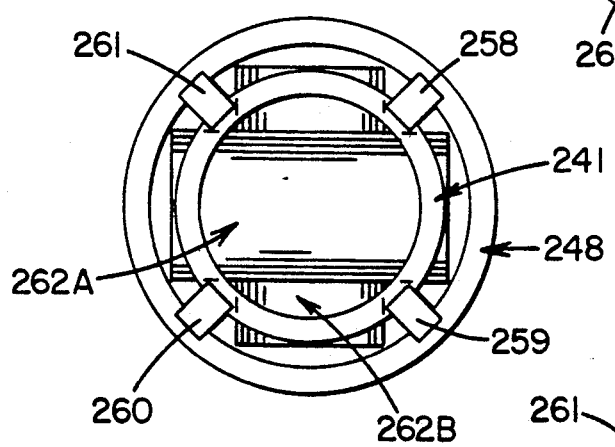

Next, a measured quantity of epoxy resin is poured into the spinning mold to form the second epoxy ring, or first peripheral wall 241 of the wafer 240 (FIG. 29F). After the epoxy has hardened, the mold is removed from the centrifuge and the casting is taken out of the mold (FIG. 29G). If wax were used, the mold side containing the casting can be heated to melt the wax. The wax can be collected, filtered and reused.

Figure 29H:
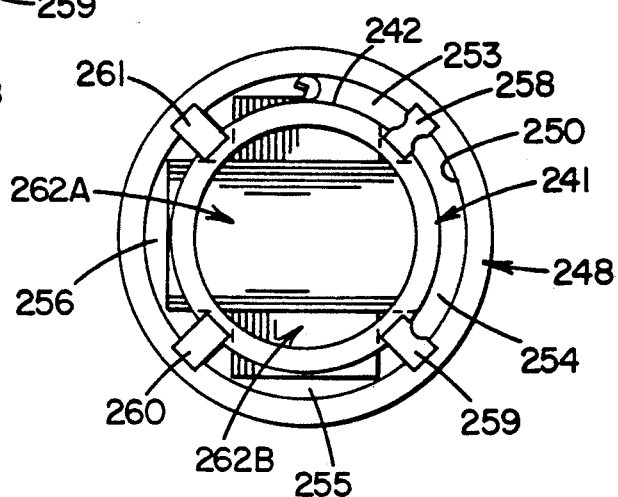

Finally, excess fiber at the periphery of the first or inner peripheral wall 241 is removed and the tubesheet face, outer face 242, is machined to expose open ends of the hollow fiber bores into each of the four separate bore chambers, 253-256. As depicted in FIG. 29H, the tubesheet finishing tool can be a rotary milling device which is inserted into the chamber e.g. 253. The wafer can be rotated in a fixture to move the finishing tool across the tubesheet face between the partition blocks. This procedure is repeated for the other three chambers 254-256, to produce the wafer 240 depicted in FIG. 24. It is to be appreciated that the machining step may not be necessary if the hollow fiber layers have open, unclogged ends and, if the protruding fiber lengths do not excessively impede the bore fluid flow chambers 253-256.

Figure 30:
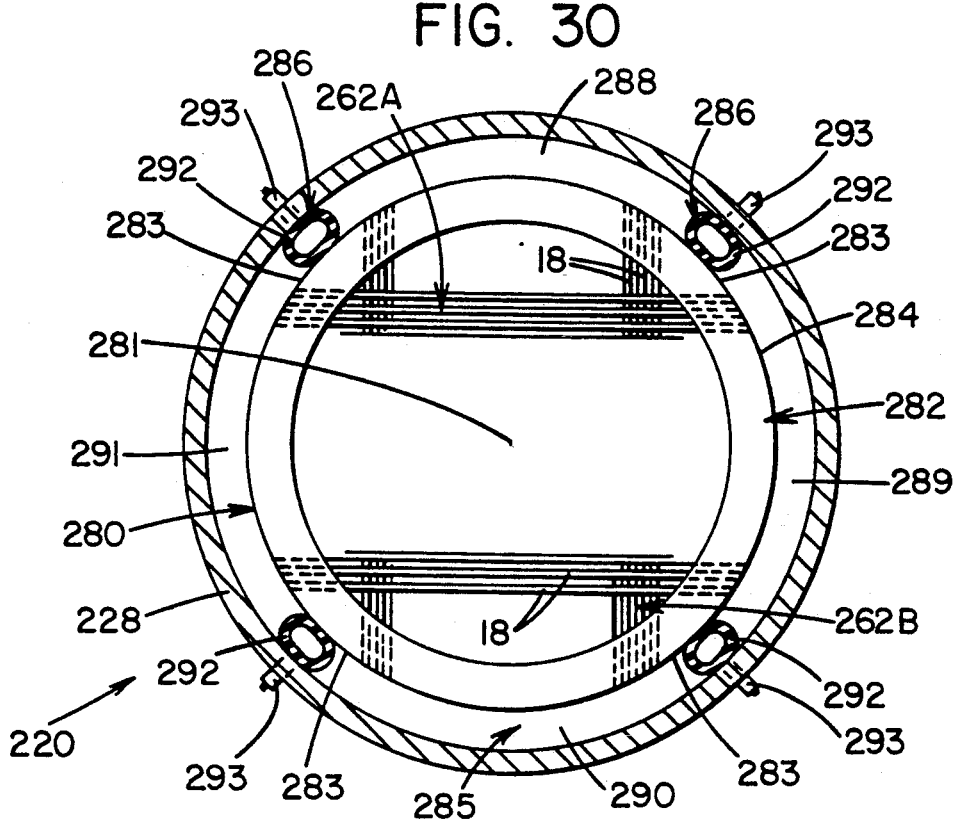
FIG. 30 is a section through another embodiment of a six-port module, depicting an alternative wafer and means for providing four separate chambers.

With reference to FIG. 30 an alternative means for constructing a multi port radial module is presented. The overall module is not shown because the module 220 (FIG. 22) can be employed. It utilizes a wafer 280 having a central area 281 which contains a different alignment of hollow fiber layers than the wafer 200. More particularly, the plurality of layers 262A, 262B have the cross-wise orientation employed in wafer 240, but only a single peripheral wall 282, as employed in the wafer 200. The layers are placed in the mold in the alternating, cross-wise manner during construction and the wafer is cast centrifugally, as discussed hereinabove.

The resultant wafer 280 has four fiber free surfaces 283 about the outside face 284 of peripheral wall 282. The annular chamber 285 formed between the module wall 228 and peripheral wall 282 is divided, by means for dividing 286, into a plurality of separate bore fluid chambers, e.g. four, 288-291 by inflatable hose seals 292. This design is similar to that discussed in conjunction with FIG. 20 hereinabove, except four chambers are formed rather than two. As can be appreciated, the wafer 280 and seals 292 can be employed in the module 220 to provide six ports in the manner described hereinabove and hence, the detailed description of the module construction shall not be repeated. Inflation of the seals can be conducted via inflation valves 293 mounted in the module wall 228, or a manifold (not shown) can be provided for simultaneously filling the tubes. Of course, by adding more inflatable seals, for example six, an eight port module could be provided if desired.

Thus far, the wafers described have employed layers of hollow fibers 18 in various arrangements. The layers can all contain the same type of hollow fiber membrane, e.g. wafers 10 and 200, or different types, e.g. wafer 240, where four separate bore chambers are provided, permitting the use of two different membrane materials. The latter are employed in six port modules such as the module 220 because four ports are provided in communication with the four chambers.

In conjunction with the six port module 220 it is also possible to employ layers formed from materials other than polymeric hollow fibers as will be described next with reference to FIGS. 31-37. The wafer 300 is depicted as exemplary and includes the peripheral wall 301 and a central area 302. By employing the inflatable hose seals 292, four separate bore chambers 288-291 are provided.

In lieu of hollow fibers 18, the wafer 300 can employ porous hollow tubes 303 of a suitable material, such as ceramic, which are coated with a layer of semipermeable membrane material 304 to provide a supported membrane. A feedstream passing axially through the module can be separated when one fraction passes through the membrane surface 304 and porous hose 303 into the lumen 305. The coated tubes comprise a first layer 306 of the central area 302 which communicate with opposed chambers 288 and 290.

Figure 32:
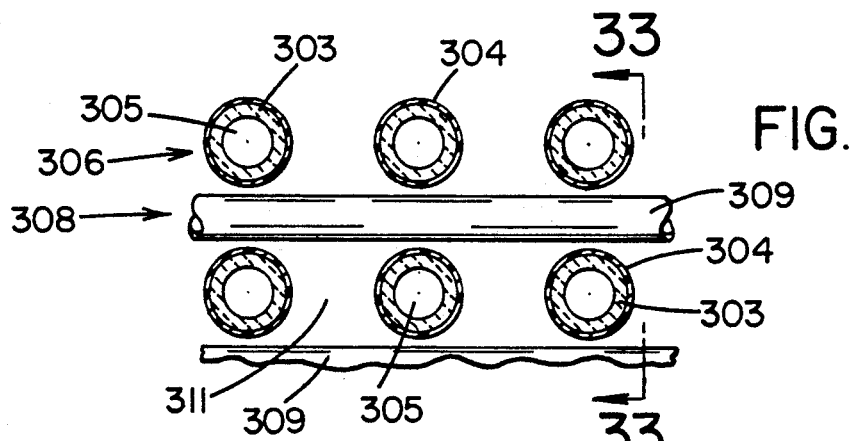
FIG. 32 is a section, taken substantially along the lines 32—32 of FIG. 31, depicting the arrangement of components within the wafer of FIG. 31.
Figure 33:
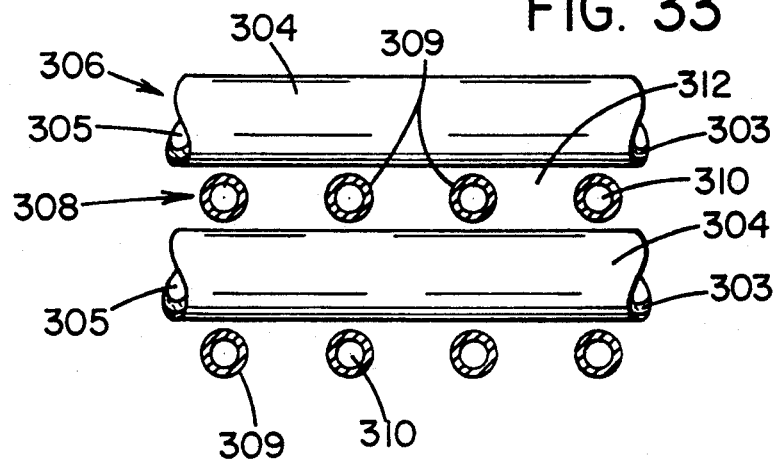
FIG. 33 is a section, taken substantially along the lines 33—33 of FIG. 32.

The alternating second layers 308 of the central area 302 also comprise hollow tubes 309 of a non-porous material, such as for instance stainless steel or glass. These tubes have lumens 310 which communicate with opposed chambers 289 and 291 and can be employed for heat exchange. As depicted in FIGS. 32 and 33 the tubes 303 are spaced laterally apart as are the tubes 309. Additionally, the tubes 303 and 309 are spaced vertically apart so that all surfaces thereof can be contacted by the feedstream and passageways 311 and 312 are provided for the feedstream to flow. Of course, it is to be appreciated that a wafer can be constructed having layers of hollow fibers alternating with layers 308 of non-porous tubes and thus, while no drawing figure has been presented, such an embodiment should be clearly understood from the overall description herein.

Figure 34:
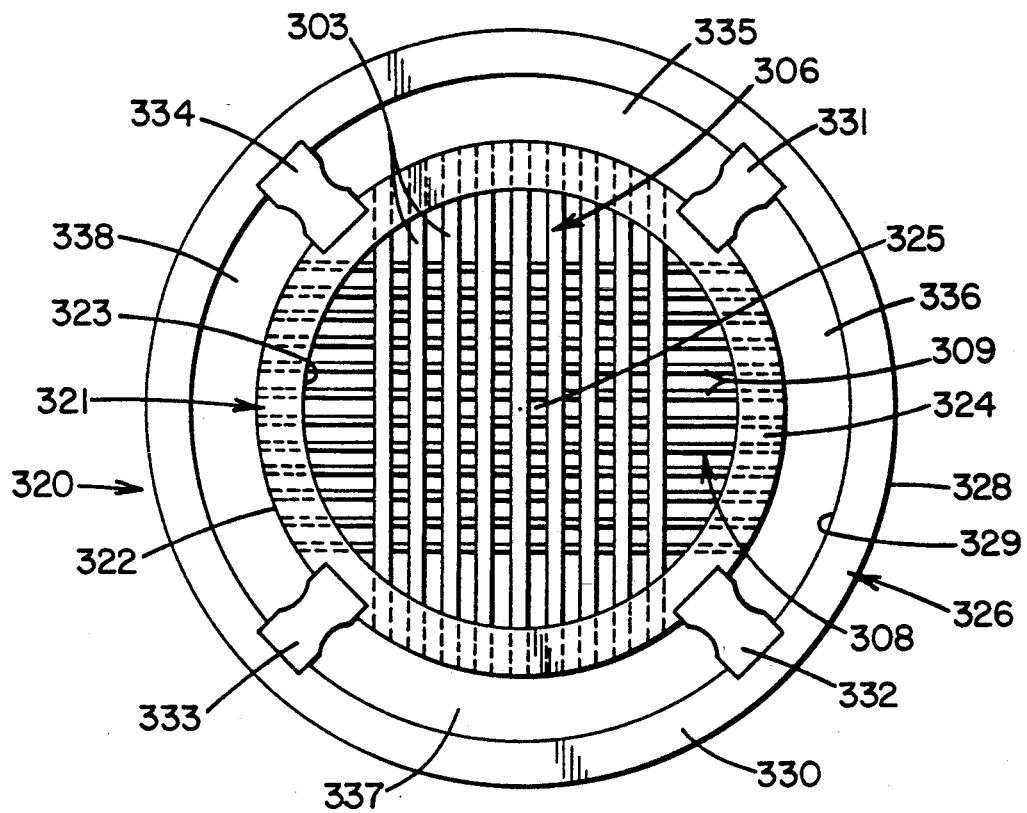
FIG. 34 appears on the same sheet with FIG. 30 and is a section, similar to FIG. 24, of another four-chambered wafer according to the present invention.
Figure 31:
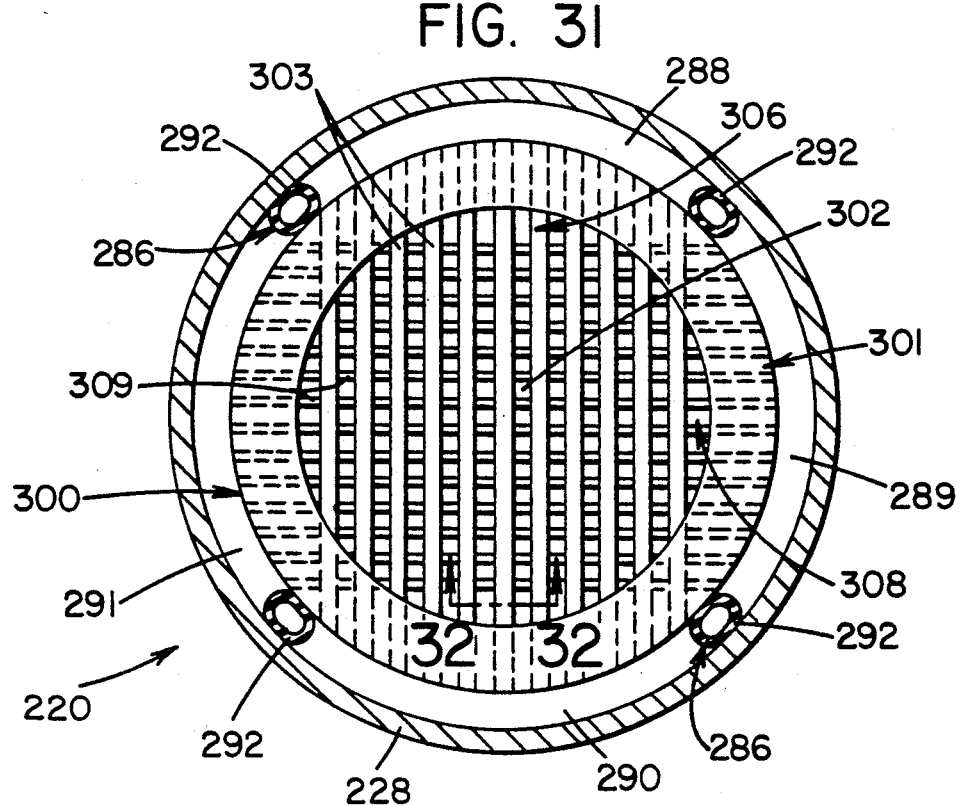
FIG. 31 is a section through a six port module, similar to FIG. 30, but depicting another embodiment of a wafer.

While the wafer 300 includes a single peripheral wall, a wafer 320 having four separate contained chambers can also be provided with a non-porous central area. With reference to FIG. 34, the wafer 320 has a first peripheral wall 321 having outer and inner faces, 322, 323 respectively and an upper surface 324 and lower surface (not shown). Carried within the first wall is the central area 325 of the wafer. A second peripheral wall 326, radially outward of the first wall 321, in turn, has outside and inside faces, 328, 329 respectively, and an upper surface 330 and a lower surface (not shown).

Four partition blocks 331-334 divide the annular space between walls 321 and 326 into four separate bore chambers 335-338 so that the coated tubes 303 of layer 306 communicate with opposed chambers 335 and 337 while the non-porous tubes 309 of layer 308 communicate with opposed chambers 336 and 338. It should be appreciated that the layers 306 and 308 can both comprise membrane coated porous tubes which is equally true for the layers employed in the wafer 300. Moreover, although also not shown, a wafer 320 as well as a wafer 300 can be constructed with alternating layers 308 of non-porous tubes 309 and hollow fibers 262A, 262B.

Figure 35:
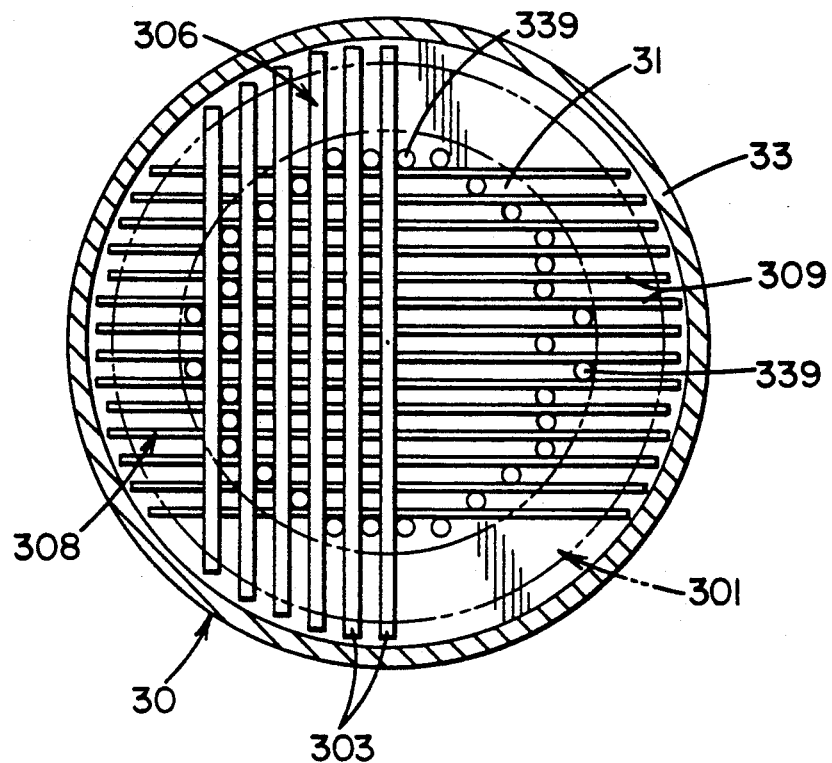
FIG. 35 is a top plan view of a mold, as depicted in FIG. 4, with spacers for the arrangement of components to form a wafer of the type depicted in FIG. 31.

With reference to FIG. 35, in order to manufacture the wafer 300, or 320, the mold 30 may contain a plurality of vertical spacer rods 339 for the lateral separation of the different tubes 303 and 309. The spacer rods 339 can be placed within holes (not shown) provided in the mold bottom wall 31 and may also be secured by the top plate 34. Vertical spacing between layers 306 and 308 can be facilitated by placing an open circumferential ring 340 (FIGS. 38, 39) within the area 275 that will be occupied by the wax during centrifugal casting.

Figure 36:
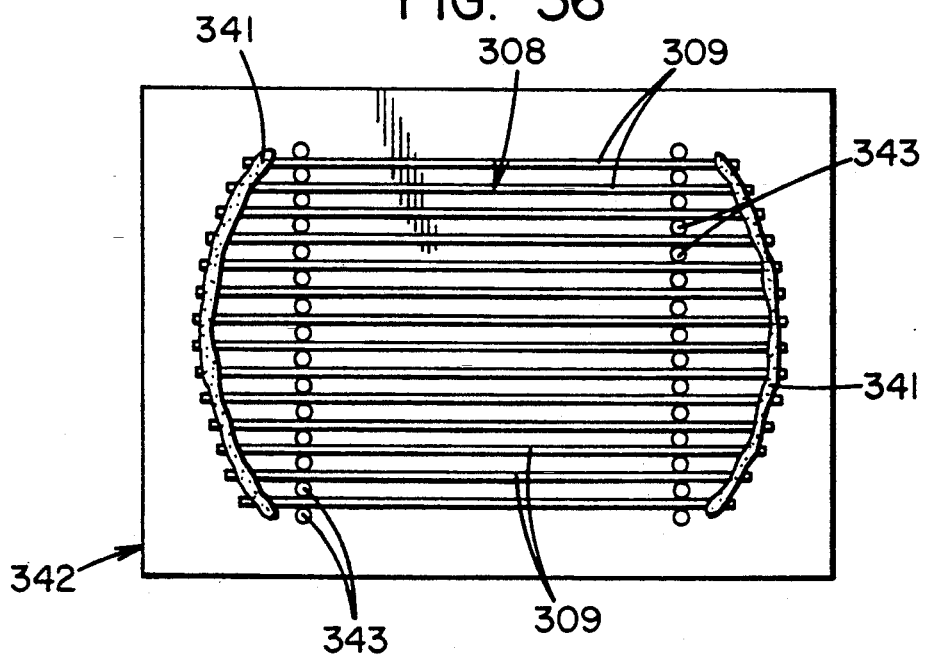
FIG. 36 is a top plan view of a layer of rigid tubes in a fixed, spaced array for use in the manufacture of a wafer of the type depicted in FIG. 31.

In FIG. 36 an alternative means for the lateral spacing of the hollow tubes 309 is depicted which comprises a bead 341 of hot melt adhesive or other suitable material at the opposite edges of the tubes, again within the area that will be occupied by the wax and subsequently removed. The tubes 309 are placed within a fixture 342 having spacer rods 343 and then affixed together. The resulting layer, 308 can then be placed directly into the mold 30. Although not shown, the same step can be employed for pre-construction of a layer 306 of porous hollow tubes.

In FIG. 37, a further variation of wafer is presented, with reference to the wafer 350 which comprises a continuous peripheral wall 351 and central area 352 which provides a layer 353 of porous hollow tubes 303, coated with a layer of semipermeable membrane material, as described hereinabove, and an alternating layer 354 of malleable heat exchange tubes 309, contained within the continuous peripheral wall 351. Again, by employing inflatable hose seals 292, the chamber 355 is divided into four separate bore chambers 288-291.

The metal tubes 309 are bent to cover substantially the regions of the central area 352 and the layer 353 of ceramic tubes 303 can thereby be made substantially the full width of the central area 352. The four inflatable hoses 292 are positioned at intervals greater and less than 90 degrees to accommodate the four separate areas through which the ends of tubes 303 and 309 pass. As is evident from FIG. 37, the coated porous tubes 303 communicate with opposed chambers 288 and 290 while the heat exchange tubes 309 communicate with opposed chambers 289 and 291. The advantage of this construction over that of the wafer 300 is that the axial feedstream flow encounters equal flow resistance across the central area of the wafer. Although not depicted, it is to be understood that the four-chambered wafer 320 could employ layers 354 of malleable heat exchange tubes 309 and layers 353 of porous, coated tubes 303, of the wafer 350 by moving the partition blocks 331-334 during wafer manufacture.

In similar fashion, it is to be understood that various means for dividing discussed in conjunction with FIGS. 17-21 can be substituted for the means 286 in order to divide the annular chamber of wafers 280, 300 and 350 into four bore fluid chambers. Likewise, in order to manufacture the wafers 280, 300, 350 or similar types, a variation of the method depicted in FIGS. 29A-29H can be employed by deleting the partition blocks, placing the desired layers as depicted in FIG. 29D and casting one epoxy ring.

Figure 38:
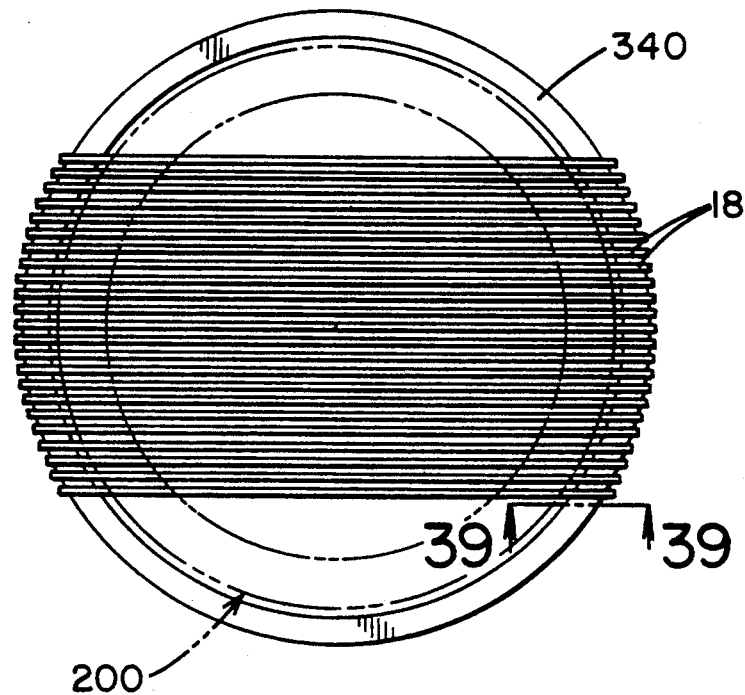
FIG. 38 is a top plan view of an embodiment for providing a pre-spaced layer of hollow fibers into a mold for the manufacture of a wafer.
Figure 39:
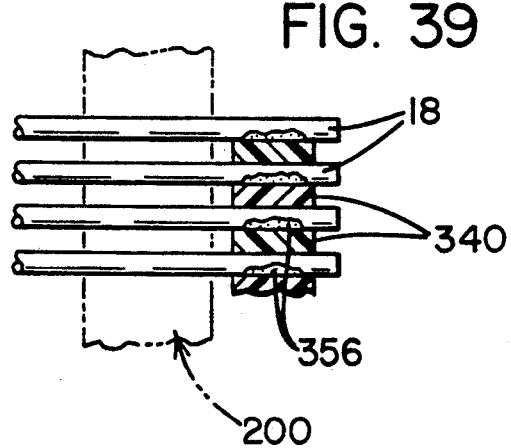
FIG. 39 is an enlarged section, taken substantially along the lines 39—39 of FIG. 38 depicting the deployment of spacer rings.

Finally, in FIGS. 38 and 39, the use of a circumferential ring 340 to separate layers vertically during the casting process is depicted. The ring 340 can be fabricated from fiberglass or other suitable material which can be recovered from the wax after the cast wafer is removed from the mold. Hollow fibers 18 are depicted and are affixed to the ring 340 via suitable adhesive material 356. The fibers 18 are laterally spaced in a suitable jig, such as 342 to make the layers 262A, 262B discussed hereinabove. As should be apparent, the rings 340 can also be employed with layers 306 and/or 308 for the wafers 300, 320 or layers 353 and/or 354 of wafer 350.

Thus far the wafers described herein have employed various forms of hollow tube members in the central area including hollow fibers, non-porous tubes and membrane coated porous tubes. It is also possible to provide another type of member as a component layer of the central area of a wafer, the transverse sheet membrane sleeve.

Figure 40:
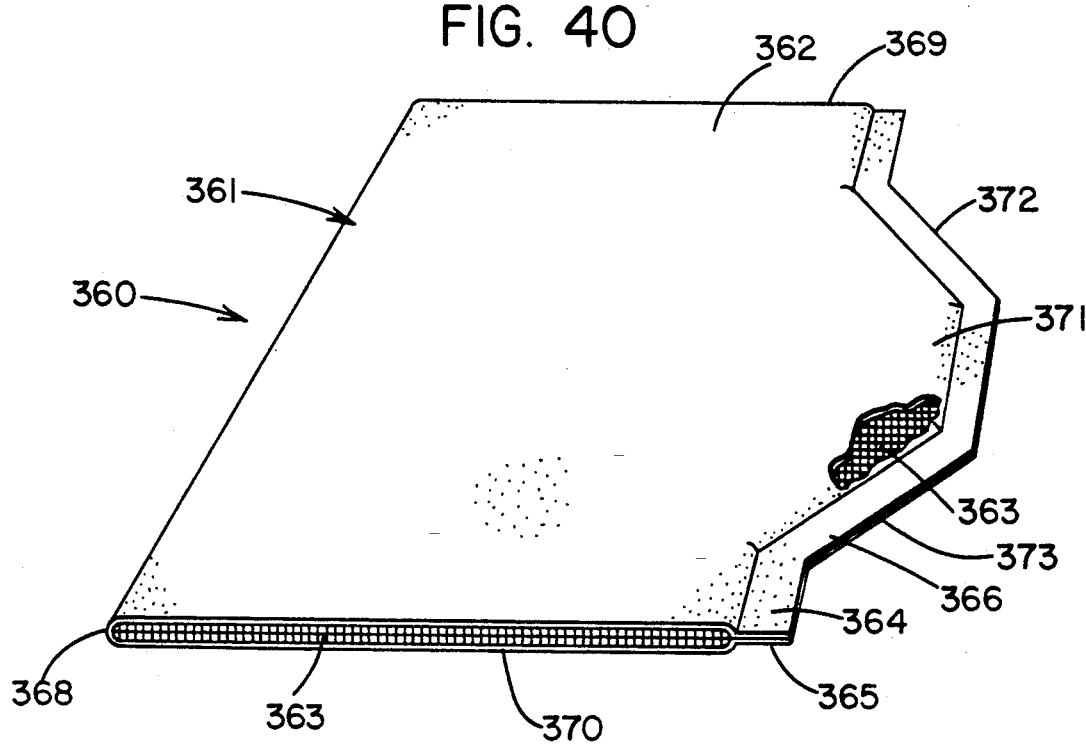
FIG. 40 is a perspective view of an single transverse sheet sleeve member.

A transverse sheet membrane sleeve, indicated generally by the numeral 360, is depicted in several variations in FIGS. 40-44. The sleeve 361, presented in FIG. 40, provides a continuous sheet of semipermeable membrane material 362 which is folded over a web of support material 363. The upper and lower edges 364 and 365 are joined and sealed tight, forming a seam 366 which protrudes away from the support web and is opposite the folded edge 368. The sleeve 361 is open at the ends 369 and 370. Joint sealing can be accomplished in any suitable manner including the use of a liquid adhesive, a hot melt adhesive, adhesive tape, or heat and pressure on the membrane edges 364 and 365. The sleeve 361 provides a tablike area 371 defined by cut out regions 372, 373 to facilitate, assembly of the wafers, as will be described hereinbelow.

With respect to the composition of the semipermeable membrane, substantially any membrane currently available, or which may subsequently become available, can be employed. Inasmuch as the composition and preparation of semipermeable membranes for the separation of a variety of gas mixtures and liquid mixtures, is well known to those skilled in the art, a detailed description thereof is not provided herein, it being understood that the present invention is not limited to any specific semipermeable membrane or method of preparation or fabrication.

Figure 41:
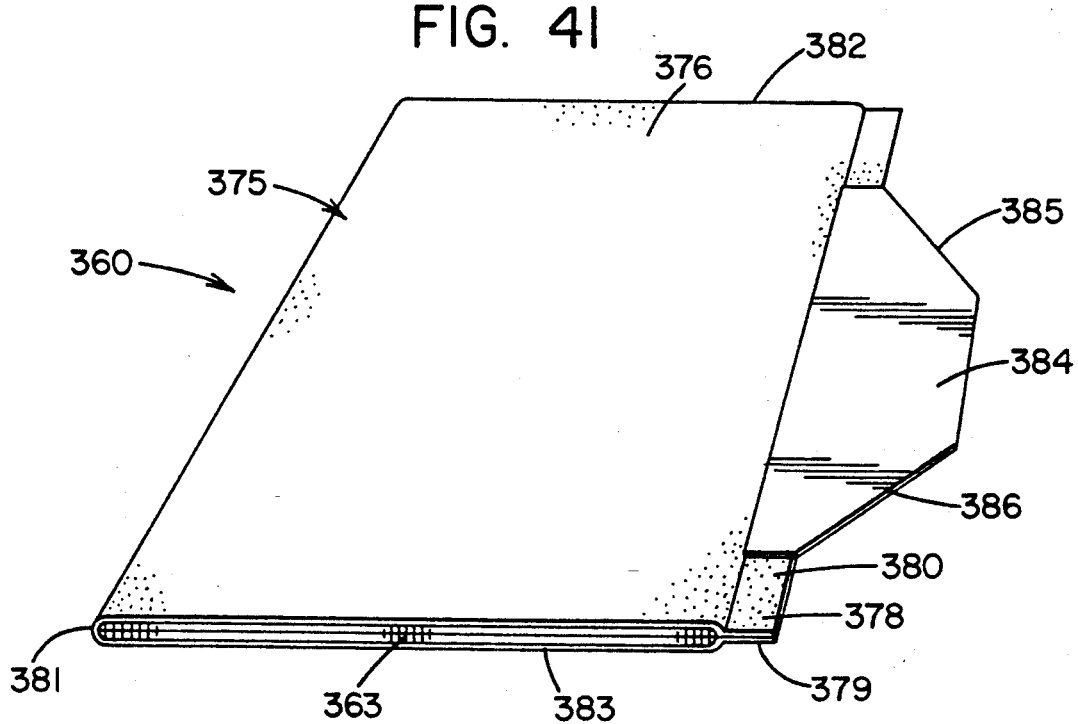
FIG. 41 is a perspective view of an alternative single transverse sheet sleeve member.

In FIG. 41 an alternative transverse membrane sleeve 375 is depicted. Sleeve 375 provides a continuous sheet of membrane material 376 which is folded over a web of support material 363. The upper and lower edges 378 and 379 are joined and sealed tight, forming a seam 380 which protrudes away from the support web and is opposite the folded edge 381. As noted above, the sleeve 375 is open at the ends 382 and 383. Joint sealing is again accomplished in any suitable manner. Sleeve 375 carries a tab 384 of material, such as a plastic or other non-membrane material, which is affixed to the seam 380. This embodiment is less wasteful of membrane material, but also packs less membrane area into the wafer. Cut out areas 385, 386 again assist in placement of the sleeve 375 in the mold during fabrication of the wafer.

Figure 42:
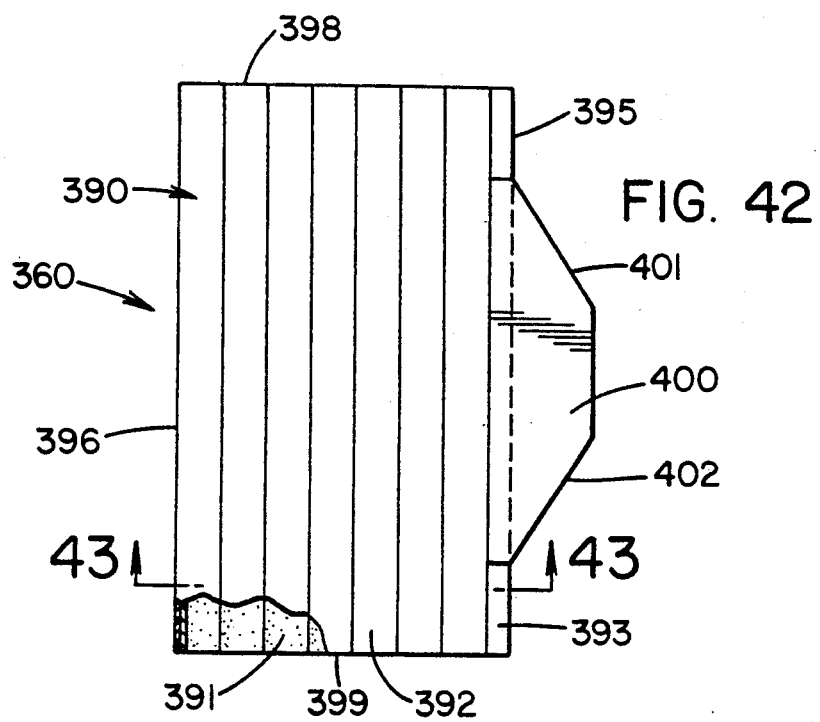
FIG. 42 is a top view, partially in section, of a single transverse sheet corrugated membrane sleeve of sintered metal.
Figure 43:
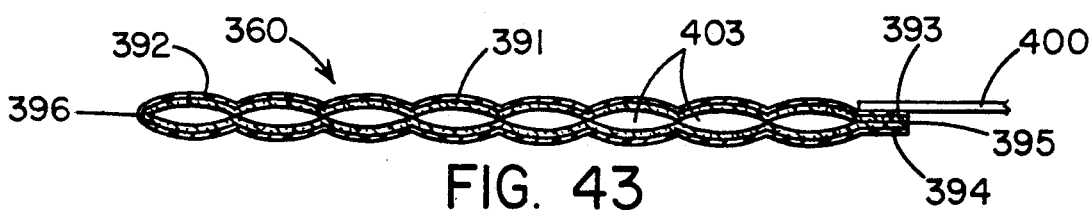
FIG. 43 is a cross-section taken substantially along the lines 43—43 of FIG. 42, of the single corrugated sintered metal membrane sleeve.
Figure 44:
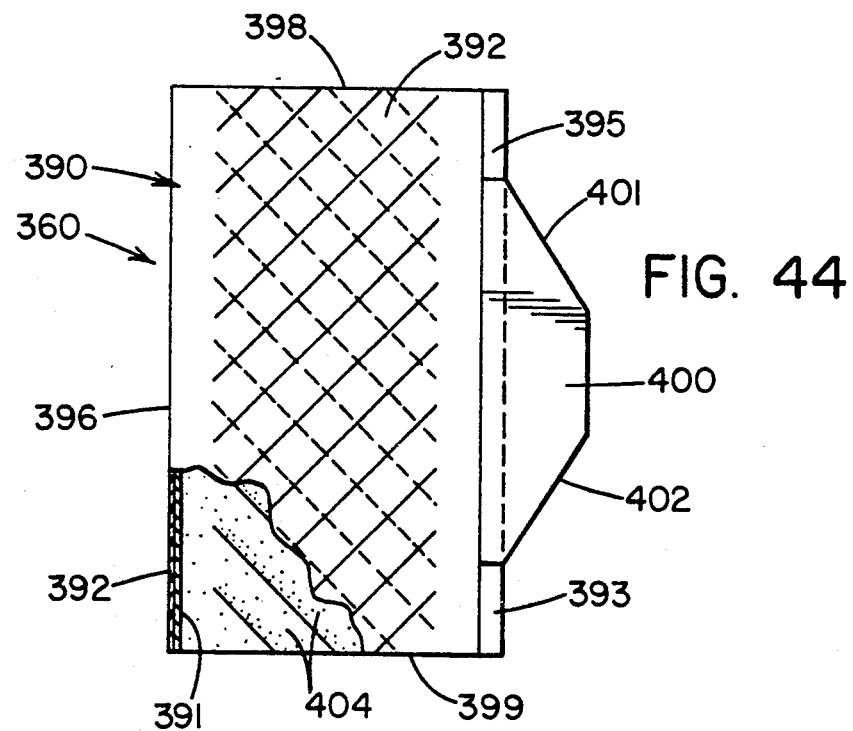
FIG. 44 is a top view, partially in section, of an alternative single corrugated sintered metal/membrane sleeve.

In FIGS. 42-44 another alternative transverse membrane sleeve 390 is depicted. Sleeve 390 provides a continuous sheet of porous, sintered metal 391 which is folded over to form a support for a coating 392 of semipermeable membrane material. The upper and lower edges 393 and 394 of sheet 391 are joined and sealed tight, forming a seam 395 which is opposite the folded edge 396. As noted above, the sleeve 390 is open at the ends 398 and 399. Joint sealing is again accomplished in any suitable manner. Sleeve 390 carries a tab 400 of material, such as a plastic or other non-membrane, which is affixed to the seam 395 and extends into the embedded area of the wafer peripheral wall. This embodiment is also less wasteful of membrane material, but also packs less membrane area into the wafer. Cut out areas 401, 402 again assist in placement of the sleeve 390 in the mold during fabrication of the wafer.

Owing to the inherent strength of the porous, sintered metal sheet 391, a web is not necessary. As depicted in FIGS. 42-44 the sleeve 390 can be corrugated lengthwise (FIGS. 42, 43) to form channels 403 or cross-wise (FIG. 44) to form a quilted structure and diagonal channels 404. Corrugation allows the sleeve to withstand the compression load on the wafer, during use and, elimination of the porous support web will considerably reduce the permeate side pressure drop particularly in pervaporation.

The present invention further provides wafers employing layers of the foregoing transverse sheet membrane sleeves 360 with hollow fibers or non-porous tubes or membrane coated porous tubes. A typical wafer for use in a six port module is shown in FIGS. 45 and 47 and is referred to generally by the numeral 410. The wafer 410 has a first cylindrical or peripheral wall 411 having outer and inner surfaces, 412, 413 respectively and upper and lower surfaces, 414, 415 respectively. Carried within first peripheral wall is the central area 416 of the wafer. A second peripheral wall 418, radially outward of the first wall 411, in turn, has outer and inner surfaces, 419, 420 respectively, and upper and lower surfaces, 421, 422 respectively.

Between first and second peripheral walls is an annular space divided into four separate bore chambers 423-426 by four partition blocks, 428-431. A plurality of transverse sheet membranes sleeves 360 are located in layers 432 within the central area 416 of wafer 410 and are alternated as depicted in FIG. 47 so that a serpentine flow path is provided. More particularly, it can be noted that the seam 366 and tab 371 of one sleeve 360 is embedded in the right side of inner wall 411, while the seam 366 and tab 371 of the next sleeve is embedded in the left side of inner wall 411, and so forth. Fluid feedstream entering the wafer can flow over the first sleeve layer 432 and around the edge 368 thereof then over the next sleeve layer 432 and around the edge thereof in serpentine fashion.

Figure 48:
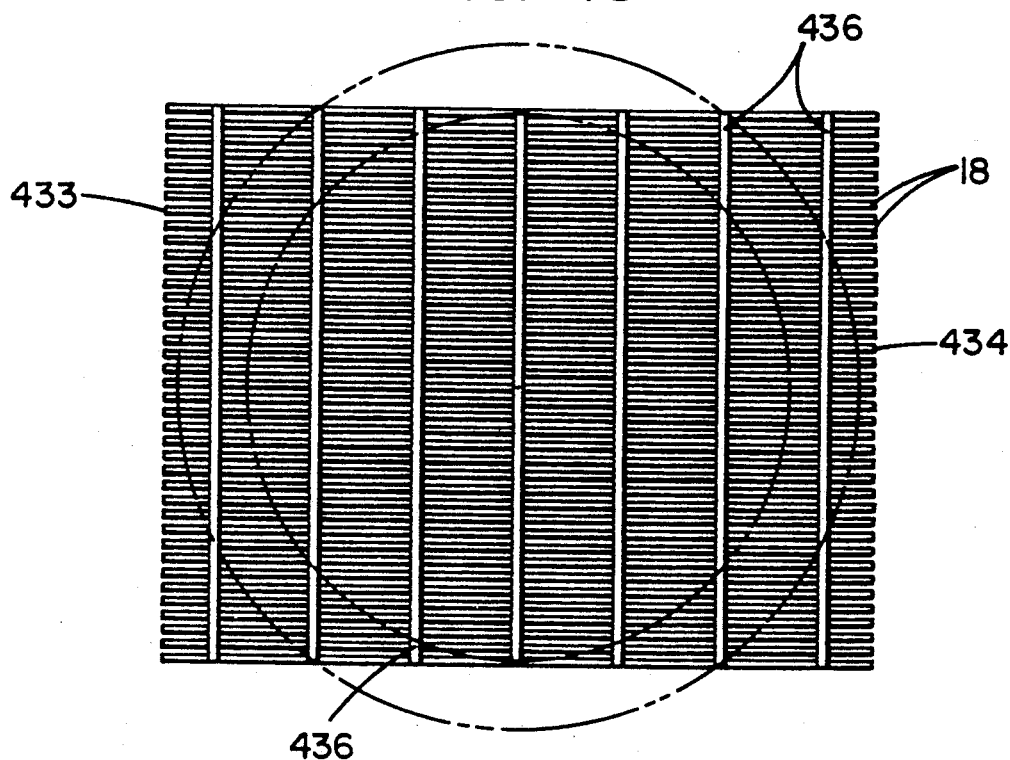
FIG. 48 is a top plan view of a layer of hollow fibers for a wafer.

Alternating between the sleeve layers 432 are layers 262 of hollow fibers 18, the opposite ends 433, 434 of which pass through inner peripheral wall 411 and terminate at the outer surface 412. The lumens 19 (FIG. 46) of hollow fibers 18 provide a conduit for the passage of permeate materials out of the wafer, or materials into the feedstream. The hollow fibers 18 of each layer 262 can be affixed together with a suitable bead of adhesive 436 as depicted in FIG. 48 or by an adhesive coated filament (not shown) applied on the upper and under sides of each layer.

Alternatively, the construction of each layer 262 can provide a woven mat of fibers with the hollow fibers 18 running parallel to one another in the woof direction and held together by non-hollow fiber filaments in the warp direction, such as nylon, polyester or the like. The objects are that each layer 262 form a flat sheet and that the hollow fibers 18 be parallel and as straight as possible, not woven or twisted. In any event, the hollow fibers 18 are preferably spaced apart within each layer 262, as depicted in FIG. 48, in order to allow complete contact of the feedstream with all hollow fiber surfaces and facilitate axial flow through the wafer 410.

The composition of the hollow fibers includes, as stated hereinabove, substantially any hollow fiber material currently available, or which may subsequently become available. Again, inasmuch as the composition and preparation of hollow fibers for the separation of a variety of gas mixtures and liquid mixtures, is well known to those skilled in the art, a detailed description thereof is not provided herein, it being understood that the present invention is not limited to any specific hollow fiber composition or method of preparation or fabrication.

As noted in FIGS. 45 and 47, the open ends 369, 370 of each transverse sheet sleeve 360 open entirely in bore chambers 423 and 425. Similarly, the open ends 433, 434 of hollow fiber layers 262 open entirely in bore chambers 424 and 426. Each chamber occupies one quadrant or approximately 90 degrees so that fluid entering chamber 426 can pass through hollow fibers 18 in each layer 262 and exit into chamber 424 while fluid entering chamber 423 can pass through transverse sheet sleeves 360 and exit into chamber 425.

In order to form a seal between adjacent wafers and align the stack, the seal ring 263 is employed. Inasmuch as the seal ring 263 was described hereinabove with reference to FIGS. 27 and 28, the description need not be repeated it being appreciated that the wafers 410 can be adapted to fit therewith in the manner described for wafer 240.

Figure 49A:
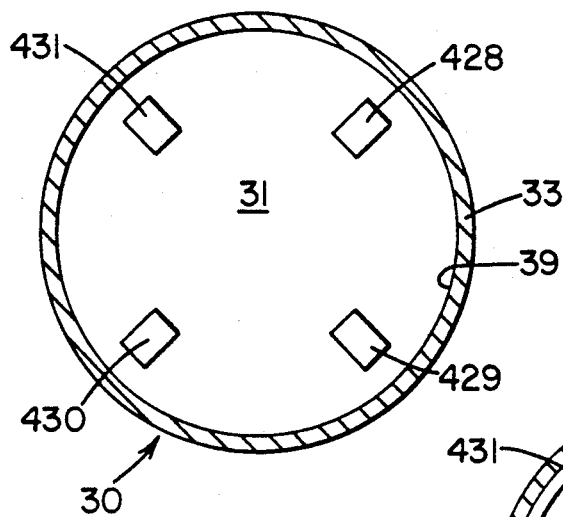
FIGS. 49A–49H are contained on two sheets and depict schematically, the sequential steps for manufacturing another four-chambered separation wafer, according to the present invention.

The wafers 410 are manufactured by a potting technique utilizing a centrifuge and mold 30, as discussed hereinabove. With reference to FIG. 4, in general, and FIGS. 49A-49H specifically, the assembly and manufacturing steps shall be explained. Construction of the wafer 410 begins with the casting of the outer or second peripheral wall 418. Casting, in turn, begins with the placement of four preformed rectangular epoxy partition blocks 428-431 into the mold (FIG. 49A). The partition blocks are made of the same epoxy formulation employed to manufacture the walls of the wafer for physical property compatibility.

Figure 49B:
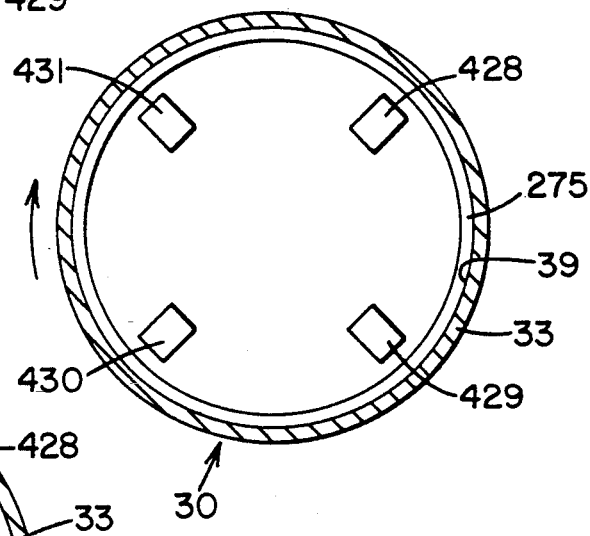

The partitions are held in place between the top and bottom, 34 and 31 respectively, of the mold 30. The mold is then placed in the centrifuge (not shown) and spun at sufficient speeds to produce ten to 500 times the force of gravity at the periphery. A small quantity of molten wax or the like is then poured onto the slinger plate 35 (FIG. 5) of the spinning mold which forms a ring 210 against the inner wall 39 of the mold (FIG. 49B).

Figure 49C:
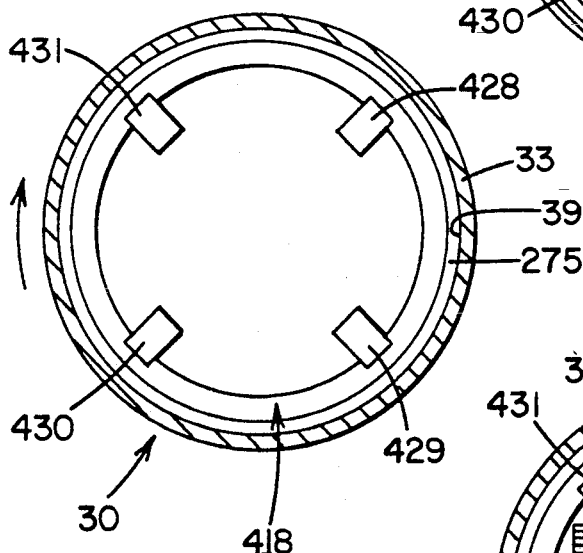

Next, a measured quantity of epoxy is mixed and poured onto the plate to form a second ring, outer peripheral wall 418 of wafer 410, against the ring 210 (FIG. 49C). As before, the purpose of the first ring 210 is to facilitate removal of the wafer from the mold. The mold is spun continuously until the epoxy ring 418 hardens. The mold is then removed from the centrifuge and opened to reveal the casting depicted in FIG. 49C.

Figure 49D:
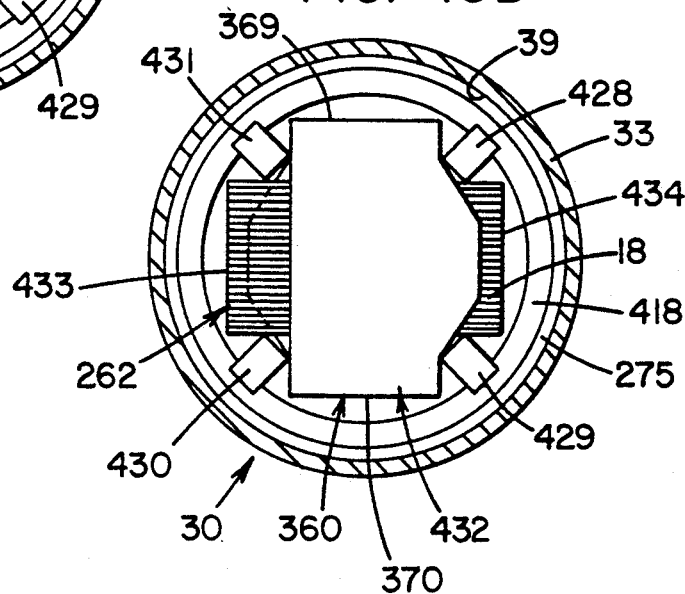

Next, rectangular sheets or layers 262, 432 of hollow fibers 18 and transverse sheet sleeves 360, respectively, are placed in the mold between the partitions in an alternating fashion, as depicted in FIG. 49D. As shown, the hollow fiber ends 433, 434 extend almost to the epoxy ring 418 as is true for the sleeve ends 369, 370. The layers and sleeves can also be stacked in groups comprising several consecutive layers 262, alternated with several consecutive sleeves layers 432.

Figure 49E:
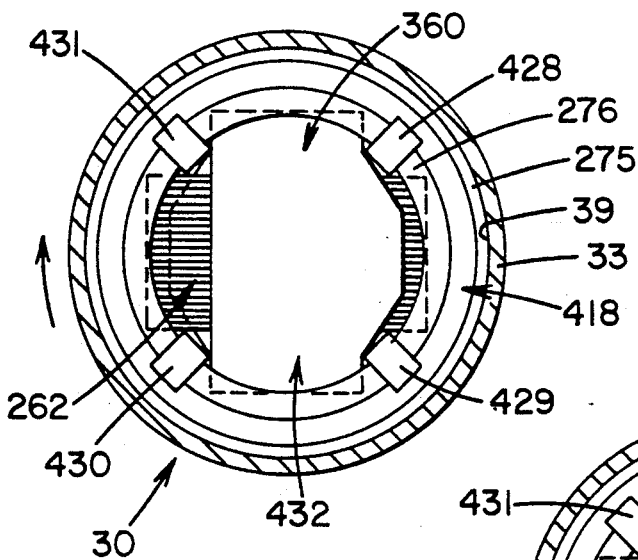

The hollow fibers layers and transverse sheet sleeves are stacked in the mold until it is full, then the mold is closed and again spun in the centrifuge. A measured quantity of wax or other solidifiable material is again poured onto the slinger plate 35 to form a third ring 211 on the inside of the epoxy ring 418 (FIG. 49E).

Figure 49F:
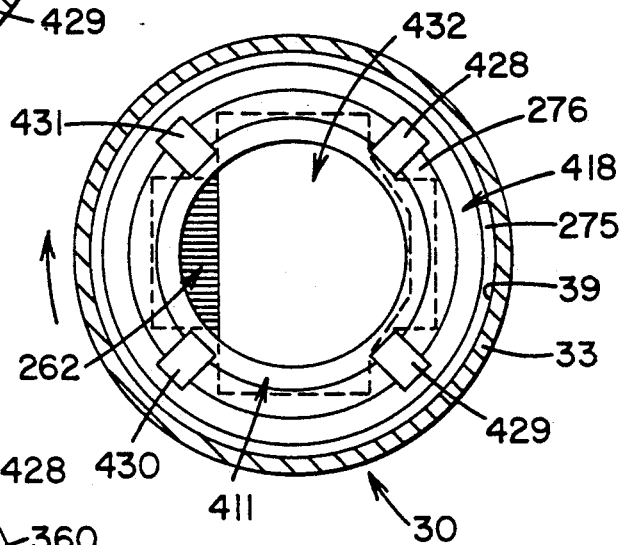
Figure 49G:
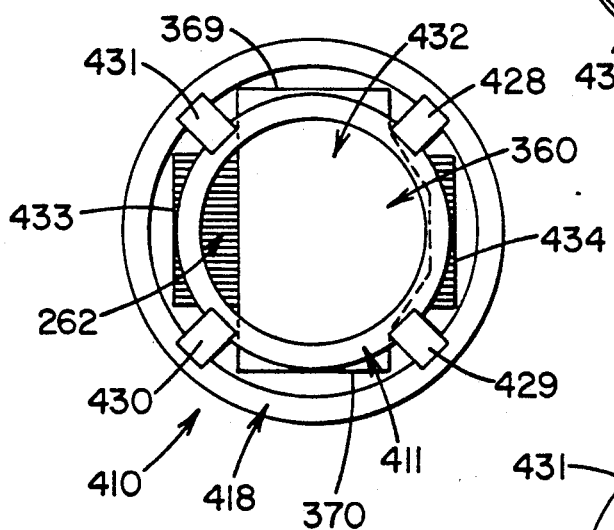

Next, a measured quantity of epoxy resin is poured into the spinning mold to form the second epoxy ring, or first peripheral wall 411 of the wafer 410 (FIG. 49F). After the epoxy has hardened, the mold is removed from the centrifuge and the casting is taken out of the mold (FIG. 49G). If wax were used, the mold side containing the casting can be heated to melt the wax. The wax can be collected, filtered and reused.

Figure 49H:
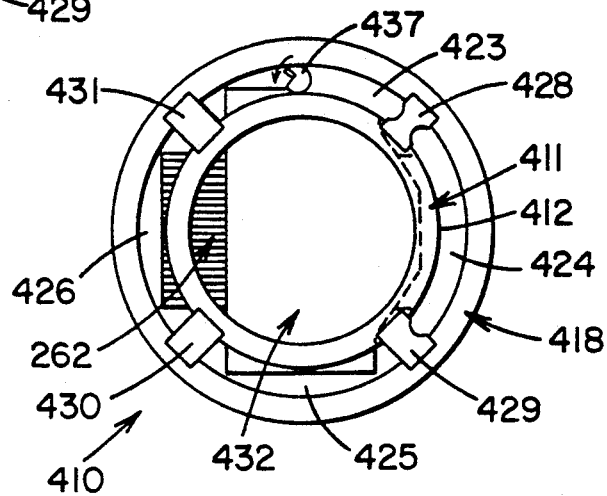

Finally, excess fiber at the periphery of the first or inner peripheral wall 411 is removed and the tubesheet face, outer face 412, is machined to expose open ends of the hollow fiber bores and transverse sheet sleeves into each of the four separate bore chambers, 423-426. As depicted in FIG. 49H, the tubesheet finishing tool 212 can be a rotary milling device which is inserted into the chamber e.g. 423. The wafer can be rotated in a fixture to move the finishing tool across the tubesheet face between the partition blocks. This procedure is repeated for the other three chambers 424-426, to produce the wafer 410 depicted in FIG. 45. It is to be appreciated that the machining step may not be necessary if the ends of transverse sheet sleeves and hollow fiber layers are open and unclogged and, if the protruding ends do not excessively impede the bore fluid flow chambers 423-426.

The foregoing method can also be employed to manufacture other four-chambered wafers (not shown) comprising layers 308 of non-porous tubes 309 alternating with layers 432 of transverse sheet membrane sleeves 360 or comprising layers 306 of membrane coated porous tubes 303, alternating with sleeves 360. Inasmuch as these layers 308 and 306 have been described hereinabove as well as the fabrication of wafers therewith, a detailed explanation of the other four-chambered wafers not shown is not deemed necessary. Likewise, it should be understood that the method can be employed to manufacture other wafers (not shown) having more than four chambers, or only two chambers.

Figure 50:
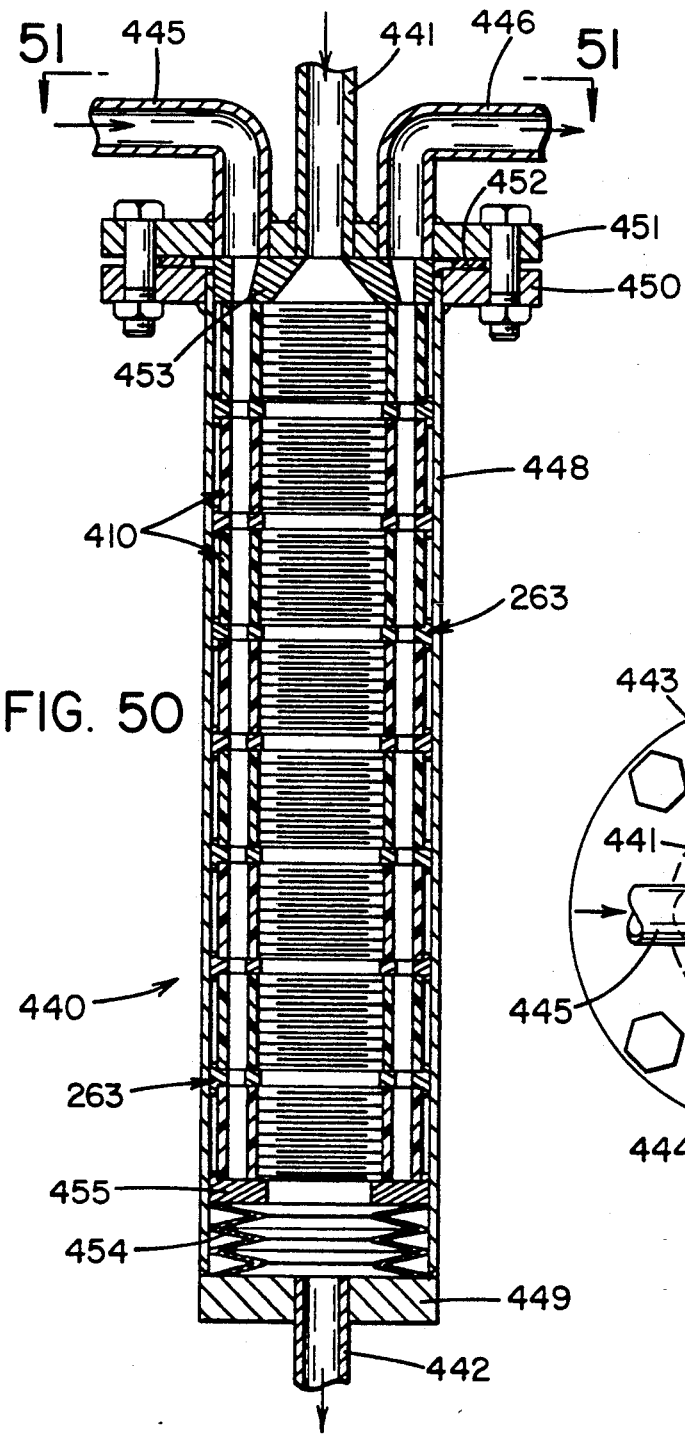
FIG. 50 is a cross-sectional side elevation of an alternative separation module having six ports.
Figure 51:
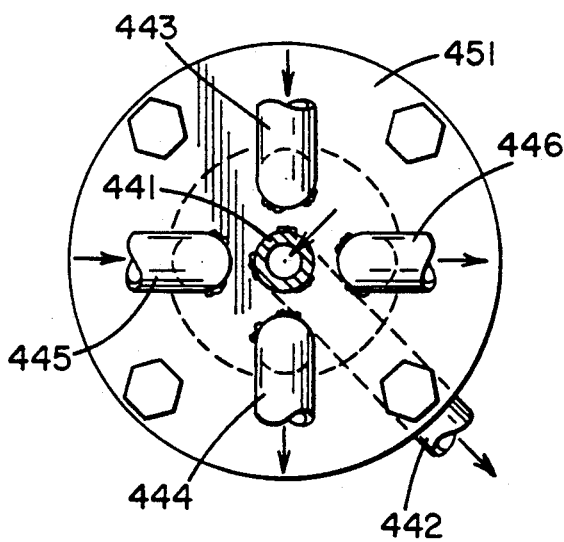
FIG. 51 is a top plan view of the separation module of FIG. 50.

The present invention also provides a module for wafers such as 410 comprising layers of transverse sheet membrane sleeves 360 and hollow fibers or the like. The module 440 is depicted in FIGS. 50 and 51 and is identical to the module 220 of FIG. 22 except for the provision of wafers 410 or related types.

The module 440, provides a first port 441 into the module and a second port 442 out of the module as well as a plurality of bore fluid ports: rear inlet port 443 and front outlet port 444; side inlet port 445 and side outlet port 446.

The module 440 comprises a cylindrical body 448; a base 449; through which the second port 442 passes; an upper or top flange 450 and removable top 451. These components are also constructed of metal piping and fittings and assembled in a suitable manner. The top 451 carries the five ports 441 and 443-446 and is bolted to the top flange 450 with a sealing gasket 452 therebetween. A transition member 453 is interposed between the top flange 450 and the uppermost wafer and connects the first port 441 with the central area of the wafer and each of the four bore fluid ports 443-446 with separate chambers discussed above and hereinbelow.

At the bottom of the module, a stack of Belleville washers 454 support a stack compression ring 455, upon which the stack of wafers rest. The Belleville washers provide compression to maintain sealing force within the wafer stack. They also provide for variances in the stack height and for differential thermal expansion between the wafer stack and the module 440.

Figure 52:
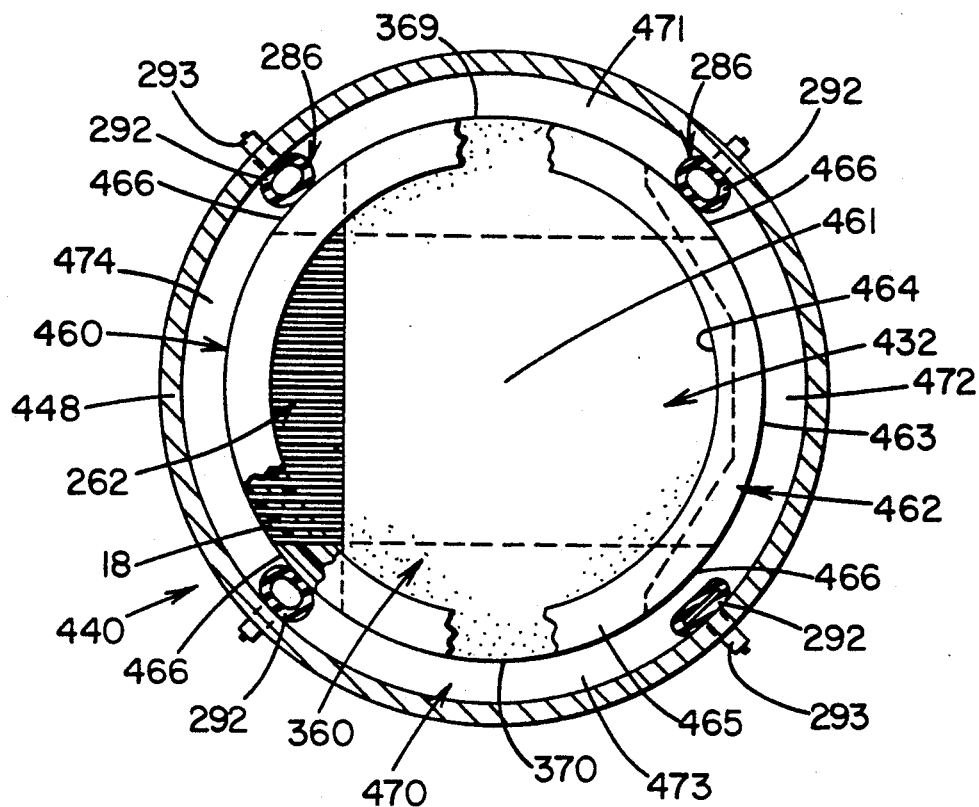
FIG. 52 is a section through another embodiment of a six-port separation module, depicting an alternative means for providing four separate chambers.

Finally, with reference to FIG. 52 an alternative means for constructing a six port module is presented. The overall module is not shown because the module 440 (FIG. 50) can be employed. It utilizes a wafer 460 having a central area 461 which contains a plurality of layers 262 of hollow fiber layers 18 and a plurality of layers 432 of transverse sheet sleeves 360. More particularly, the layers 262 and 432 have the cross-wise orientation employed in wafer 410, but only a single peripheral wall 462, as employed in the wafers 280, 300 and 350. The layers are placed in the mold in the alternating, cross-wise manner during construction and the wafer is cast centrifugally, as discussed hereinabove. Although the wafer 460 does not employ partition blocks, the sleeves and hollow fiber layers can be fixed within the mold during potting between brackets (not shown). Suitable brackets are depicted in co-pending application, U.S. Ser. No. 383,742, the subject matter of which is incorporated herein by reference.

The resultant wafer 460 has outer and inner surfaces 463, 464 respectively, as well as an upper surface 465 and a lower surface (not shown). Additionally, four fiber free, sleeve free surfaces 466 are provided about the outside face 463 of peripheral wall 462 against which means for dividing 286 comprising inflatable hose seals 292 can press to divide chamber area 470 into four separate bore fluid chambers, 471–474 with the module wall 448. The hoses are fastened to the vessel wall or otherwise held in place by a means not shown. During wafer insertion, the hoses are deflated and out of the way. When the wafers are in position, the interiors of the elastomer hoses are pressurized to expand and wedge them between the wafers and the vessel wall.

Again, as discussed hereinabove, a variation of wafer 460 can be fabricated with a layer 308 of non-porous tubes 309 or a layer 306 of membrane coated porous tubes 303 in lieu of a layer 262 of hollow fibers 18. Based upon the earlier descriptions of these layers in conjunction with other wafers, the fabrication and structure of wafers of the type 460 should be apparent and thus a detailed description is not provided herein.

In similar fashion, it is to be understood that various means for dividing discussed in conjunction with FIGS. 17–21 can be substituted for the means 286 in order to divide the annular chamber 470 into four bore fluid chambers. Likewise, in order to manufacture the wafer 460, a variation of the method depicted in FIGS. 49A–H can be employed by deleting the partition blocks, placing the desired layers as depicted in FIG. 49D and casting one epoxy ring.

Having described the configurations of the modules 180, 220 and 440 and of the wafers 200, 240, 280, 300, 320, 350, 410 and 460 uses thereof according to the methods of the present invention shall be considered next, The four port module 180 is useful in instances where the controlled reaction of a feedstream component is desired. As one example, by feeding a latex material and catalyst through inlet 185 and the wafers 200 within the module, while passing a dialysate for the catalyst into chamber 198, through the hollow fiber layers and out the chamber 199, it is possible to remove the catalyst and yield a latex essentially free therefrom via outlet port 208.

As another example, dehydration of feedstream gases could be conducted by passing a sweep gas through the chambers 198, 199 and hollow fibers while feeding the gas stream through the module. Water vapor, passing into the hollow fibers would be swept from the module producing an essentially dehydrated gas stream via outlet port 208.

A fermentation dialysis could also be conducted by employing hollow fibers selective to the passage of ethyl alcohol from a fermentation feedstream. Continuous sweeping of the alcohol from the module via chambers 198, 199 before the alcohol content poisoned the yeast would save the latter for continuous use.

Yet another example includes separation of azeotropes, such as in the removal of water from alcohol. By employing a membrane selective for water and sweeping it via chambers 198, 199, 100 percent alcohol could be obtained.

Pervaporation methods can also be practiced by pulling a vacuum on either side of chambers 198, 199 which will collect materials drawn into hollow fibers 18 or porous tubes 303 which may be coated with membrane materials 304. In order to counter the cooling effect of pervaporation, the feedstream can be preheated.

With respect to the six port modules 220 and 440 which can employ wafers 280, 300, 350 or 460 with inflatable seals, as well as four-chambered wafers 240, 320 and 410 and variations thereof, the foregoing methods can be practiced while heat or cooling is provided through opposed chambers and layers of non-porous tubes 309 by circulation of a heat exchange fluid therethrough. Addition of heat would be particularly useful in prevaporation methods.

As another example, the module 220 could be employed as a bioreactor wherein oxygen is fed to a biological feedstream through one set of layers e.g., 262A via chambers 294, 296 and nutrients are fed to the feedstream through the alternate layers 262B via chambers 293, 295. Alternatively, waste materials could be extracted and swept via one of the layers. Of course, the module 440 could also be employed as a bioreactor.

The six port module 440 is useful in instances where the controlled reaction of a feedstream component is desired. As one example, by feeding a latex material and catalyst through inlet 441 and the wafers 410 within the module, while passing a dialysate for the catalyst into chamber 426, through the hollow fiber layers 262 and out the chamber 424, it is possible to remove the catalyst and yield a latex essentially free therefrom via outlet port 442. Meanwhile, a separate treatment of the feedstream could be practiced via transverse sleeves and connecting chambers 423, 425. Of course, a similar treatment can be practiced where wafers 460 are employed and, it is also possible to dialyze the catalyst via transverse sleeves and employ the hollow fiber layers for another separation or treatment process. Once again, the module 220 can be substituted for the module 440 for similar purposes.

Another method of treatment involves directing a transport medium into the multi port module, which may be sealed. A feedstream can then be fed into the module and a wafer through one set of layers e.g., 262A via chambers 254, 256. Components filtered by the layers 262A, upon encountering the transport fluid, could be moved to the second layers e.g., 262B, to pass into the layer and out of the module via chambers 253, 255. In addition to various biological applications, such a method could be also be employed to recover metals e.g., copper, from leach solutions.

As should be evident, many other variations are possible depending upon selection of the porous tubes and membrane coatings or hollow fibers and their respective permeabilities as well as the transverse sheet membrane sleeves and non-porous tubes in any of the combinations depicted and described or disclosed hereinabove. The methods of the present invention all provide for the treatment of a feedstream component, the permeate, that is separable from the feedstream. The permeate can be removed via sweeping, vacuum, reaction with other components including catalysts, enzymes, antibodies, or the like and it can further reacted or treated with materials such as oxygen or nutrients. Accordingly, the present invention is not necessarily limited to the methods suggested herein which have been disclosed merely for purposes of illustration.

As should now also be apparent the combined transverse sheet/radial hollow fiber multi port modules provide several advantages over the plate and frame and spiral wrap types. Because fluid flow pressure losses of the permeate in the membrane sleeve and/or hollow fibers are detrimental to the performance of membrane separation processes, the longer the flow path in the sleeve or fibers, the more performance is adversely affected. Cost considerations, however, favor larger diameter modules with fewer sleeve or sleeve and fiber connections at the permeate manifold which require longer sleeves and hollow fibers. An economic trade-off must be made between the module diameter, the number of membrane sleeve and fiber connections, and the performance penalty incurred by the sleeve and fiber length. Conversely, the modules of the present invention are composed of a large number of short membrane sleeves or sleeves and short hollow fibers which are efficiently potted in a single process. Permeate flow losses in the membrane sleeve and fibers can be controlled to very low levels and/or the thickness of the porous support material can be reduced for a higher volumetric packing efficiency in the module.

Second, in the module design of the present invention, membrane sleeves and hollow fibers are not subject to bending or significant compression force as during spiral wrapping. Once the membrane sleeves and fibers are placed in the centrifugal potting mold, they are not subject to additional handling and once potted, the sleeves and fibers are not subject to any mechanical stresses. Third, the module design of the present invention imbeds the potentially weak membrane side seam seal in epoxy. A rigid cylinder of epoxy handles all modularization forces and protects the membrane surface and fibers from accidental damage during assembly and transportation.

Fourth, the wafers are modular building blocks for the transverse sheet membrane sleeve/radial hollow fiber modules. The modular nature of the wafers allows modules of almost any length to be assembled from one size of wafer. Many different module configurations can be assembled with a few different wafer sizes. Additionally, the modular nature of each wafer provides a complete, integral component or unit which does not require subsequent assembly. Because, the edges of the material comprising the central area are integrally bonded in a continuous peripheral wall, failure is minimized and disassembly is neither required nor possible. Higher production yields can be achieved because wafers can be tested individually prior to module assembly. Defective wafers can be eliminated with less loss of assembly time and with smaller loss of membrane than discarding a whole module. If an average module is made of twenty wafers, then a catastrophic defect can be eliminated by discarding 5 percent of the module rather than 100 percent.

Finally, the module designs of the present invention have higher feed fluid flow velocities than a comparable diameter spiral wrap module. The serpentine flow path of the feed fluid insures a high velocity at the fluid/membrane interface which reduces the tendency of retentate to concentrate near the membrane surface by keeping it swept away with the bulk feed fluid flow. Reduced concentration polarization results in better membrane performance.

Based upon the foregoing description and examples, it should be apparent that the modules and wafers disclosed herein fulfill the objects of the present invention. The modular nature of the individual wafers allows modules of almost any length to be assembled from one size of wafer, merely by adding wafers to the stack. Many different module configurations can be assembled with only a few different wafer diameters. Moreover, wafers can be tested individually prior to assembly of the module and thus, defective wafers can be removed from a module and discarded with less loss of hollow fibers, than where an entire axial fiber module must be replaced.

Another important feature of the present invention which should be apparent is the alternative means possible for providing a compressive loading of the wafers within the module. The various embodiments depicted each provide more uniform compression and sealing of the wafers which can accommodate dimensional changes due to pressure and temperature variations.

In addition, the various modules and wafers disclosed herein as further embodiments can employ any of the various means for sealing and compressive loading as described herein. Moreover, by the selection of different wafers and component layers thereof, it is possible to provide other modules than those depicted in the drawings and thus, the present invention is not to be limited to only specific embodiments. In particular, multi port modules having more than six ports are within the scope of the present invention as are multi-chambered wafers having more than four chambers. Based upon the total specification disclosure, it has not been felt to be necessary to depict and discuss all the possible variations which should now be evident to those skilled in the art.

It should also be clear to those skilled in the art the manner in which the wafers modules described herein are constructed, assembled and used. It will also be apparent to those skilled in the art that the modules of the subject invention can readily be utilized in conjunction with various types of feedstream treatments including separations, reactions and the like as well as other uses beyond those discussed herein.

It is to be understood that any variations evident fall within the scope of the claimed invention; therefore, the selection of specific component elements can be determined without departing from the spirit of the invention herein disclosed and described. Moreover, the scope of the invention shall include all modifications and variations that may fall within the scope of the attached claims.

We claim:

1. Apparatus for the separation of a fluid feedstream into permeate and retentate portions comprising:
    a plurality of hollow fiber separation wafers, each said wafer comprising
        a mat of hollow fibers arranged chord-wise of said wafer and in a plurality of stacked layers, each said layer having a plurality of hollow fibers in adjacent, parallel alignment; and
        continuous peripheral support means encompassing the ends of said hollow fibers and having outside, upper and lower surfaces and annular groove means in said outside surface contiguous with said upper and lower surfaces;

band means received in said groove means whereby said lower surface of one wafer is fastened to said upper surface of an adjacent wafer;

vessel means providing a first port for receiving the fluid feedstream, a second port for withdrawing said retentate and a third port for withdrawing said permeate;

means for compressing said plurality of wafers in axial alignment; and permeate chamber means within said vessel, separated from said feedstream and said retentate by said means for compressing and said support means.

2. Apparatus for the separation of a fluid feedstream into permeate and retentate portions comprising:

at least one hollow fiber separation wafer, each said wafer comprising a mat of hollow fibers in a plurality of stacked layers, each said layer having a plurality of hollow fibers in adjacent, parallel alignment and two parallel edges formed of fiber reinforcement; and continuous peripheral support means encompassing the ends of said hollow fibers and said parallel edges formed of fiber reinforcement; vessel means providing a first port for receiving the fluid feedstream, a second port for withdrawing said retentate and a third port for withdrawing said permeate;

means for compressing said at least one wafer within said apparatus; and permeate chamber means within said vessel, separated from the feedstream and said retentate by said means for compressing and said support means.

3. A multi port apparatus for the treatment of fluid feedstreams comprising:

at least one wafer, each said wafer comprising a central area providing a plurality of members arranged in a plurality of stacked layers and continuous peripheral support means encompassing said central area, said plurality of members passing therethrough;

chamber means generally encompassing said peripheral support means and communicable with said central area;

vessel means carrying said chamber means providing first and second ports into and out of said vessel means and a plurality of separate bore fluid port means communicating with said chamber means;

means for dividing said chamber means independent of said at least one wafer into a like plurality of separate chambers, each said separate chamber being communicable with a bore fluid port means; and means for compressing said at least one wafer within said vessel.

4. A multi port apparatus, as set forth in claim 3, wherein said means for dividing includes:

wiper seal means carried within said vessel means and communicable with said wafer peripheral support means; and thrust support means carried by said vessel means opposite one of said bore fluid port means to maintain wafer alignment within said vessel means.

5. A multi port apparatus, as set forth in claim 3, wherein said means for dividing includes:

a pair of side thrust supports carried within said vessel means and engageable with opposed notches carried by said wafer peripheral support means; and wiper seal means carried by said peripheral support means and engageable with said side thrust supports.

6. A multi port apparatus, as set forth in claim 3, wherein said means for dividing includes:

wedge seal means carried within said vessel means and communicable with opposed flats provided by said wafer peripheral support means.

7. A multi port apparatus, as set forth in claim 3, wherein said means for dividing includes:

inflatable seal means carried within said vessel means and communicable with said wafer peripheral support means.

8. A multi port apparatus, as set forth in claim 3, each said layer of members comprising a plurality of hollow fibers in adjacent, parallel alignment with the lumens thereof opening into said first and second chambers.

9. A multi port apparatus, as set forth in claim 3, wherein said peripheral support means further includes outside, upper and lower surfaces and annular groove means in said outside surface contiguous with said upper and lower surfaces; said apparatus further comprising:

band means received in said groove means whereby said lower surface of one wafer is fastened to said upper surface of an adjacent wafer.

10. A multi port apparatus, as set forth in claim 3, said plurality of layers defining first and second layers, each said first layer having a plurality of hollow fibers, the lumens of which open into an opposed pair of said separate chambers, and each second layer having a plurality of hollow fibers, the lumens of which open into an opposed second pair of said separate chambers.

11. A multi port apparatus, as set forth in claim 3, said plurality of layers defining first and second layers, each said first layer having a plurality of hollow fibers, the lumens of which open into an opposed pair of said separate chambers, each said second layer having a plurality of non-porous tubes, the lumens of which open into an opposed second pair of said separate chambers.

12. A multi port apparatus, as set forth in claim 3, said plurality of layers defining first and second layers, each said first layer having a plurality of porous tubes coated with a semipermeable membrane the lumens of which open into an opposed pair of said separate chambers, and each said second layer having a plurality of non-porous tubes, the lumens of which open into an opposed second pair of said separate chambers.

13. A multi port apparatus, as set forth in claim 3, said plurality of layers defining first and second layers, each said first layer having a plurality of porous tubes coated with a semipermeable membrane the lumens of which open into an opposed pair of said separate chambers, and each said second layer having a plurality of porous tubes coated with a semipermeable membrane the lumens of which open into an opposed second pair of said separate chambers.

14. A multi port apparatus, as set forth in claim 3, said plurality of layers defining first and second layers, each said first layer having a plurality of hollow fibers, the lumens of which open into an opposed pair of said bore fluid chambers and each said second layer providing a transvere sheet membrane sleeve having opposed open ends which communicate with an opposed second pair of said bore fluid chambers.

15. A multi port apparatus, as set forth in claim 3, said plurality of layers defining first and second layers, each said first layer having a plurality of non-porous tubes, the lumens of which open into an opposed pair of said bore fluid chambers and each said second layer providing a transverse sheet membrane sleeve having opposed open ends which communicate with an opposed second pair of said bore fluid chambers.

16. A multi port apparatus, as set forth in claim 3, said plurality of layers defining first and second layers, each said first layer having a plurality of porous tubes coated with a semipermeable membrane, the lumens of which open into an opposed pair of said bore fluid chambers and each said second layer providing a transverse sheet membrane sleeve having opposed open ends which communicate with an opposed second pair of said bore fluid chambers.

17. A multi port apparatus for the treatment of fluid feedstreams comprising:
    at least one wafer, each said wafer comprising
        a central area providing a plurality of members arranged in a plurality of stacked layers;
        continuous first peripheral support means encompassing said central area and having outer, upper and lower surfaces, said plurality of members of said central area terminating at said outer surface;
        second peripheral support means, having upper and lower surfaces and carried radially outwardly from said first peripheral support means; and
        a plurality of separate bore fluid chambers defined between said first and second peripheral support means and communicable with said central area;
    vessel means providing first and second ports into and out of said vessel and a like plurality of separate bore fluid port means communicating with said plurality of separate bore fluid chambers; and
    means for compressing said at least one wafer within said apparatus.

18. A multi port apparatus, as set forth in claim 17, further comprising:
    seal ring means engageable with said first and second peripheral support walls; and
    seal members interposed between said upper and lower surfaces of said first and second peripheral support means.

19. A multi port apparatus, as set forth in claim 17, said plurality of layers defining first and second layers, each said first layer having a plurality of hollow fibers, the lumens of which open into an opposed pair of said bore fluid chambers, and each said second layer having a plurality of hollow fibers, the lumens of which open into an opposed second pair of said bore fluid chambers.

20. A multi port apparatus, as set forth in claim 17, said plurality of layers defining first and second layers, each said first layer having a plurality of hollow fibers, the lumens of which open into an opposed pair of said bore fluid chambers, and each said second layer having a plurality of non-porous tubes, the lumens of which open into an opposed second pair of bore fluid chambers.

21. A multi port apparatus, as set forth in claim 17, said plurality of layers defining first and second layers, each said first layer having a plurality of porous tubes coated with a semipermeable membrane, the lumens of which open into a pair of opposed bore fluid chambers, and each said second layer having a plurality of non-porous tubes, the lumens of which open into a second pair of opposed bore fluid chambers.

22. A multi port apparatus, as set forth in claim 17, said plurality of layers defining first and second layers, each said first layer having a plurality of porous tubes coated with a semipermeable membrane, the lumens of which open into a pair of opposed bore fluid chambers, and each said second layer having a plurality of porous tubes coated with a semipermeable membrane, the lumens of which open into an opposed second pair of bore fluid chambers.

23. A multi port apparatus, as set forth in claim 17, said plurality of layers defining first and second layers, each said first layer having a plurality of hollow fibers, the lumens of which open into an opposed pair of said bore fluid chambers and each said second layer providing a transverse sheet membrane sleeve having opposed open ends which communicate with an opposed second pair of said bore fluid chambers.

24. A multi port apparatus, as set forth in claim 17, said plurality of layers defining first and second layers, each said first layer having a plurality of non-porous tubes, the lumens of which open into an opposed pair of said bore fluid chambers and each said second layer providing a transverse sheet membrane sleeve having opposed open ends which communicate with an opposed second pair of said bore fluid chambers.

25. A multi port apparatus, as set forth in claim 17, said plurality of layers defining first and second layers, each said first layer having a plurality of porous tubes coated with a semipermeable membrane, the lumens of which open into an opposed pair of said bore fluid chambers and each said second layer providing a transverse sheet membrane sleeve having opposed open ends which communicate with an opposed second pair of said bore fluid chambers.

26. A multi-chambered wafer comprising:
    a central area providing a plurality of members arranged in a plurality of stacked layers;
    continuous first peripheral support means having an outer surface and encompassing said central area, said plurality of members of said central area terminating at said outer surface;
    second peripheral support means carried radially outwardly from said first peripheral support means; and
    a plurality of separate bore fluid chambers defined between said first and second peripheral support means and communicable with said central area.

27. A multi-chambered wafer, as set forth in claim 26, each said first layer having a plurality of hollow fibers, the lumens of which open into an opposed pair of said bore fluid chambers, and each said second layer having a plurality of hollow fibers, the lumens of which open into an opposed second pair of said bore fluid chambers.

28. A multi-chambered wafer, as set forth in claim 26, each said first layer having a plurality of hollow fibers, the lumens of which open into an opposed pair of said bore fluid chambers, and each said second layer having a plurality of non-porous tubes, the lumens of which open into an opposed second pair of said bore fluid chambers.

29. A multi-chambered wafer, as set forth in claim 26, said plurality of layers defining first and second layers, each said first layer having a plurality of porous tubes coated with a semipermeable membrane the lumens of which open into an opposed pair of said bore fluid chambers, and each said second layer having a plurality of non-porous tubes, the lumens of which open into an opposed second pair of said bore fluid chambers.

30. A multi-chambered wafer, as set forth in claim 26, said plurality of layers defining first and second layers, each said first layer having a plurality of porous tubes coated with a semipermeable membrane the lumens of which open into an opposed pair of said bore fluid chambers, and each said second layer having a plurality of porous tubes coated with a semipermeable membrane the lumens of which open into an opposed second pair of said bore fluid chambers.

31. A multi-chambered wafer, as set forth in claim 26, said plurality of layers defining first and second layers, each said first layer having a plurality of hollow fibers, the lumens of which open into an opposed pair of said bore fluid chambers and each said second layer providing a transverse sheet membrane sleeve having opposed open ends which communicate with an opposed second pair of said bore fluid chambers.

32. A multi-chambered wafer, as set forth in claim 31, wherein said transverse sheet membrane sleeves further comprise
a porous support web about which a semipermeable membrane sheet is wrapped, forming said sleeve; said web passing through said first peripheral support means thereby providing a communication to said opposed second pair of bore fluid chambers.

33. A multi-chambered wafer, as set forth in claim 31, wherein said transverse sheet membrane sleeves comprise a porous support material and a coating of semipermeable membrane material and are corrugated to strengthen and provide flow channels.

34. A multi-chambered wafer, as set forth in claim 26, said plurality of layers defining first and second layers, each said first layer having a plurality of non-porous tubes, the lumens of which open into an opposed pair of said bore fluid chambers and each said second layer providing a transverse sheet membrane sleeve having opposed open ends which communicate with an opposed second pair of said bore fluid chambers.

35. A multi-chambered wafer, as set forth in claim 34, wherein said transverse sheet membrane sleeves further comprise
a porous support web about which a semipermeable membrane sheet is wrapped, forming said sleeve; said web passing through said first peripheral support means thereby providing a communication to said opposed second pair of bore fluid chambers.

36. A multi-chambered wafer, as set forth in claim 34, wherein said transverse sheet membrane sleeves comprise a porous support material and a coating of semipermeable membrane material and are corrugated to strengthen and provide flow channels.

37. A multi-chambered wafer, as set forth in claim 26, said plurality of layers defining first and second layers, each said first layer having a plurality of porous tubes coated with a semipermeable membrane, the lumens of which open into an opposed pair of said bore fluid chambers and each said second layer providing a transverse sheet membrane sleeve having opposed open ends which communicate with an opposed second pair of said bore fluid chambers.

38. A multi-chambered wafer, as set forth in claim 37, wherein said transverse sheet membrane sleeves further comprise
a porous support web about which a semipermeable membrane sheet is wrapped, forming said sleeve; said web passing through said first peripheral support means thereby providing a communication to said opposed second pair of bore fluid chambers.

39. A multi-chambered wafer, as set forth in claim 37, wherein said transverse sheet membrane sleeves comprise a porous support material and a coating of semipermeable membrane material and are corrugated to strengthen and provide flow channels.

40. A wafer for use in an apparatus providing a plurality of separate chambers in communication with said wafer comprising:
continuous peripheral support means having an outside surface communicable with said separate chambers; and
a central area providing a plurality of alternating first and second layers, each said first layer having a plurality of hollow fibers, the lumens of which open into an opposed pair of said separate chambers, and each second layer having a plurality of non-porous tubes, the lumens of which open into an opposed second pair of said separate chambers.

41. A wafer for use in an apparatus providing a plurality of separate chambers in communication with said wafer comprising:
continuous peripheral support means having an outside surface communicable with said separate chambers; and
a central area providing a plurality of alternating first and second layers, each said first layer having a plurality of porous tubes coated with a semipermeable membrane the lumens of which open into an opposed pair of said separate chambers, and each second layer having a plurality of non-porous tubes, the lumens of which open into an opposed second pair of said separate chambers.

42. A wafer for use in an apparatus providing a plurality of separate chambers in communication with said wafer comprising:
continuous peripheral support means having an outside surface communicable with said separate chambers; and
a central area providing a plurality of alternating first and second layers, each said first layer having a plurality of porous tubes coated with a semipermeable membrane the lumens of which open into an opposed pair of said separate chambers, and each second layer having a plurality of porous tubes coated with a semipermeable membrane the lumens of which open into an opposed second pair of said separate chambers.

43. A wafer for use in an apparatus providing a plurality of separate chambers in communication with said wafers comprising:
continuous peripheral support means having an outside surface communicable with said separate chambers; and
a central area providing a plurality of alternating first and second layers, each said first layer having a plurality of hollow fibers, the lumens of which open into an opposed pair of said separate chambers, and each second layer providing a transverse sheet membrane sleeve having opposed open ends which communicate with an opposed second pair of said separate chambers.

44. A wafer, as set forth in claim 43, wherein said transverse sheet membrane sleeves further comprise a porous support web about which a semipermeable membrane sheet is wrapped, forming said sleeve; said web passing through said first peripheral support means thereby providing a communication to said opposed second pair of bore fluid chambers.

45. A wafer, as set forth in claim 43, wherein said transverse sheet membrane sleeves comprise a porous support material and a coating of semipermeable membrane material and are corrugated to strengthen and provide flow channels.

46. A wafer for use in an apparatus providing a plurality of separate chambers in communication with said wafers comprising:
   continuous peripheral support means having an outside surface communicable with said separate chambers; and
   a central area providing a plurality of alternating first and second layers, each said first layer having a plurality of non-porous tubes, the lumens of which open into an opposed pair of said separate chambers, and each second layer providing a transverse sheet membrane sleeve having opposed open ends which communicate with an opposed second pair of said separate chambers.

47. A wafer, as set forth in claim 46, wherein said transverse sheet membrane sleeves further comprise
   a porous support web about which a semipermeable membrane sheet is wrapped, forming said sleeve; said web passing through said first peripheral support means thereby providing a communication to said opposed second pair of bore fluid chambers.

48. A wafer, as set forth in claim 46, wherein said transverse sheet membrane sleeves comprise a porous support material and a coating of semipermeable membrane material and are corrugated to strengthen and provide flow channels.

49. A wafer for use in an apparatus providing a plurality of separate chambers in communication with said wafers comprising:
   continuous peripheral support means having an outside surface communicable with said separate chambers; and
   a central area providing a plurality of alternating first and second layers, each said first layer having a plurality of porous tubes coated with a semipermeable membrane, the lumens of which open into an opposed pair of said separate chambers, and each second layer providing a transverse sheet membrane sleeve comprising a semipermeable membrane sheet folded over on itself and having opposed open ends which communicate with an opposed second pair of said separate chambers.

50. A wafer, as set forth in claim 49, wherein said transverse sheet membrane sleeves further comprise
   a porous support web about which a semipermeable membrane sheet is wrapped, forming said sleeve; said web passing through said first peripheral support means thereby providing a communication to said opposed second pair of bore fluid chambers.

51. A wafer, as set forth in claim 49, wherein said transverse sheet membrane sleeves comprise a porous support material and a coating of semipermeable membrane material and are corrugated to strengthen and provide flow channels.

52. A method for the manufacture of multi-chambered wafers having outer and inner peripheral walls and a central area providing a plurality of members arranged in a plurality of layers comprising the steps of:
   providing a rotatable mold, partially closed at the top by a slinger plate;
   placing a plurality of partition blocks into said mold;
   rotating said mold at high speed while pouring a first quantity of a first solidifiable liquid onto said slinger plate to form a first annular ring within said mold;
   subsequently pouring a first quantity of a second solidifiable liquid onto said slinger plate to form said outer peripheral wall and encompass one end of said partition blocks;
   stopping the rotation of said mold and placing said plurality of layers within said mold in alternating layers;
   rotating said mold again while pouring a second quantity of said first solidifiable liquid onto said slinger plate to form a third annular ring within said mold, encompassing the ends of said layers;
   subsequently pouring a second quantity of said second solidifiable liquid onto said slinger plate to form said inner peripheral wall, encompassing the other end of said partition blocks and a portion of said layers;
   stopping the rotation of said mold and removing the product therefrom; and
   removing said first and third annular rings to yield said wafer having a plurality of separate bore fluid chambers between said outer and inner peripheral walls.

53. A method, as set forth in claim 52, wherein said step of placing a plurality of layers within said rotatable mold includes the steps of
   positioning one of said layers in the bottom of said mold;
   positioning another of said layers thereover;
   repeating said steps of positioning until said mold is almost full; and
   alternating the orientation of one of said layers between 180° intervals within said mold.

54. A method, as set forth in claim 53, including the further steps of removing the ends of said layers within said separate bore fluid chambers.

55. A method for the manufacture of separation wafers having an outer peripheral wall and a plurality of members arranged in a plurality of layers comprising the steps of:
   providing a rotatable mold, partially closed at the top by a slinger plate;
   placing said plurality of said layers within said rotatable mold in alternating layers;
   rotating said mold at high speed while pouring a first solidifiable liquid onto said slinger plate to form a first annular ring within said mold encompassing a portion of said layers;
   pouring a second solidifiable liquid onto said slinger plate to form said outer peripheral wall, encompassing a greater portion of said layers;
   stopping the rotation of said mold and removing the assembly of components therefrom; and
   removing said first ring and said layers encompassed therein from said outer peripheral wall whereby a portion of said layers passes through said peripheral wall and opens to the exterior of said wafer.

56. A method, as set forth in claim 55, wherein said step of placing a plurality of layers within said rotatable mold includes the steps of
   positioning one of said layers in the bottom of said mold;
   positioning another of said layers thereover;
   repeating said steps of positioning until said mold is almost full; and
   alternating the orientation of one of said layers between 180° intervals within said mold.

* * * * *